US012773730B2

(12) United States Patent
Whiting et al.

(10) Patent No.: US 12,773,730 B2
(45) Date of Patent: Oct. 27, 2026

(54) POWDER DELIVERY SYSTEM INCLUDING A RECOATER WITH A REMOVABLE CARTRIDGE

(71) Applicant: DMG MORI CO., LTD., Nara (JP)

(72) Inventors: Justin Whiting, Davis, CA (US); Brett Fafata, Davis, CA (US); Peyton Archibald, Davis, CA (US)

(73) Assignee: DMG MORI CO., LTD., Nara (JP)

( * ) Notice: Subject to any disclaimer, the term of this patent is extended or adjusted under 35 U.S.C. 154(b) by 0 days.

(21) Appl. No.: 19/172,498

(22) Filed: Apr. 7, 2025

(65) Prior Publication Data

US 2025/0281981 A1 Sep. 11, 2025

Related U.S. Application Data

(63) Continuation-in-part of application No. 19/053,193, filed on Feb. 13, 2025.

(60) Provisional application No. 63/561,526, filed on Mar. 5, 2024, provisional application No. 63/561,580, filed on Mar. 5, 2024, provisional application No. 63/561,714, filed on Mar. 5, 2024, provisional application No. 63/561,549, filed on Mar. 5, 2024, provisional application No. 63/561,711, filed on Mar. 5, 2024.

(51) Int. Cl.

| | |
|---|---|
| ***B22F 12/52*** | (2021.01) |
| ***B22F 12/57*** | (2021.01) |
| ***B29C 64/329*** | (2017.01) |
| ***B29C 64/343*** | (2017.01) |
| *B33Y 40/00* | (2020.01) |

(52) U.S. Cl.

CPC .............. *B22F 12/52* (2021.01); *B22F 12/57* (2021.01); *B29C 64/329* (2017.08); *B29C 64/343* (2017.08); *B33Y 40/00* (2014.12)

(58) Field of Classification Search

CPC .......... B22F 12/57; B22F 12/52; B22F 10/85; B29C 64/329; B29C 64/343; B29C 64/359

See application file for complete search history.

(56) References Cited

U.S. PATENT DOCUMENTS

| | | | | |
|---|---|---|---|---|
| 11,890,807 | B1 * | 2/2024 | Luick | B22F 10/28 |
| 2018/0126462 | A1 | 5/2018 | Murphree et al. | |
| 2018/0370117 | A1 * | 12/2018 | Gardiner | B33Y 30/00 |
| 2021/0154910 | A1 * | 5/2021 | Cheng | B29C 64/106 |

FOREIGN PATENT DOCUMENTS

| | | |
|---|---|---|
| WO | 2023/172389 A1 | 9/2023 |

OTHER PUBLICATIONS

International Search Report and Written Opinion issued in corresponding International Patent Application No. PCT/US2025/018189, dated Apr. 30, 2025.

* cited by examiner

*Primary Examiner* — Jason K Niesz

(74) *Attorney, Agent, or Firm* — McDermott Will & Schulte LLP

(57) ABSTRACT

A powder supply and delivery (PSD) system used in additive manufacturing, the PSD system comprising a powder hopper, a linear vibration system, a diverter, a doser, and a recoater with a removable cartridge. The PSD system is also electrically coupled to the processor, where the memory unit is coupled to the processor, which includes the instructions to control the PSD system.

10 Claims, 62 Drawing Sheets

316L

| Dose number | Mass of dosed powder (g) |
|---|---|
| 1 | 13.24 |
| 2 | 13.24 |
| 3 | 13.96 |
| 4 | 13.31 |
| 5 | 13.44 |
| 6 | 13.69 |
| 7 | 13.58 |
| 8 | 14.09 |
| 9 | 13.43 |
| 10 | 13.20 |
| 11 | 13.31 |
| 12 | 13.19 |
| 13 | 13.33 |
| 14 | 13.31 |
| 15 | 14.00 |
| 16 | 13.50 |
| 17 | 13.24 |
| 18 | 14.09 |
| Mean | 13.51 |
| STD | 0.32 |
| COV | 2.4% |
| Max | 14.09 |
| Min | 13.19 |
| Range | **0.90** |

FIG. 4G-1

17-4

| Dose number | Mass of dosed powder (g) |
|---|---|
| 1 | 15.15 |
| 2 | 14.75 |
| 3 | 15.00 |
| 4 | 14.67 |
| 5 | 14.85 |
| 6 | 14.62 |
| 7 | 14.71 |
| 8 | 14.52 |
| 9 | 15.94 |
| 10 | 14.52 |
| 11 | 14.64 |
| 12 | 14.62 |
| 13 | 14.43 |
| 14 | 14.67 |
| 15 | 14.66 |
| 16 | 14.42 |
| Mean | 14.76 |
| STD | 0.37 |
| COV | 2% |
| Max | 15.94 |
| Min | 14.42 |
| Range | 1.52 |

FIG. 4G-1
CONTINUED

*Front view*

| Constraint | Min Value | Max Value | Location | Unit |
|---|---|---|---|---|
| Volumetric Flowrate | X | X<br>X | - | lpm |
| Minimum Velocity within main wall jet | X | X | X/X | m/s |
| Inlet Jet Height | X | Inf. | | mm |
| Uniformity Index h1 (xy-plane) | X | | X (X x X sq) | mm |
| Uniformity Index h2 (xy-plane) | X | | X (X x X sq) | mm |
| Uniformity Index h3 (xy-plane) | X | | X (X x X sq) | mm |
| Vortex/Recirculation | - inf | X | X | mm |
| Outlet Velocity Limit | X | X | - | m/s |
| | | - | - | |
| | | - | - | |

622

POWDER DELIVERY SYSTEM INCLUDING A RECOATER WITH A REMOVABLE CARTRIDGE

CROSS-REFERENCE TO RELATED APPLICATIONS

The present application is a Continuation-In-Part of U.S. patent application Ser. No. 19/053,193, entitle "POWDER DELIVERY SYSTEM" filed on Feb. 13, 2025, which claims the benefit of U.S. Patent Application No. 63/561,711, entitled "ADDITIVE MANUFACTURING SYSTEM" filed on 5 Mar. 2024, U.S. Patent Application No. 63/561,526, entitled "Z-AXIS LEVELING" filed on 5 Mar. 2024, U.S. Patent Application No. 63/561,549, entitled "ADAPTIVE BEAM CONTROL" filed on 5 Mar. 2024, U.S. Patent Application No. 63/561,580, entitled "DYNAMIC GAS FLOW SYSTEM FOR ADDITIVE MANUFACTURING" filed on 5 Mar. 2024, and U.S. Patent Application No. 63/561,714, entitled "POWDER DELIVERY SYSTEM" filed on 5 Mar. 2024, which are incorporated herein by reference in its entirety.

FIELD OF THE INVENTION

The present disclosure generally relates to additive manufacturing, and more particularly, to powder delivery systems used in additive manufacturing.

BACKGROUND

Traditionally, materials are processed into desired shapes and assemblies through a combination of rough fabrication techniques (e.g., casting, rolling, forging, extrusion, and stamping) and finish fabrication techniques (e.g., machining, welding, soldering, polishing). Producing a complex assembly in final, usable form ("net shape"), which often may require not only forming the part with the desired materials in the proper shapes but also providing the part with the desired combination of metallurgical properties (e.g., various heat treatments, work hardening, complex microstructure), typically requires considerable investment in time, tools, and effort.

One or more of the rough and finish processes may be performed using manufacturing centers, such as Computer Numerically Controlled (CNC) machine tools. CNC machine tools use precisely programmed commands to automate the manufacturing process. The commands may be generated using computer-aided design (CAD) and/or computer-aided manufacturing (CAM) programs. Examples of CNC machines include, but are not limited to, mills, lathes, mill-turns, plasma cutters, electric discharge machines (EDM), and water jet cutters. CNC machining centers have been developed which provide a single machine having multiple tool types that is capable of performing multiple different machining processes. Such machining centers may generally include one or more tool retainers, such as spindle retainers and turret retainers holding one or more tools, and a workpiece retainer, such as a pair of chucks. The workpiece retainer may be stationary or move (in translation and/or rotation) while a tool is brought into contact with the workpiece, thereby performing a subtractive manufacturing process during which material is removed from the workpiece.

Because of cost, expense, complexity, and other factors, additive manufacturing techniques have been developed that enable a new range of engineering freedom that was otherwise limited. Components with internally unreachable features can be produced and costs are similar despite ranges of complexity. In contrast to subtractive manufacturing processes, which focus on precise removal of material from a workpiece, additive manufacturing processes add material, typically in a computer-controlled environment, by creating successive layers of material to form a three-dimensional object. Additive manufacturing techniques may improve efficiency and reduce waste while expanding manufacturing capabilities, such as by permitting seamless construction of complex configurations which, when using conventional manufacturing techniques, would have to be assembled from a plurality of component parts. The opportunity for additive techniques to enable a new range of manufacturing depends on several factors, such as the range of materials available for use in the additive processes, the size and surface finish that can be achieved using additive techniques, and the rate at which material can be added. Additive processes may advantageously be capable of fabricating complex precision net-shape components ready for use. In some cases, however, the additive process may generate "near-net shape" products that require some degree of finishing. Additive manufacturing techniques include, but are not limited to, powder bed fusion processes such as laser sintering, laser melting, and electron beam melting.

Powder delivery systems for additive manufacturing processes typically include many components working together in series to deliver powder to the build chamber, such as augers, rollers, and linkages to move and spread metal powder from a tank adjacent to the build chamber. Previous powder delivery systems could be sources of problems because they rely on many components working in series, and the failure of one component leads to the failure of the powder delivery system as a whole. The reliability of a system using multiple parts in series is the product of the reliability of the subsystems. As the number of subsystems grows, the reliability of every subsystems must be ensured to prevent the failure of the larger system. It is advantageous to make the number of subsystems no greater than it needs to be to complete the desired task.

SUMMARY

Disclosed herein are approaches for addressing various of the problems and shortcomings of the state of the art, as identified above. More particularly, disclosed herein are powder delivery systems used in additive manufacturing.

According to a first embodiment of the present disclosure, there is provided a powder delivery system used in additive manufacturing, the powder delivery system comprising a powder hopper disposed on a frame of an additive manufacturing system, the powder hopper configured to contain a total volume of a material powder, a linear vibration system disposed on the frame and connected to the powder hopper, the linear vibration system configured to receive and transport a first portion of the total volume of the material powder from the powder hopper, a diverter connected to the linear vibration system, the diverter configured to receive the first portion of the total volume of the material powder from the linear vibration system and distribute the first powder portion into a second powder portion having a specific width, a doser connected to the diverter, the doser configured to receive the second powder portion from the diverter, separate the second powder portion into a plurality of doses, wherein each dose of the plurality of doses corresponds to a layer of the component to be manufactured, and deliver a first dose of the plurality of doses on the build platform, a recoater disposed on a build chamber of the additive manufacturing system, the recoater configured to distribute the first dose evenly on build platform, the recoater comprising a top part and a removable cartridge removably coupled to the top part, the removable cartridge configured to be removed from the top part and the build chamber for cleaning, a processor electronically coupled to the powder delivery system, and a memory unit coupled to the processor, the memory unit comprising stored instructions for controlling the powder delivery system.

BRIEF DESCRIPTION OF THE DRAWINGS

FIG. 3D-1 shows a perspective view of an exemplary embodiment of a build platform, a base, and a base platform according to an aspect of the additive manufacturing system.

FIG. 3D-2 shows a side view of an exemplary embodiment of a leveling cone according to an aspect of the additive manufacturing system.

FIG. 3D-3 shows a top view of an exemplary embodiment of a leveling cone according to an aspect of the additive manufacturing system.

FIG. 3D-4 shows a perspective view of the lower side of an exemplary embodiment of the build platform according to an aspect of the additive manufacturing system.

FIG. 4C-1 shows a perspective view of an exemplary embodiment of a powder hopper according to an aspect of the additive manufacturing system.

FIG. 4C-2 shows a perspective view of an exemplary embodiment of a powder hopper according to an aspect of the additive manufacturing system.

FIG. 4C-3 shows a perspective view of an exemplary embodiment of a powder hopper according to an aspect of the additive manufacturing system.

FIG. 4C-4 shows a perspective view of an exemplary embodiment of a powder hopper with positioning legs according to an aspect of the additive manufacturing system.

FIG. 4C-5 shows a perspective view of an exemplary embodiment of the stability base and the positioning feet positioned on the frame according to an aspect of the additive manufacturing system.

FIG. 4C-6 shows a perspective view of an exemplary embodiment of an electric-pneumatic connection box according to an aspect of the additive manufacturing system.

FIG. 4D-1 shows a diagram of an exemplary embodiment of a linear vibration (LV) system of the PSD system according to an aspect of the additive manufacturing system.

FIG. 4D-2 shows a perspective view of an exemplary embodiment of the LV system of the PSD system according to an aspect of the additive manufacturing system.

FIG. 4D-3 shows a perspective view of an exemplary embodiment of the vibratory feeder box of the PSD system according to an aspect of the additive manufacturing system.

FIG. 4F-1 shows a perspective view of an exemplary embodiment of a recoater of the PSD system according to an aspect of the additive manufacturing system.

FIG. 4F-2 shows a perspective view of an exemplary embodiment of a doser of the PSD system according to an aspect of the additive manufacturing system.

FIG. 4F-3 shows a perspective view of an exemplary embodiment of a doser of the PSD system according to an aspect of the additive manufacturing system.

FIG. 4F-4 shows a perspective view of an exemplary embodiment of a doser with an ultrasonic sprinkler of the PSD system according to an aspect of the additive manufacturing system.

FIG. 4F-5 shows a perspective view of an exemplary embodiment of a doser with an ultrasonic sprinkler of the PSD system according to an aspect of the additive manufacturing system.

FIG. 4F-6 shows perspective views of exemplary embodiments of perforated plates of the doser according to an aspect of the additive manufacturing system.

FIG. 4F-7 shows a perspective view of an exemplary embodiment of a recoater coupled to a doser according to an aspect of the additive manufacturing system.

FIG. 4F-8 shows an exemplary schematic with corresponding images of a recoater in action according to an aspect of the additive manufacturing system.

FIG. 4F-9 shows a perspective view of an exemplary embodiment of a recoater with a removable cartridge according to an aspect of the additive manufacturing system.

FIG. 4F-10 shows an exploded view of an exemplary embodiment of a recoater with a removable cartridge according to an aspect of the additive manufacturing system.

FIG. 4F-11 shows a perspective view of an exemplary embodiment of a recoater with a removable cartridge according to an aspect of the additive manufacturing system.

FIG. 4F-12 shows a perspective view of an exemplary embodiment of a recoater with a removable cartridge according to an aspect of the additive manufacturing system.

FIG. 4F-13 shows a cross-sectional view of an exemplary embodiment of a removable cartridge according to an aspect of the additive manufacturing system.

FIG. 4F-14 shows an exploded view of an exemplary embodiment of a removable cartridge according to an aspect of the additive manufacturing system.

FIG. 4F-15 shows a perspective of an exemplary embodiment of a build chamber when a powder recovery cycle is in motion according to an aspect of the additive manufacturing system.

FIG. 4G-1 shows a graph of experimental results of an exemplary embodiment of the PSD system according to an aspect of the additive manufacturing system.

FIG. 4G-2 shows a graph of experimental results of an exemplary embodiment of the PSD system according to an aspect of the additive manufacturing system.

FIGS. 6F1-6F4 show exemplary screenshots of outputs by the simulation presenting an optimized embodiment of the DGF system according to an aspect of the additive manufacturing system.

FIGS. 6G1-6G2 show perspective views of exemplary embodiments of the DGF system according to an aspect of the additive manufacturing system.

FIGS. 6H1-6H2 show exemplary screenshots of analysis by the simulation of the gas flow by embodiments of the DGF system of FIG. 6G1 with a lower gas inlet and an upper gas inlet according to an aspect of the additive manufacturing system.

FIG. 6H-3 shows an exemplary screenshot of analysis by the simulation of the gas flow from a top view by an embodiment of the DGF system according to an aspect of the additive manufacturing system.

FIGS. 6I-1-6I-2 show exemplary screenshots of analysis by the simulation of the gas flow by embodiments of the DGF system of FIG. 6G-2 with a gas flow only into a lower gas inlet according to an aspect of the additive manufacturing system.

FIGS. 6I-3-6I-4 show exemplary screenshots of analysis by the simulation of the gas flow by embodiments of the DGF system of FIG. 6G-2 with a gas flow only into an upper gas inlet according to an aspect of the additive manufacturing system.

FIGS. 6I-5-6I-6 show exemplary screenshots of analysis by the simulation of the gas flow by embodiments of the DGF system of FIG. 6G-2 with gas flow into an upper gas inlet and the bypass gas inlet according to an aspect of the additive manufacturing system.

FIGS. 6J-1-6J-2 show exemplary screenshots of analysis by the simulation of the gas flow by an embodiment of the DGF system of FIG. 6G-1 and an embodiment of the DGF system of FIG. 6G-2 according to an aspect of the additive manufacturing system.

FIGS. 6J-3-6J-4 show exemplary screenshots of analysis by the simulation of the gas flow by two different embodiments of the DGF system of FIG. 6G-2 according to an aspect of the additive manufacturing system.

FIGS. 6J-5-6J-6 show exemplary screenshots of comparison rendering output by the simulation of the gas flow by an embodiment of the DGF system of FIG. 6G-1 and an embodiment of the DGF system 600 of FIG. 6FG-2 according to an aspect of the additive manufacturing system.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description may include specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Figure 1:
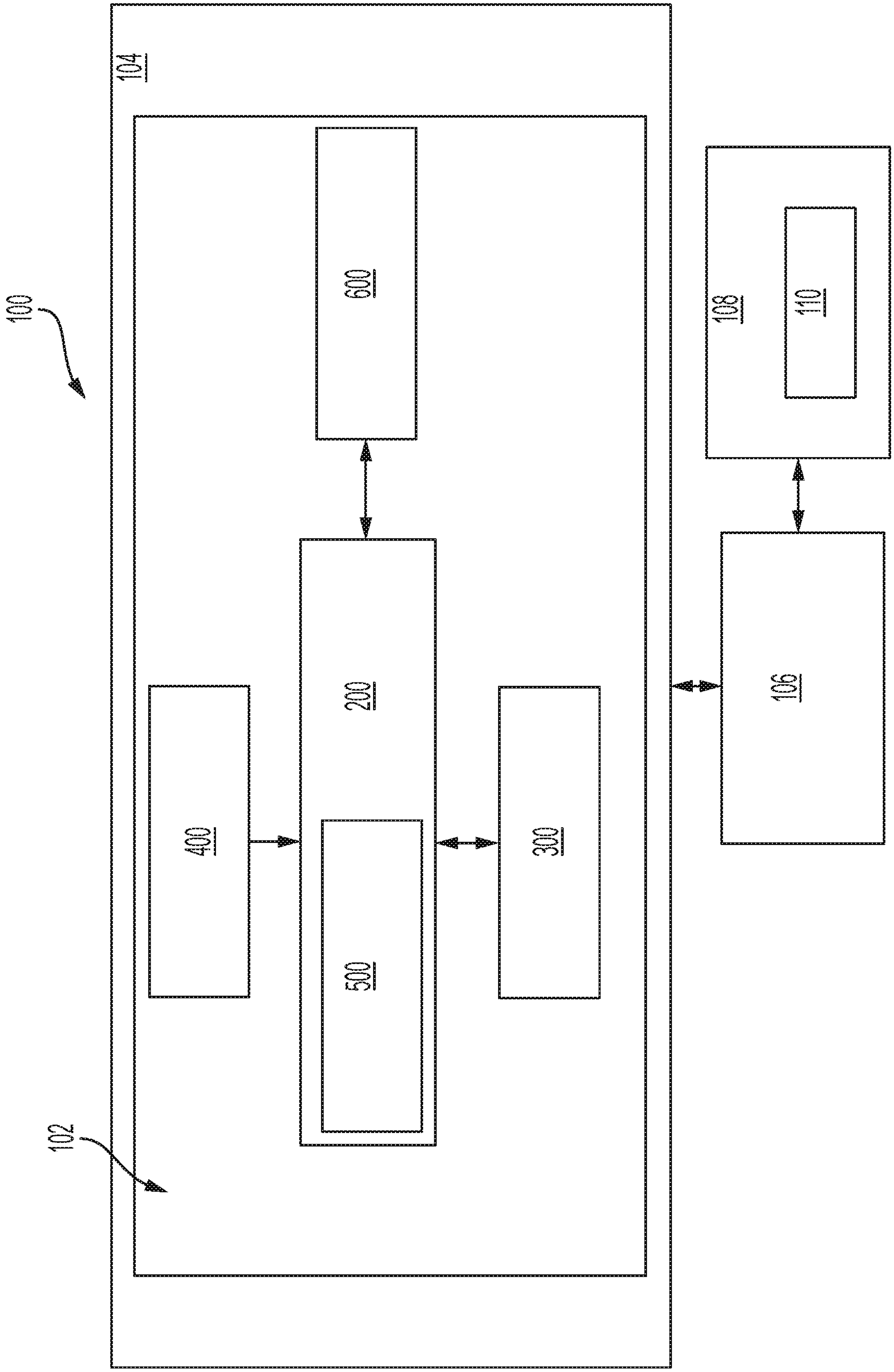
FIG. 1 shows a schematic of an exemplary aspect of an additive manufacturing system.

Referring to the drawings, FIG. 1 shows a schematic of an exemplary aspect of an additive manufacturing system 100. FIG. 1 also presents the primary structural components of the additive manufacturing system 100. These include a frame 104, an additive manufacturing machine 102 disposed on the frame 104, a processor 106 disposed on the frame 104 and electrically coupled to the additive manufacturing system 100, a memory unit 108 electrically coupled to the processor 106 and containing instructions 110 to control the additive manufacturing system 100. In some aspects of the additive manufacturing system 100, the additive manufacturing system 100 further includes an interactive display unit (not shown in figure) electrically coupled to the processor 106 and configured to allow a user to control the processor 106 via the interactive display unit. In some aspects of the additive manufacturing system 100, the interactive display unit is a touch-screen interface. In other aspects of the additive manufacturing system 100, the interactive display unit is a display unit with manual tactile functional actuators (e.g., a keyboard) for controlling the processor 106.

In the aspect of the additive manufacturing system 100 presented in FIG. 1, the additive manufacturing machine 102 includes a build chamber 200, a Z-axis levelling system 300 functionally connected to the build chamber 200, a powder delivery system 400 functionally connected to the build chamber 200, an adaptive laser beam control system 500 disposed within the build chamber 200, and a dynamic gas flow system 600 disposed on the build chamber 200. The additive manufacturing system 100 can include other components in addition to and is not limited to the components presented in FIG. 1.

The aspect of the additive manufacturing system 100 presented in FIG. 1 is configured to perform the steps to create successive layers of material to form a three-dimensional object, including: supplying material powder to be fused by the adaptive laser beam control system 500 through the powder delivery system 400 and uniformly spreading the material powder on the build platform by a recoater 410 (explained in other sections of the application) of the powder delivery system 400, maintaining an even layer of newly deposited material powder with the recoater 410, targeting a particular area on a build platform 302 (explained in other sections of the application) of the Z-axis leveling system 300 to fuse the material powder with the laser to create a first layer of the part being built, lowering the build platform 302, and spreading another layer of powder over the build platform 302 for the next layer of the part to be built.

Build Chamber

Figure 2A:
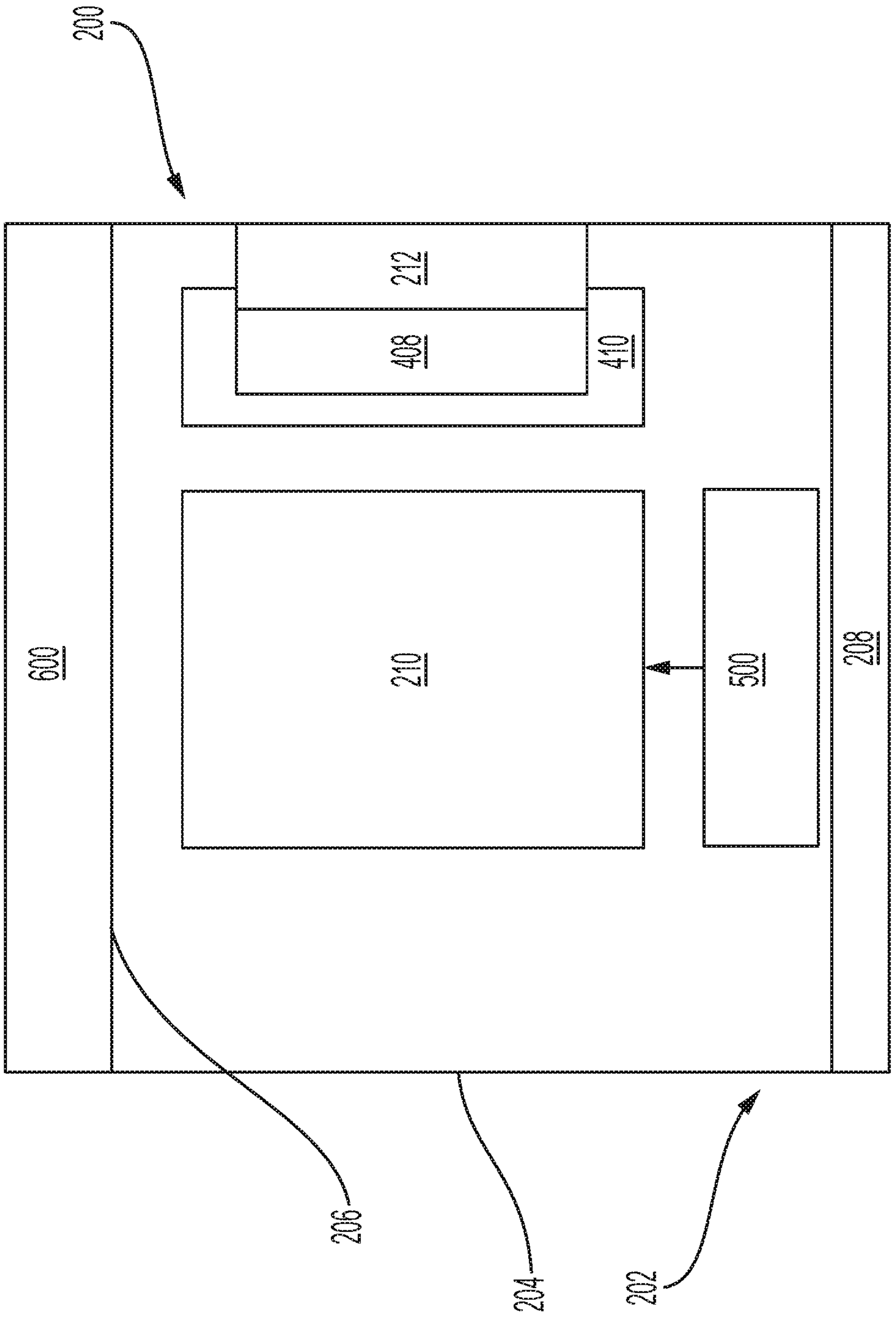
FIG. 2A shows a schematic top view of an exemplary embodiment of a build chamber according to an aspect of the additive manufacturing system.
Figure 2B:
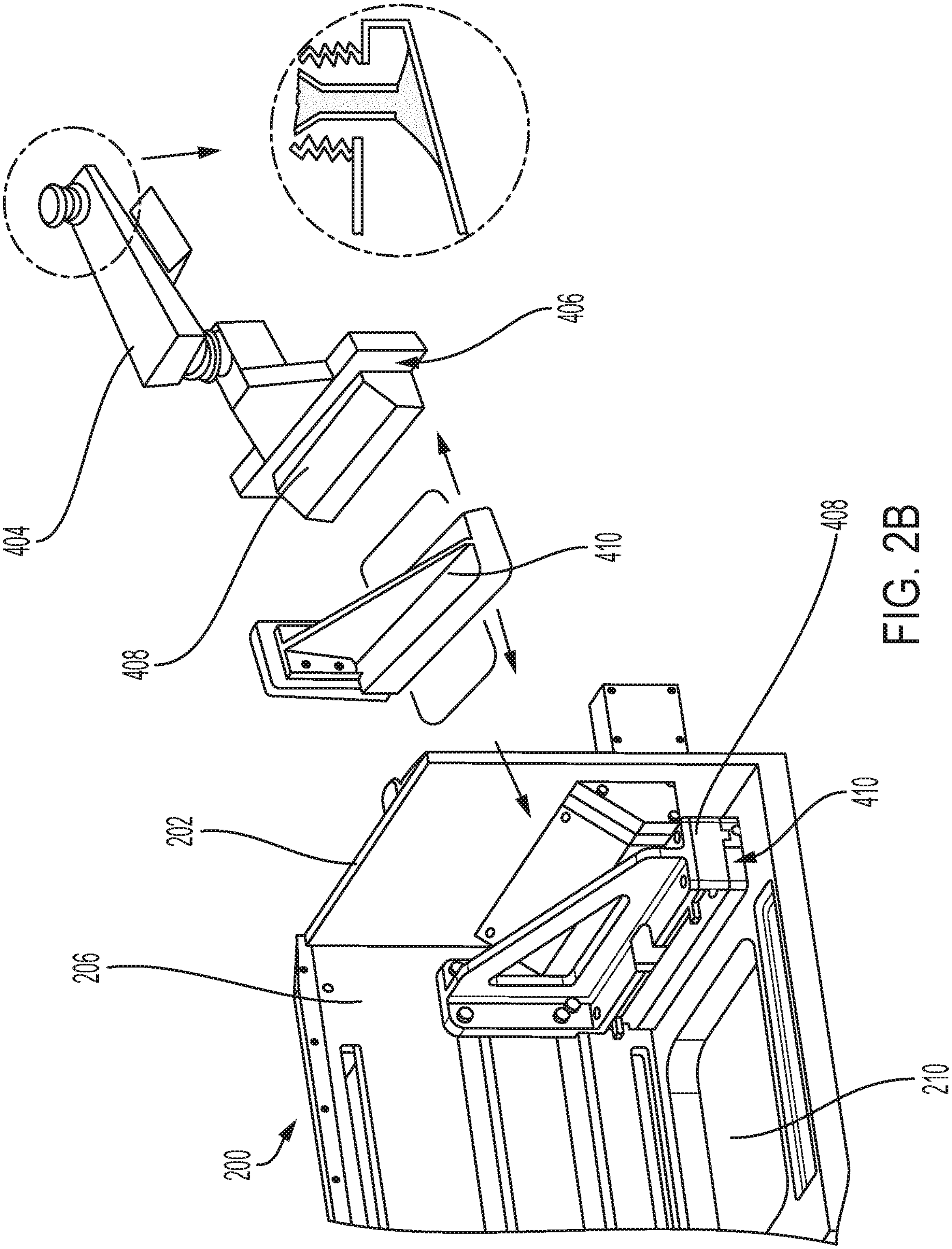
FIG. 2B shows a perspective view of an exemplary embodiment of a build chamber according to an aspect of the additive manufacturing system.

Referring to FIGS. 2A and 2B a schematic top view and a perspective view of an exemplary embodiment of the build chamber 200 according to an aspect of the additive manufacturing system 100, are shown respectively. The embodiment of the build chamber 200 of FIG. 2 includes a housing 202 defined by four walls 204 with each having an interior wall surface 206, a build platform opening 210 disposed on the housing 202 and configured to accommodate a build platform 302 of the Z-axis levelling system 300, and a door 208. In other embodiments of the build chamber 200, the housing 202 can include more than four wall 204.

In the embodiment of the build chamber 200 shown in FIGS. 2A and 2B, the housing 202 of the build chamber 200 accommodates the adaptive laser beam control system 500, the recoater 410, and a powder delivery system opening 212 present on a wall 204 of the housing 202, for connecting the diverter 406 to a doser 408. In some embodiments, the doser 408 can be mechanically connected to the recoater 410. In some embodiments, the doser 408 and recoater 410 are independent components which are not mechanically connected to each other. In the embodiment of the build chamber 200 disclosed in FIG. 2B, the walls 204 of the build chamber 200 can further be coupled to the dynamic gas flow system 600. The build chamber 200 of FIGS. 2A and 2B can further include a roof, a floor, and a plurality of inlets and outlets (not shown in the figure) to facilitate movement of gas for the dynamic gas flow system 600. In some embodiments of the build chamber 200, the build chamber 200 further includes a viewing window (not shown in figure) for the user to view the formation of the three-dimensional object being manufactured by the additive manufacturing system 100.

In some embodiments of the build chamber 200, the build chamber 200 can further include a plurality of sensors (e.g., temperature sensor, oxygen sensor, pressure sensor, etc) to monitor and provide build chamber environmental conditions (e.g., temperature, oxygen level, pressure) feedback data to the processor 106 for necessary adjustments. In some embodiments of the build chamber 200, the build chamber 200 is pressure sealed to a user-determined pressure threshold value. In this embodiment, the pressure inside the build chamber 200 is automatically maintained by a dynamic gas flow system 600 (controlled electrically by the processor 106) disposed on the build chamber 200 and the pressure inside the build chamber 200 is monitored by a pressure sensor in communication with the processor 106.

Z-Axis Leveling System

Figure 3A:
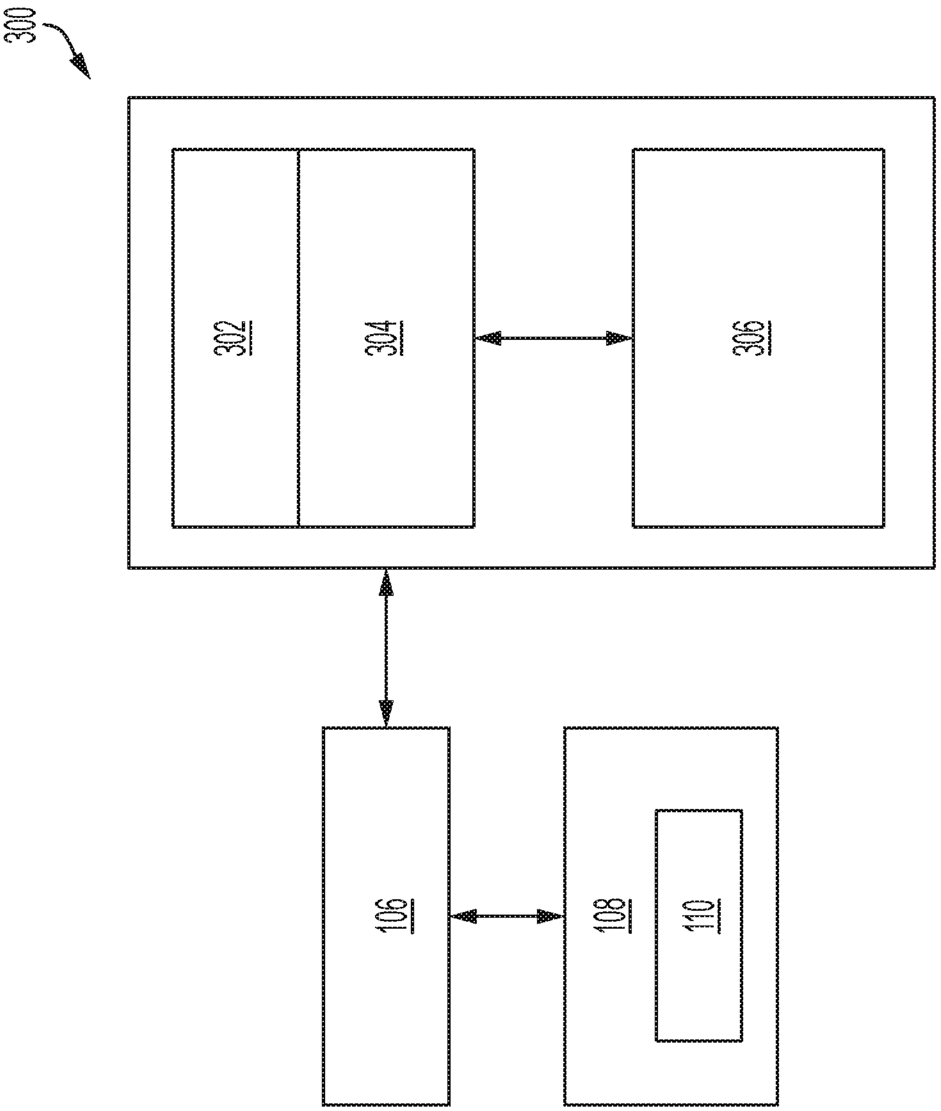
FIG. 3A shows a schematic of an exemplary embodiment of a Z-axis leveling system according to an aspect of the additive manufacturing system.
Figure 3B:
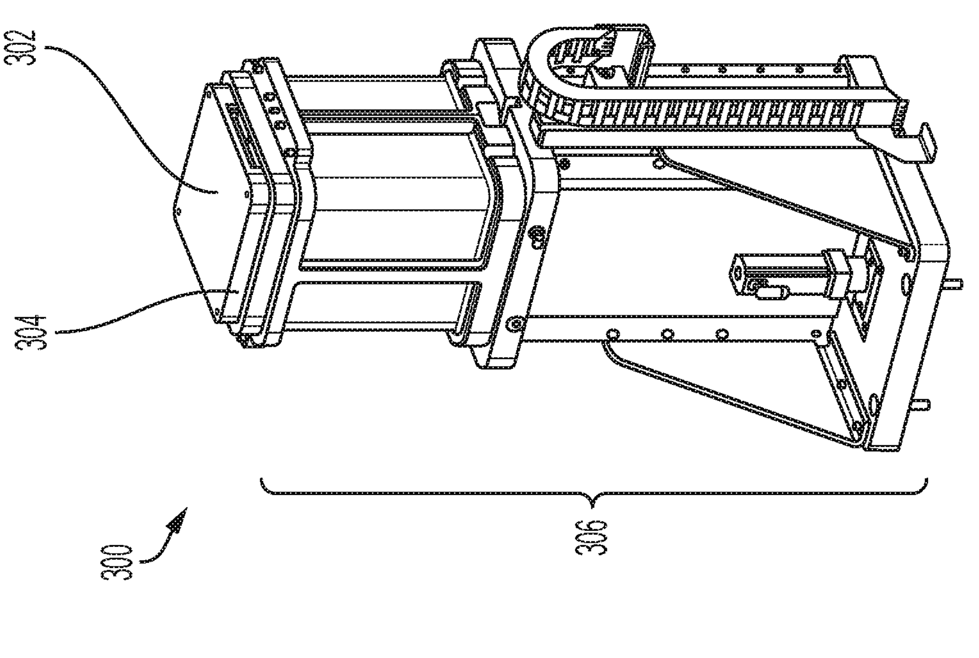
FIG. 3B shows a perspective view of an exemplary embodiment of a Z-axis leveling system according to an aspect of the additive manufacturing system.
Figure 3C:
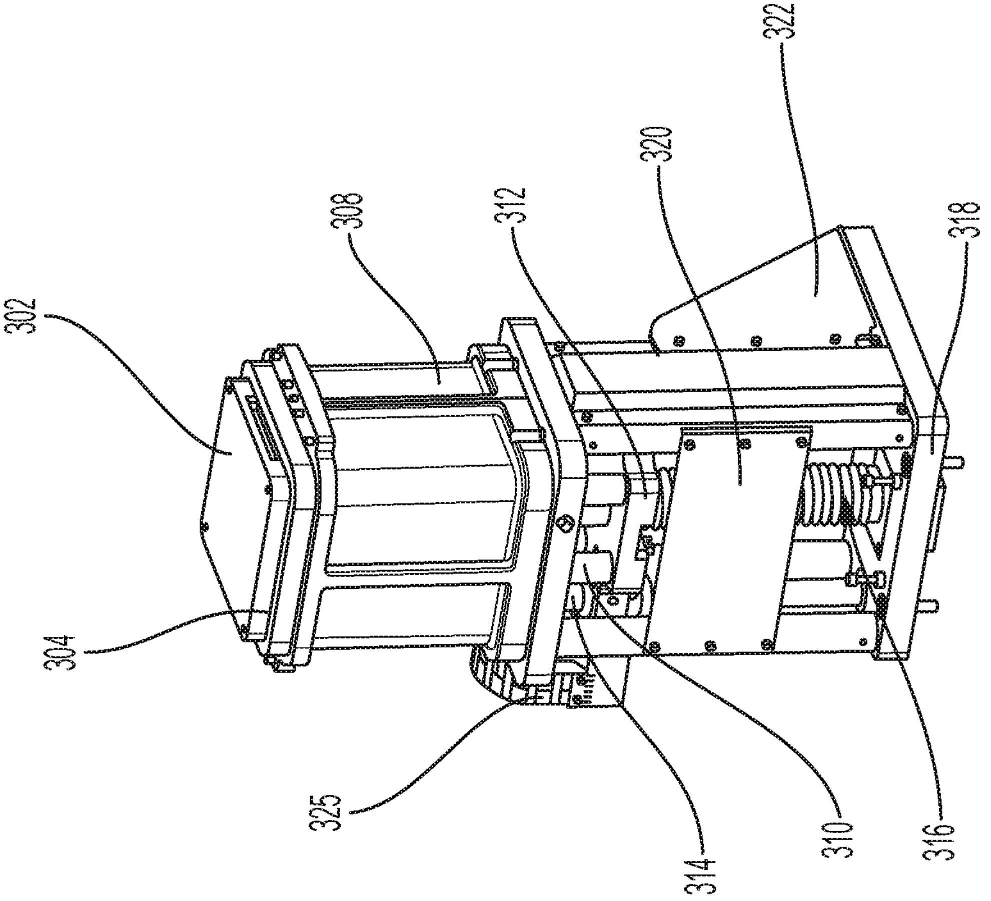
FIG. 3C shows a perspective view of an exemplary embodiment of a Z-axis leveling system according to an aspect of the additive manufacturing system.

Referring to FIGS. 3A, 3B and 3C, a schematic of an exemplary embodiment and perspective views of the Z-axis leveling system 300 according to an aspect of the additive manufacturing system 100 are shown. The disclosed aspect of the Z-axis leveling system 300 improves on conventional systems by reducing the time and skill required to achieve a level state of the build platform 302 and by reducing the part count and cost for building the Z-axis leveling system 300.

In the embodiment of the schematic of the Z-axis leveling system 300 presented in FIGS. 3A, 3B and 3C, the Z-axis leveling system includes a base 304, the build platform 302, and a vertical actuator 306 mechanically connected to the base 304. The movement of the vertical actuator 306 is controlled by the processor 106 unit connected to the additive manufacturing machine 102 (shown in FIG. 1). The Z-axis leveling system 300 of FIG. 3A is configured to move the build platform 302 in a Z-axis into the build chamber 200 through the build platform opening 210 (refer to FIG. 2) and support the build platform 302 when a component is being manufactured.

Referring to the embodiment of the Z-axis leveling system 300 presented in FIG. 3C, the Z-axis leveling system 300 further includes a Z-axis tunnel 308 configured to accommodate the movement of the build platform 302 by the vertical actuator 306. In the same embodiment, the vertical actuator 306 includes a height adjuster platform 318, at least one vertical guide 314 disposed on the height adjuster platform 318, a motorized transmission unit 316 disposed on the height adjuster platform 318 and connected to a vertical post platform 312, at least one vertical post 310 mechanically coupled to the vertical post platform 312 and a base platform 342 (not shown in the figure) connected to the base 304. This embodiment of the vertical actuator 306 includes an energy chain 325 configured for the movement of the vertical actuator 306, a Y-axis bracing cover plate 322 and an X-axis bracing cover plate 320, both configured to stabilize the Z-axis leveling system 300 during the vertical movement.

Figures 1, 3D:
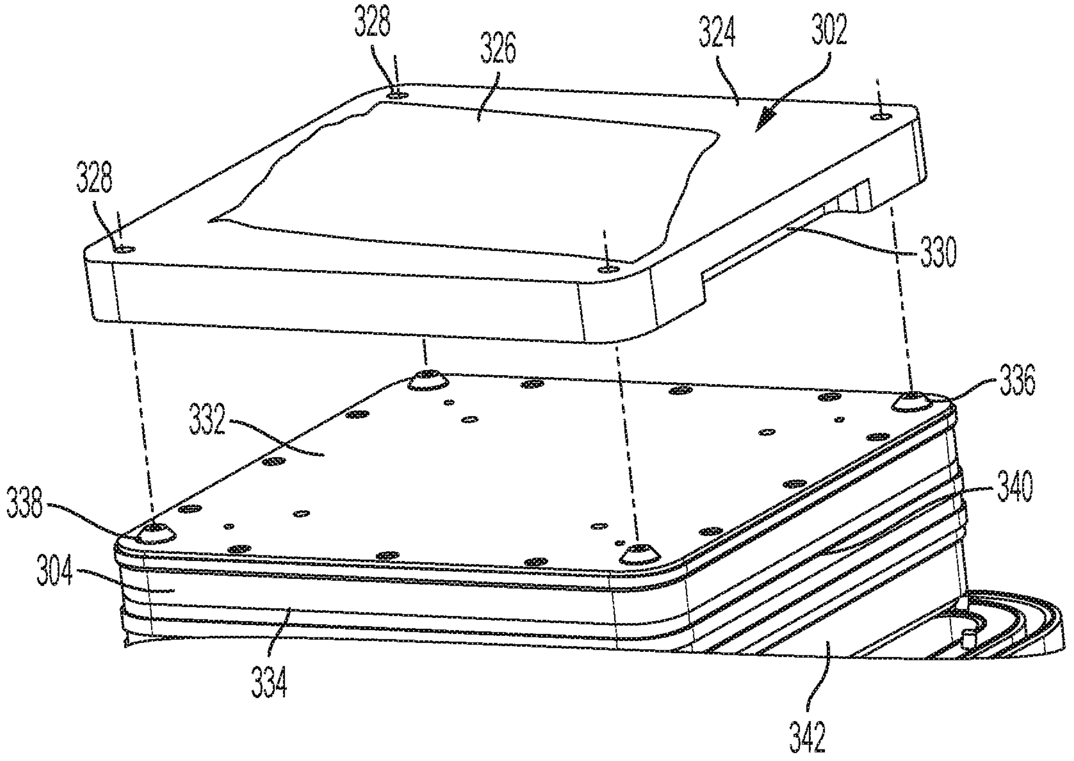

Referring to FIG. 3D-1, perspective views of the build platform 302, the base 304, and a base platform 342 according to an aspect of the additive manufacturing system 100 are shown. The build platform 302 includes an upper side 324, a lower side 356, and four thru-holes 328. In some embodiments, each of the four thru-holes 328 is disposed in a corner of the base 304. In the embodiment of the build platform 302 presented in FIG. 3D-1, the build platform 302 includes a powder bed 326 disposed on the upper side 324 of the build platform 302 on which the component is built. The lower side 356 of the build platform 302 is connected to a first side 332 of the base 304 via leveling cones 336 disposed on each corner of the base 304. In this embodiment, a vertical axis of the leveling cone 336 is configured to be co-axial with the thru-holes 328 of the build platform 302. The build platform 302 further includes at least one handle 330 disposed on the build platform 302 for a user to grip and remove the build platform 302 from the base 304. In the embodiment of base 304 presented in FIG. 3D-1, a second side 334 of the base 304 is mechanically coupled to the vertical actuator 306 via the base platform 342. In some embodiments of the base platform 342, the base platform 342 can include multiple detachable layers 340, which can be added or removed to adjust the height of the base platform 342. In the embodiments presented in FIG. 3C1, the base 304, connected to the vertical actuator 306 via the base platform 342, is configured to lower the build platform

302 before each new layer of material powder is added to the powder bed 326 disposed on the upper side 324 of the base platform 342.

Figures 3, 3D:
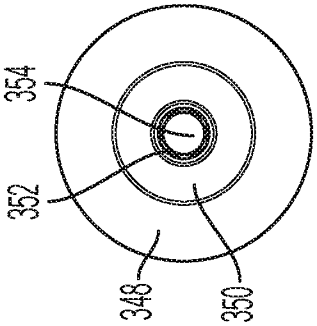
Figures 2, 3D:
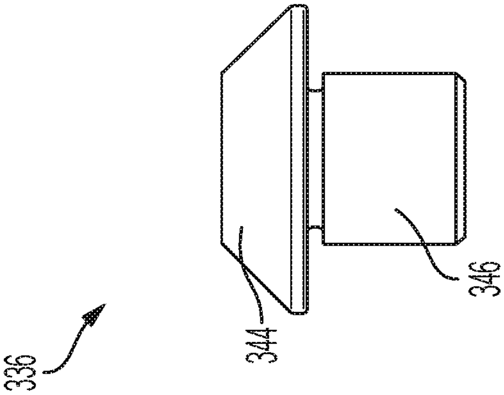

The base 304 includes leveling cones 336 disposed in leveling corner threads 338 present in each corner as shown in FIG. 3D-1. In some embodiments, the base 304 can further include additional leveling cones 336 disposed along the first side 332 of the base 304. FIGS. 3D-2 and 3D-3 present side and top views of an exemplary embodiment of a leveling cone 336 according to an aspect of the additive manufacturing system 100. The leveling cone 336 includes an upper portion 344 with a crowned surface 348 and a cylindrical lower portion 346 attached to the conical upper portion 344. In the embodiment of the leveling cones 336 presented in FIGS. 3D-2 and 3D-3, the upper portion 344 is conically shaped. The crowned surface 348 is slightly convex to allow for greater contact area with the corresponding leveling locator cavities 358 (refer to FIG. 3D-4) disposed on the lower side 356 of the build platform 302. In this embodiment of the leveling cone 336, the upper portion 344 of the leveling cone 336 further includes a flat surface 350 surrounding an opening 354 extending the along the axis of the leveling cone 336. In the embodiment presented in FIGS. 3D-2 and 3D-3, the opening 354 includes a leveling portion 352 that allows the leveling cone 336 to be raised or lowered. In some embodiments of the leveling cone 336, the leveling cone 336 can be raised or lowered via rotating a hex key placed in the opening 354. In some embodiments of the leveling cone, the leveling portion 352 can include a threaded interior surface configured to secure the build platform 302 to the base 304 via a bolt (not shown in figure). In other embodiments of the leveling cone 336, the opening 354 can accommodate a bolt configured to be tightened to a threaded surface in the leveling cone threads 338 disposed on the base 304.

Figures 3, 3D, 4:
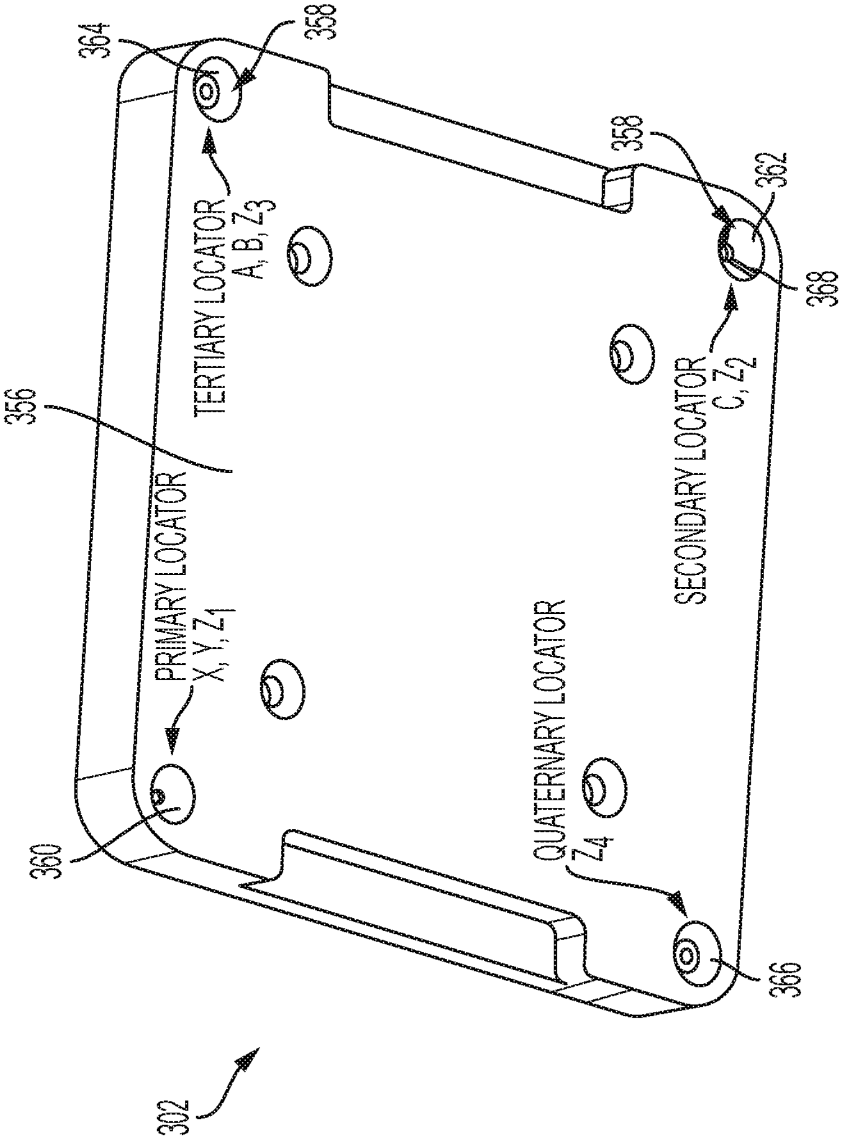

Referring to FIG. 3D-4, a perspective view of the lower side 356 of an exemplary embodiment of the build platform 302 according to an aspect of the additive manufacturing system 100 is shown. In this embodiment, the lower side 356 of the build platform 302 includes leveling locator cavities 358 in each of the four corners of the build platform 302. In this embodiment, the lower side 356 of the build platform 302 further includes additional leveling locator cavities 358 along the perimeter or within the interior surface area. In some embodiments, the leveling locator cavities 358 can correspond to the locations and sizes of the leveling cones 336 on the base 304.

In FIG. 3D-4, four embodiments of the leveling locator cavities 358 are shown. The four embodiments of the leveling locator cavities 358 shown include a primary locator 360, a secondary locator 362, a tertiary locator 364, and a quaternary locator 366. The tertiary locator 364 and quaternary locator 366 each can be slightly oversized compared to their corresponding leveling cones 336 so predominately the tops/ends of their corresponding leveling cones 336 contact the tertiary locators 364 and quaternary locators 366. In the embodiment of the base shown in FIG. 3D-4, the tertiary locator 364 and quaternary locator 366 can be used for z-axis leveling only. In some embodiments of the build platform 302, the primary locators 360 and secondary locators 362 can be used for placing the build platform 302 in the X-axis and Y-axis directions. In some embodiments of the build platform 302, the build platform 302 can be easily removed to be machined flat.

In the embodiment of the build platform 302 shown in FIG. 3D-4, the secondary locator 362 includes extension slots 368 to make the locator cavity 358 not exactly circular, but rather an elongated cone. The elongated cone allows additional room for fitting the build platform 302 on the levelling cones 336. The extension slot 368 is configured to be aligned along a diagonal to maximize the elongated portion of the levelling cone 336 in the direction the build platform 302 may need to move (i.e. opposite the primary locator 360).

Referring to FIGS. 3D-3 and 3D-4, the crowned surface 348 of the leveling cone 336, the elongation of the secondary locator 362, and the enlarged locator cavities 358 (i.e., tertiary locator 364 and quaternary locator 366) can be configured to permit a looser tolerance on the machined center-to-center distances for the leveling cones 336 and the locator cavities 358.

In some embodiments of the build platform 302, the build platform 302, after being through many build cycles, can be subject to warping, and may need to be machined flat. The crowned surface 348 of the leveling cone 336, shown in FIG. 3D-3, provides greater contact area with the corresponding leveling locator cavities 358 even during warpage of the build platform 302.

Installing the build platform 302 shown in FIG. 3D-4 onto the base 304 via the leveling cone 336 shown in FIG. 3D-3 to achieve a level state includes the steps of placing the primary locator 360 over its corresponding leveling cone 336 first and placing the secondary locator 362 placed over its corresponding leveling cone 336 with the aid of the extension slots 368 present in the secondary locator 362. In these embodiments, the height of the leveling cone 336 can be increased or decreased with a hex key and checked with a gage block placed on the build platform 302 to give feedback when adjusting the height of the leveling cone 336. In some embodiments, the entire process to reach a level state can be configured to achieved in approximately 15 minutes. The leveling process can eliminate the need to place and remove the build platform 302 multiple times during leveling. In some embodiments, the build platform 302 can be placed and then leveled without any need to remove the build platform 302 until after the additive manufacturing processes is completed. The disclosed leveling process can advantageously eliminate the need for quantitative measurement during leveling and the use of numbers or calculations to adjust the build platform 302 to level.

Referring now to FIGS. 3E-3H, perspective views of various components of an exemplary embodiment of the vertical actuator 306 are shown.

Figure 3E:
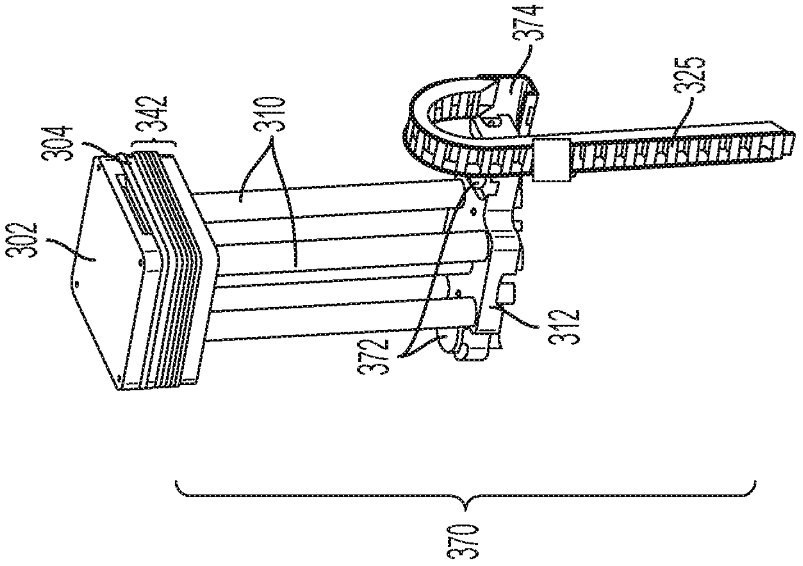
FIG. 3E shows a perspective view of an exemplary embodiment of a height adjuster according to an aspect of the additive manufacturing system.

FIG. 3E presents a perspective view of an exemplary embodiment of a height adjuster 370 of the build platform 302 according to an aspect of the additive manufacturing system 100. In the embodiment of the height adjuster 370 presented in FIG. 3E, the height adjuster 370 includes a base platform 342 mechanically connected to the base 304 and build platform 302, vertical posts 310 connecting the base platform 342 to the vertical post platform 312, vertical guide bearings 372 disposed on the vertical post platform 312 and the energy chain 325 secured in a cable management bracket 374 during height adjustment via a motorized transmission unit 316 (not shown in FIG. 3E). The height adjuster 370 can include other components in addition to and is not limited to the components presented in FIG. 3E.

Figure 3F:
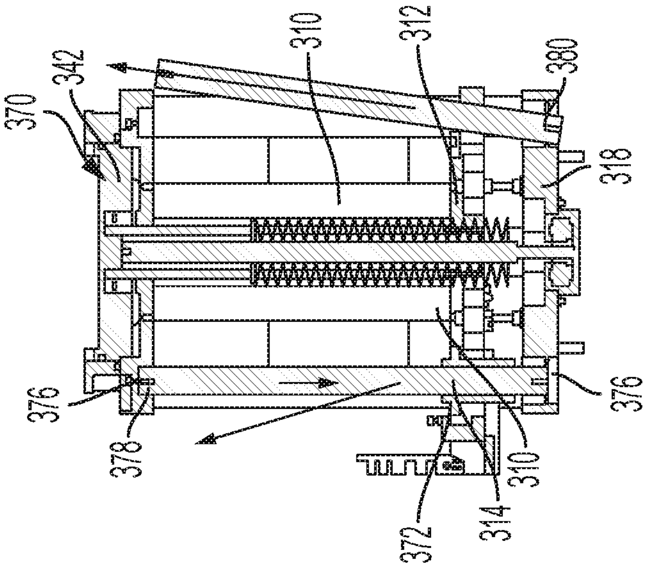
FIG. 3F shows a perspective view of an exemplary embodiment of a vertical actuator with vertical guides according to an aspect of the additive manufacturing system.

Referring now to FIG. 3F, a perspective view of an exemplary embodiment of the vertical actuator 306 with vertical guides 314 is shown. In the embodiment of the height adjuster 370 shown in FIG. 3E, the upper ends 378 of vertical guides 314 are connected to the base platform 342 via vertical guide connectors 376 and the bottom ends 380 of the vertical guides 314 are connected to the height adjuster platform 318 via the vertical guide connectors 376. In the same embodiment of FIG. 3F, the vertical guides 314 are configured to fit through the vertical guide bearings 372 disposed on the vertical post platform 312. This enables and restricts the vertical movement of the vertical post platform 312 along the length of the vertical guides 314 leading to the height adjustment. In some embodiments, the vertical guides 314 are detachably connected to the vertical guide connectors 376 and can be removed for replacement.

Figure 3G:
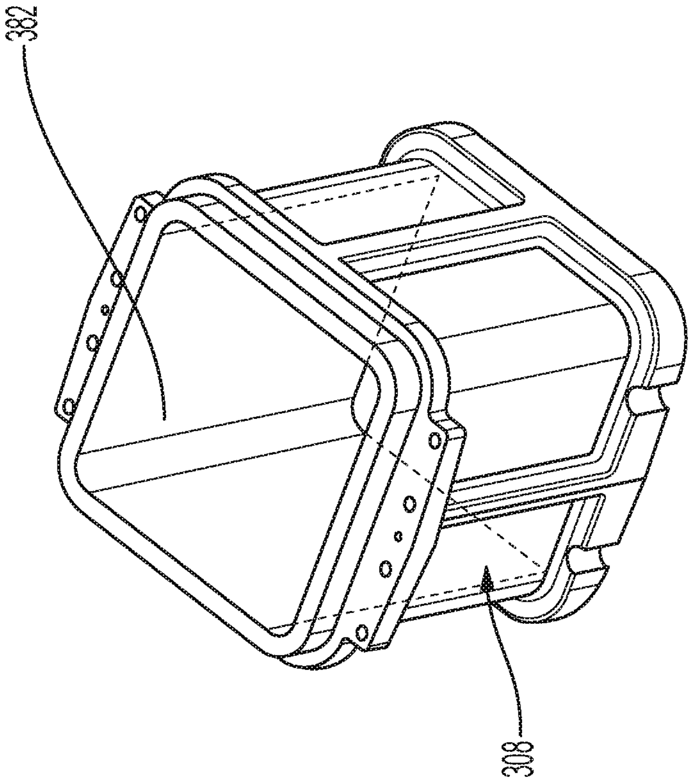
FIG. 3G shows a perspective view of an exemplary embodiment of a leveling system tunnel according to an aspect of the additive manufacturing system.

Referring now to FIG. 3G, a perspective view of an exemplary embodiment of a Z-axis tunnel 308 is shown. In the embodiment of the Z-axis tunnel 308 shown in FIG. 3G, the Z-axis tunnel 308, comprising an interior wall 382, is configured to allow the build platform 302, base 304, base platform 342, and vertical posts 310 to vertically translate across a length of the Z-axis tunnel 308. In some embodiments, the Z-axis tunnel 308 is made of a single-piece molded material. In some embodiments, the Z-axis tunnel 308 is made of a single-piece machine cut heat-resistant metal. In some embodiments, the interior wall 382 of the Z-axis tunnel 308 is surface treated to allow smoother vertical translation of the height adjuster 370 across a length of the Z-axis tunnel 308.

Figure 3H:
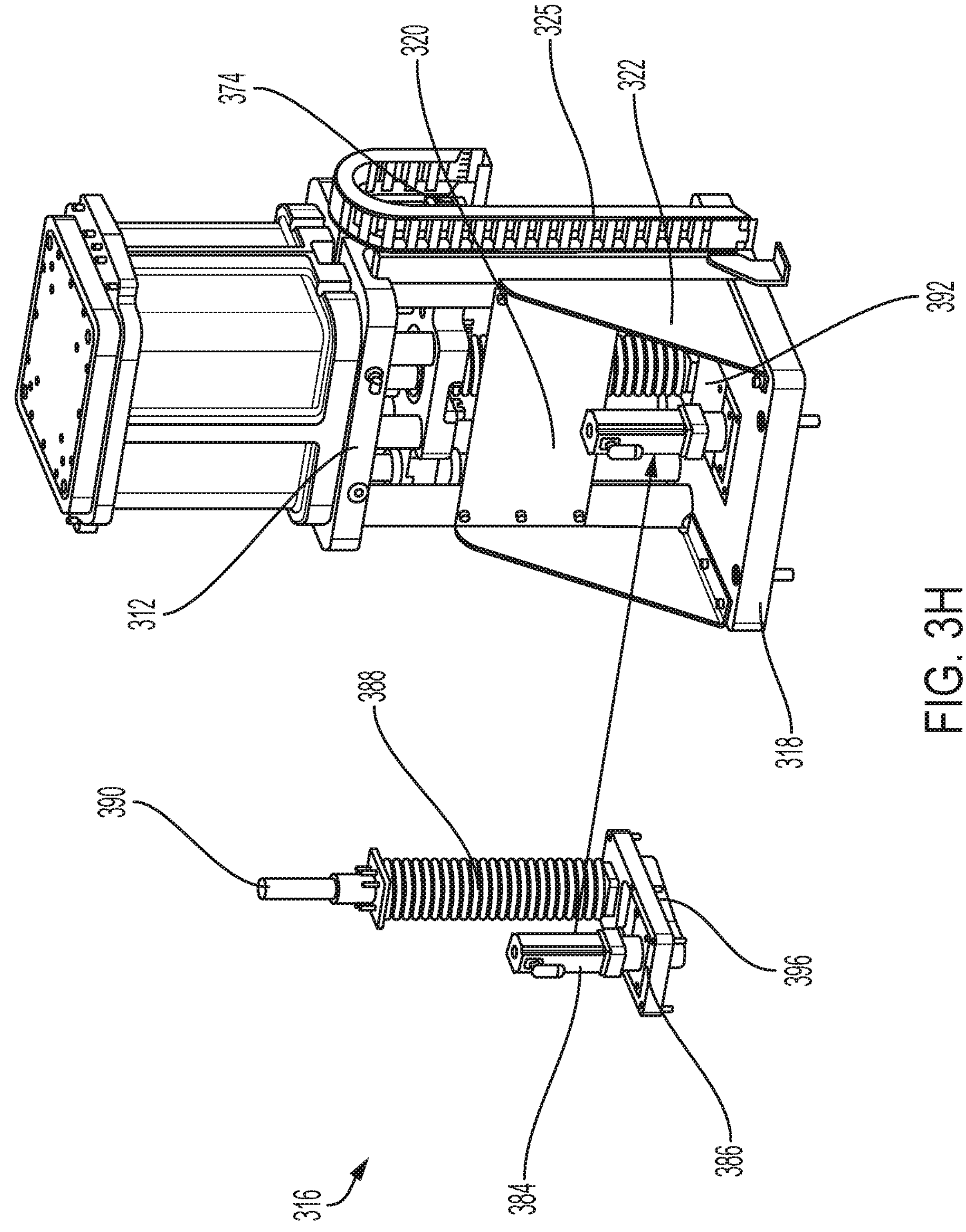
FIG. 3H shows a perspective view of an exemplary embodiment of a motorized transmission unit according to an aspect of the additive manufacturing system.

Referring now to FIG. 3H, a perspective view of an exemplary embodiment of the motorized transmission unit 316 is shown. In this embodiment, the motorized transmission unit 316 includes a motor 384 disposed on a transmission subassembly base 386, a ball screw 390, and bellows cover 388. Motor 384 is connected to ball screw 390 by a belt 396, where motor 384 adjusts a vertical height of ball screw 390 through the belt 396. The movement of the ball screw 390 can result in vertical movement of the vertical post platform 312 and base platform 342, leading to the height adjustment of build platform 302. In the same embodiment, ball screw 390 is mechanically connected to the vertical post platform 312. In various embodiments of the motorized transmission unit 316, actuating the motor 384 can result in the movement of the ball screw 390 which in turn causes the vertical translation of the vertical post platform 312 along the length of the vertical guides 314. In this embodiment, the motorized transmission unit 316 is configured to removably fit into the height adjuster platform 318.

In previous Z-axis leveling system, the motorized transmission unit was only accessible through an access panel and could not be removed as a unit. The embodiment of the motorized transmission unit 316 shown in FIG. 3H is easily removed as a unit from the base assembly, as is shown in FIG. 3G. The motorized transmission unit 316 can therefore have the belt 396 pre-tensioned before being installed to reduce installation and setup time. Further, once the motorized transmission unit 316 is disconnected from height adjuster platform 318, it can lift itself out of the height adjuster platform 318 if the top portion of the motorized transmission unit 316 is bolted to vertical post platform 312. This is advantageous because the motorized transmission unit 316 is heavy and this feature allows easier access to the belt 396 underneath, especially when the additive manufacturing system is at customer locations.

In the embodiment of the motorized transmission unit 316 shown in FIG. 3H, the motorized transmission unit 316 further includes a transmission subassembly cover plate 392 to secure the motorized transmission unit 316 in the height adjuster platform 318. In some embodiments of the motorized transmission unit 316, the transmission subassembly cover plate 392 can be secured to the height adjuster platform 318 with countersunk screws (not shown in FIG. 3H).

Powder Supply and Delivery System

Figure 4A:
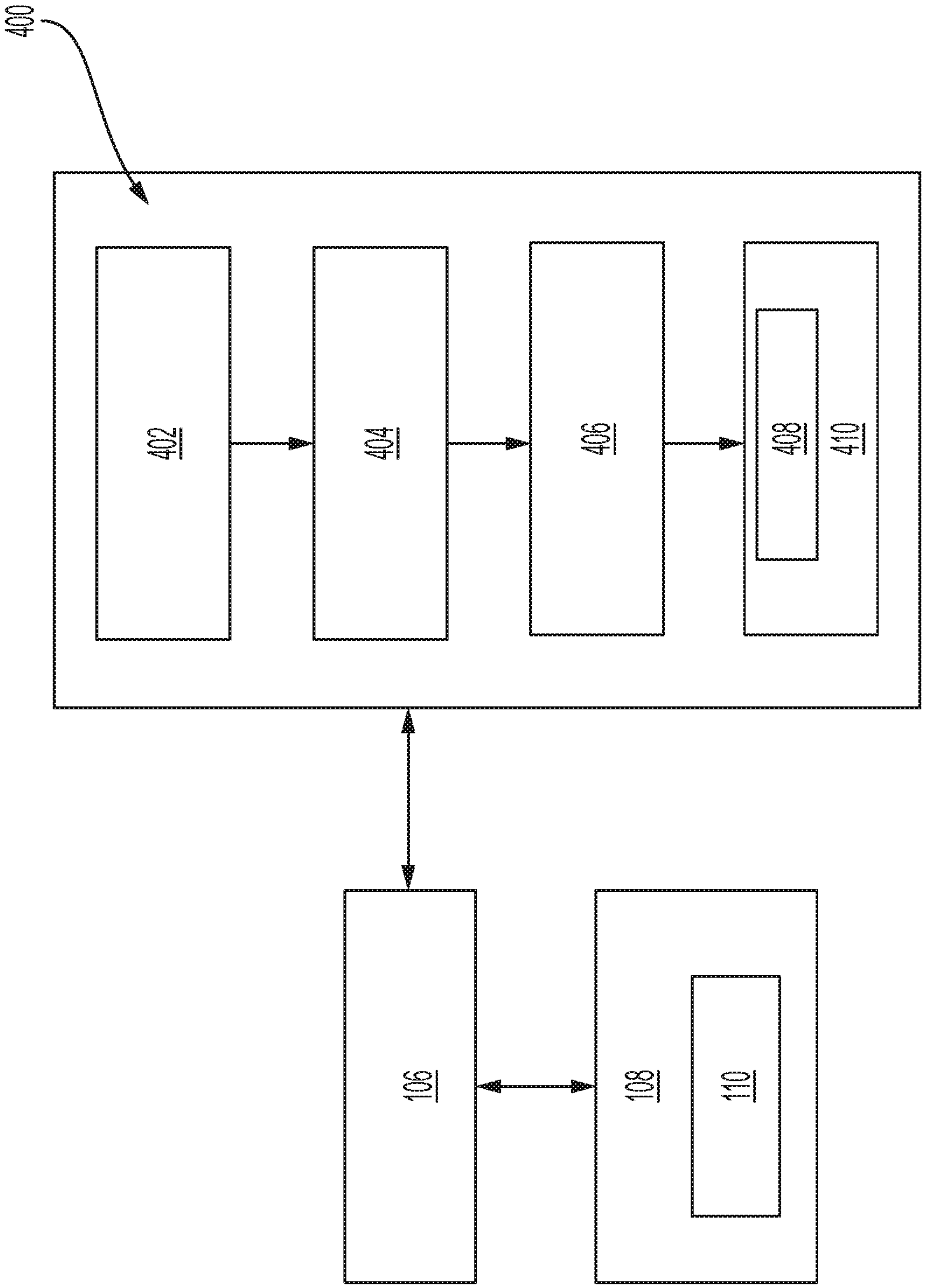
FIG. 4A shows a schematic of an exemplary embodiment of a powder supply and delivery (PSD) system according to an aspect of the additive manufacturing system.

Referring to the drawings, FIG. 4A shows a schematic of an exemplary embodiment of a powder supply and delivery (PSD) system 400 according to an aspect of the additive manufacturing system 100. The PSD system 400 of FIG. 4A is configured to supply material powder to the build platform 302 of the Z-axis leveling system 300 needed to create successive layers of material to manufacture a three-dimensional object. FIG. 4A also presents the primary structural components of an embodiment of the PSD system 400. These include a powder hopper 402, a linear vibration system 404, a diverter 406, a doser 408, and a recoater 410. The PSD system 400 is also electrically coupled to the processor 106, where the memory unit 108 coupled to the processor 106 includes the instructions 110 to control the PSD system 400. The PSD system 400 presented in this disclosure aims to reduce the number of subsystems working in series to improve reliability of the powder supply to the build platform 302. The PSD system 400 can include other components in addition to and is not limited to the components presented in FIG. 4A.

In the aspect of the PSD system 400 and the embodiments of the components of the PSD system 400 discussed in FIGS. 4A-4G-2, the PSD system 400 is configured to have a powder hopper 402 (discussed below) located above the build platform 302 so the delivery of the material powder to manufacture the three-dimensional component could be supplied to the build platform 302 utilizing gravity.

Figure 4B:
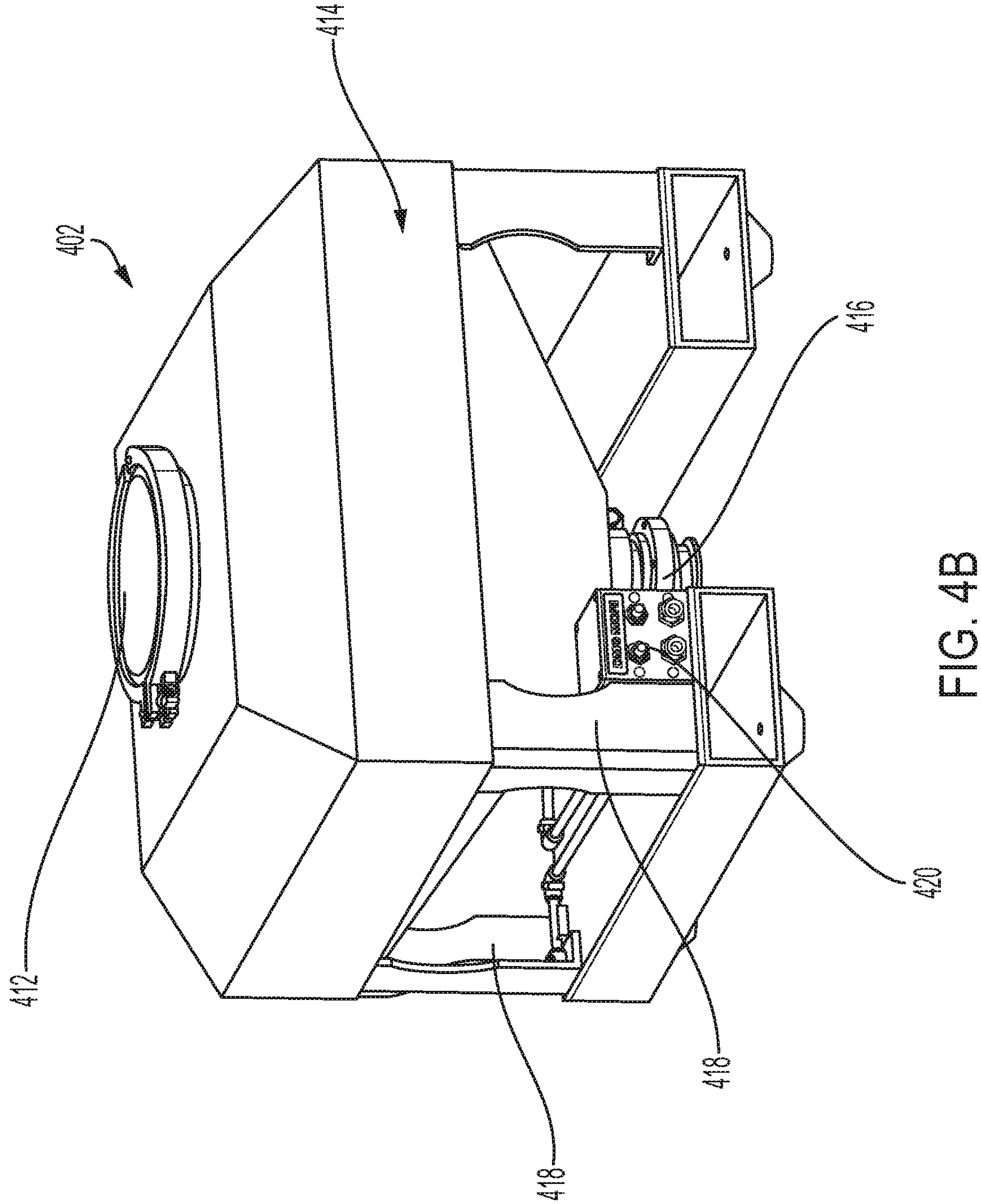
FIG. 4B shows a perspective view of an exemplary embodiment of a powder hopper positioned on the frame according to an aspect of the additive manufacturing system.

Referring now to FIG. 4B, a perspective view of an exemplary embodiment of a powder hopper 402 positioned on the frame 104 is shown. In this embodiment, the powder hopper 402 includes a body 414 with an inlet 412 for filling the powder hopper 402 with the material powder and an outlet 416 for delivery of the material powder from the powder hopper 402, positioning legs 418 disposed on the body 414, and an electric-pneumatic connection box 420 electrically connected to the processor 106 and the outlet 416 to control the operations of the powder hopper 402. In some embodiments, the positioning legs 418 of the powder hopper 402 can be configured to be removably connected to the frame 104 of some aspects of the additive manufacturing system 100. In this embodiment of the powder hopper 402 shown in FIG. 4B, the powder hopper 402 is configured to hold an increased volume of the material powder, increased angle for reliable material powder delivery via the outlet 416, and improved aesthetics as discussed in the below paragraphs. In the embodiment of the powder hopper 402 presented in FIG. 4B, the powder hopper 402 can be configured to have a volume of 60 L for containing the material powder.

Typically, the material powder can have a tendency to be stuck in the corners of the interior walls of the powder hopper 402. In order to prevent the latter and to ensure that a usable volume of the material powder in the powder hopper 402 is close to the volume of the material powder contained in the powder hopper 402, in the embodiments of the powder hopper 402 presented in FIGS. 4C-1-4C-3, a corner formed by the interior walls 422 of the powder hopper can be configured to have a compound angle that is less than a flat wall angle of the interior walls 422. In some embodiments, the compound angle is configured to be 35° for reliable emptying of the material powder from the powder hopper.

In some embodiments of the powder hopper 402, the powder hopper 402 can have increase compound angles and wall angles with increased number of interior walls 422. In the embodiment of the powder hopper 402 presented in FIG. 4C-3 has 8 interior walls 422. In some embodiments of the powder hopper 402, the powder hopper 402 can include more than 8 interior walls (i.e., 10, 12, 16, 18, 20 or more interior walls). The compound angle of a truncated pyramid approaches the flat angle as the number of interior walls 422 increase, with infinite interior walls 422 creating a cone. In some embodiments of the powder hopper 402, the number of interior walls 422 can be increased by adding inserts. In some embodiments (such as the embodiment of FIG. 4C-3), the powder hopper 402 can be configured to have 8 interior walls 422 as the preferred embodiment to increase the compound angle with only a slight increase in the flat wall angle, resulting in improved material powder emptying. In the embodiments of the powder hopper 402 presented in FIGS. 4C-1-4C-3, the powder hopper 402 further includes a flow controller 424 disposed at the outlet 416 to regulate the flow of the material powder.

Figures 3, 4C:
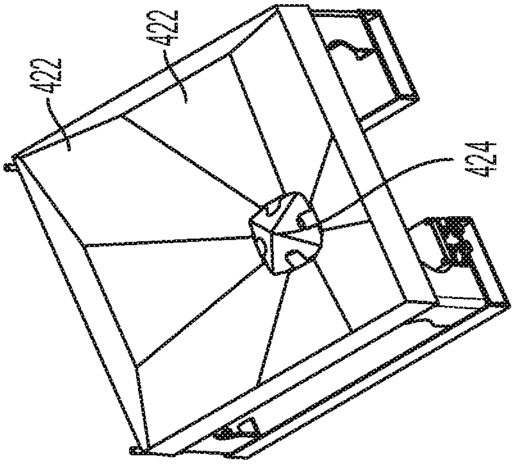
Figures 2, 4C:
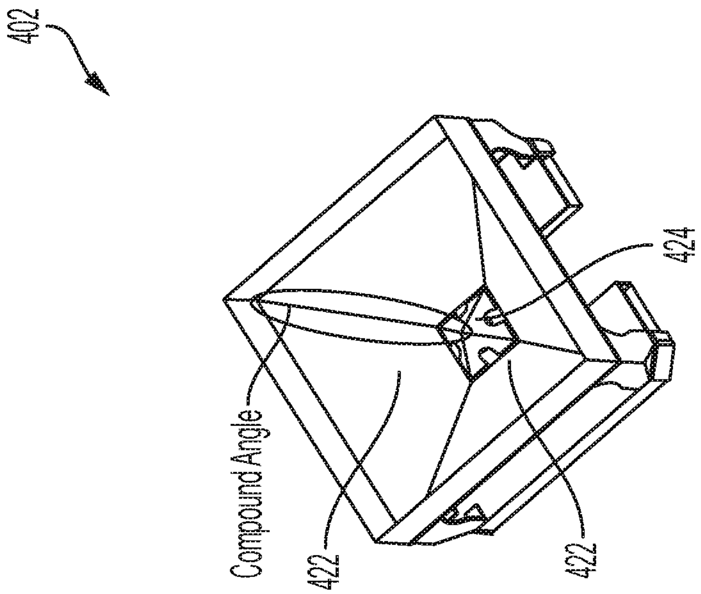
Figures 1, 4C:
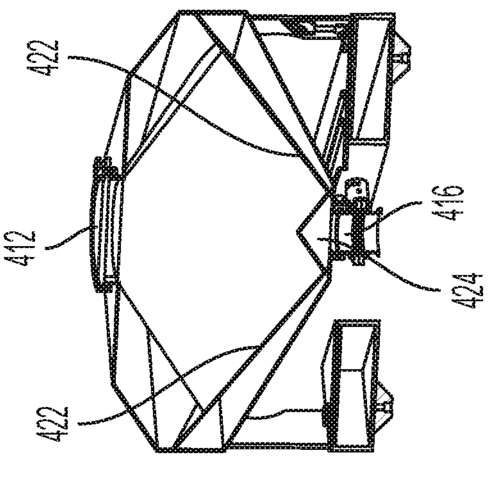
Figures 4, 4C:
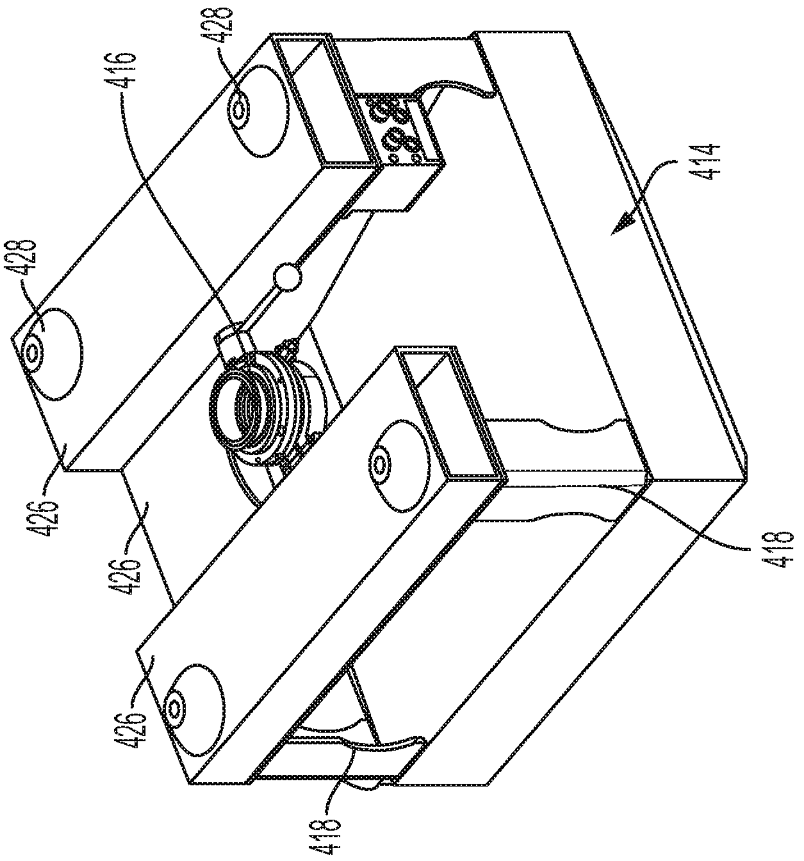

Referring to FIG. 4C-4, a perspective view of an exemplary embodiment of a powder hopper 402 with positioning legs 418 is shown. In this embodiment, the positioning legs 418 are disposed on the body 414 of the powder hopper 402. In the embodiment of the FIG. 4C-4, the powder hopper 402 includes four positioning legs 418 coupled to a stability base 426 and four positioning feet 428, corresponding to each of the four positioning legs 418, disposed on the stability base 426. The positioning feet 428 are configured to fit the powder hopper 402 on the frame 104. In this embodiment of the powder hopper 402 shown in FIG. 4C-4, the positioning feet 428 enable the powder hopper 402 to be removably coupled to the frame 104.

Figures 4, 4C, 5:
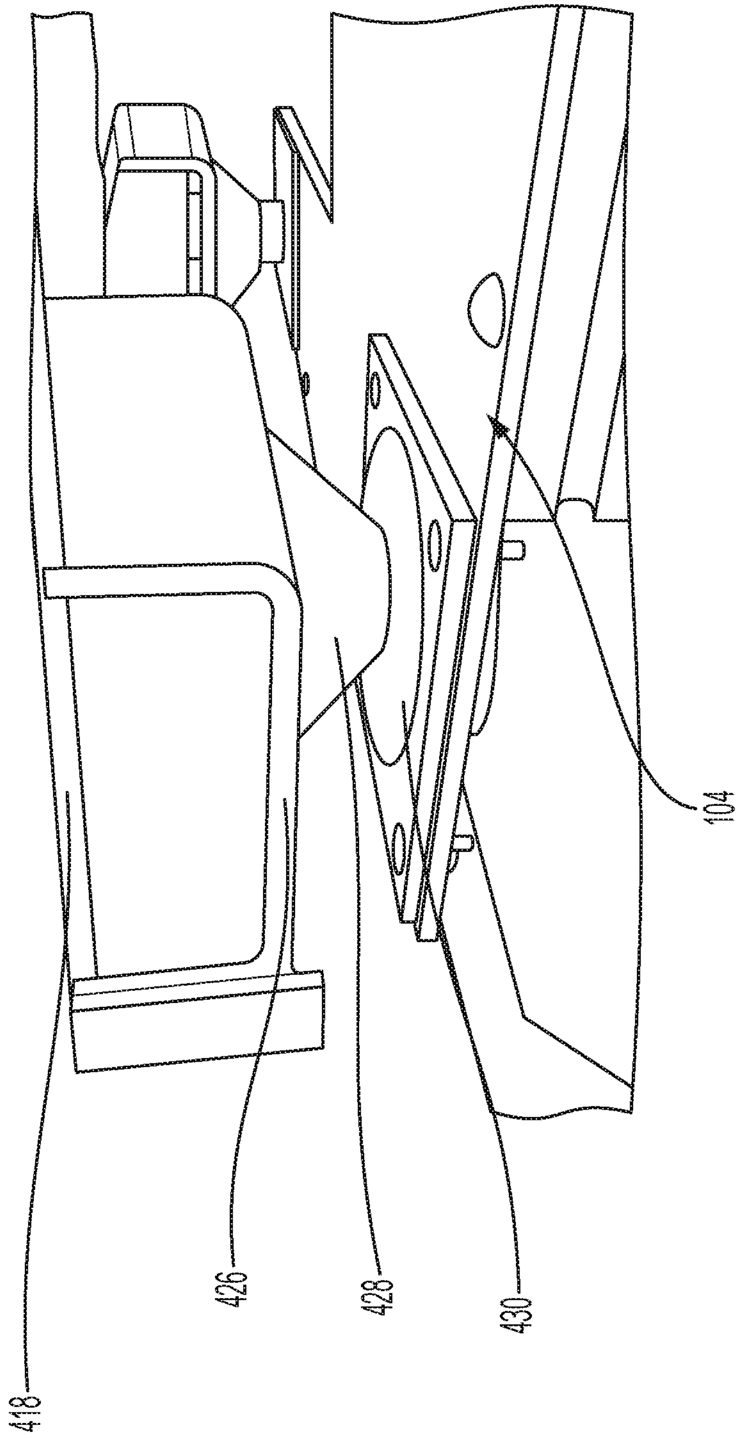

Referring to FIG. 4C-5, a perspective view of an exemplary embodiment of the stability base 426 and the positioning feet 428 positioned on the frame 104 is shown. In this embodiment, the positioning feet 428 are configured to fit in a positioning hole 430 on the frame 104, removably coupling the powder hopper 402 to the frame 104. In some embodiments of the powder hopper 402, the positioning feet 428 can be conical in shape and the positioning holes 430 may be corresponding conical shapes to accommodate the positioning feet 428. In some embodiments of the powder hopper 402, the shape of the positioning feet 428 can be hemispherical, pyramidal, or oblong, or any other shape, with a corresponding shaped positioning hole 430 on the frame 104 to accommodate the positioning feet 428. In some embodiments, a radius of the positioning feet 428 can be 30 mm to correspond with typical positioning accuracy of an operator. In some embodiments, the positioning feet 428 and positioning holes 430 can be made of plastic to allow them to slide relative to each other while maintaining friction at a manageable level to ensure a secure fit of the powder hopper 402 on the frame 104.

Referring to FIG. 4C-6, a perspective view of an exemplary embodiment of the electric-pneumatic connection box 420 is shown. In this electric-pneumatic connection box 420 includes at least one electrical connection 432 and at least one pneumatic connection 434 disposed on the electric-pneumatic connection box 420. In some embodiments, the at least one pneumatic connection 434 can be configured to act as an equalization line to prevent vacuum formation. In some embodiments, the at least one pneumatic connection 434 can be configured to act as an argon supply line to flood the internal volume. In some embodiments, the at least one electrical connection 432 can be configured to act as an electrical supply for humidity and oxygen sensors.

Referring to the embodiment of FIG. 4C-6, the electric-pneumatic connection box 420 can be located at the front of the powder hopper 402. In some embodiments, the electrical-pneumatic connection box 420 can be disposed at another location besides the front of the powder hopper 402 and be configured to be accessible by an operator. The disclosed electric-pneumatic connection box 420 of FIG. 4C-6 can be configured to have quick-connect/disconnect connections. In some embodiments, the electric-pneumatic connection box 420 can be configured to have color coding for each connection in order to make it easier for the operator to know which line to connect to which port, with no restriction of which colors can be used. In some embodiments, the connections can also be used when the loaded powder hopper 402 are in storage, such as to monitor moisture removal or other environmental monitoring to ensure the stability of the material powder (e.g., cost of material powder can be approximately $60,000).

Figures 4, 4C, 5, 6:
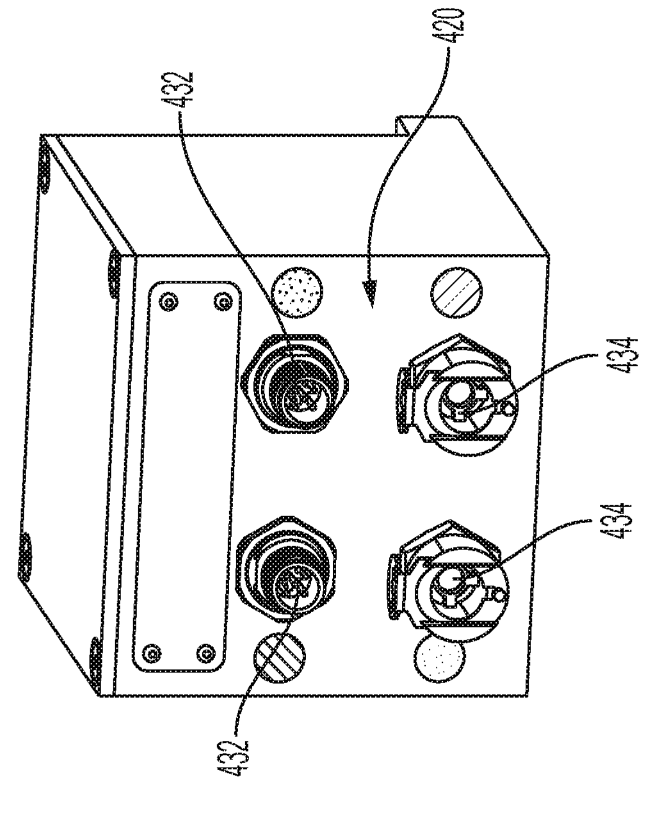
Figures 1, 4D:
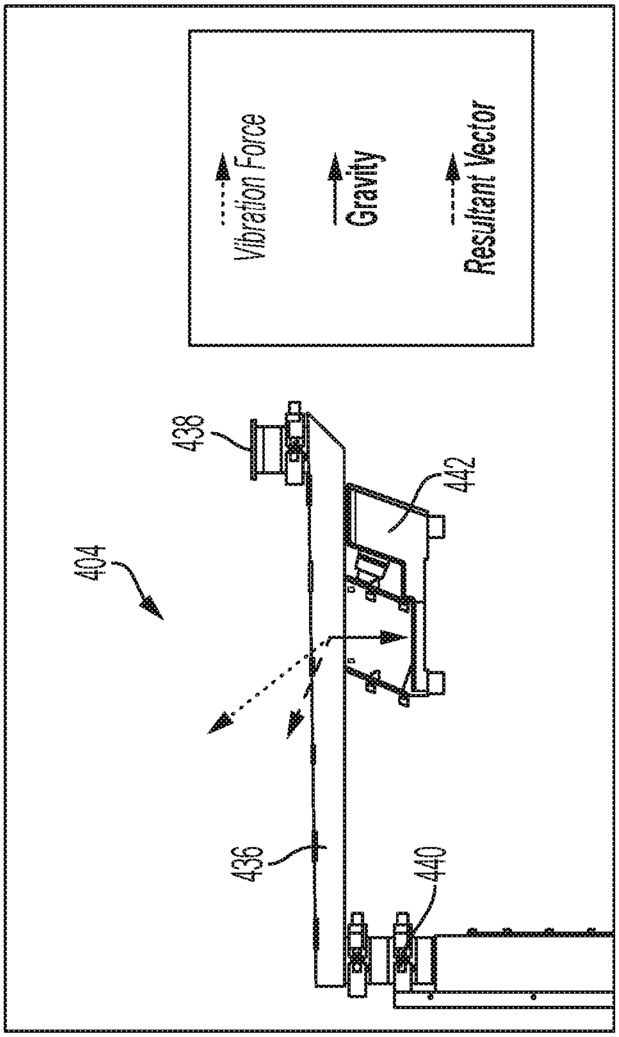
Figures 2, 4D:
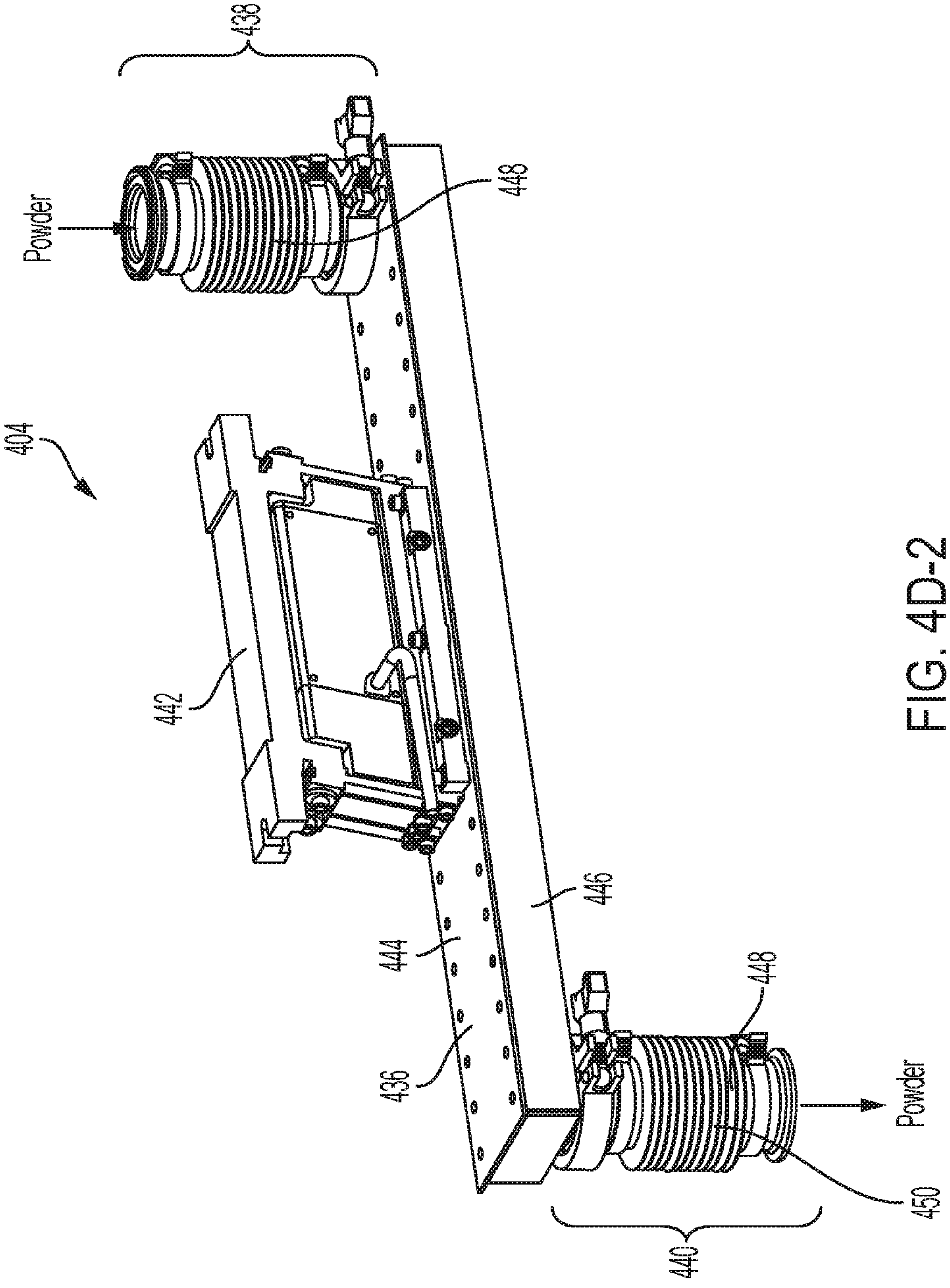
Figures 3, 4D:
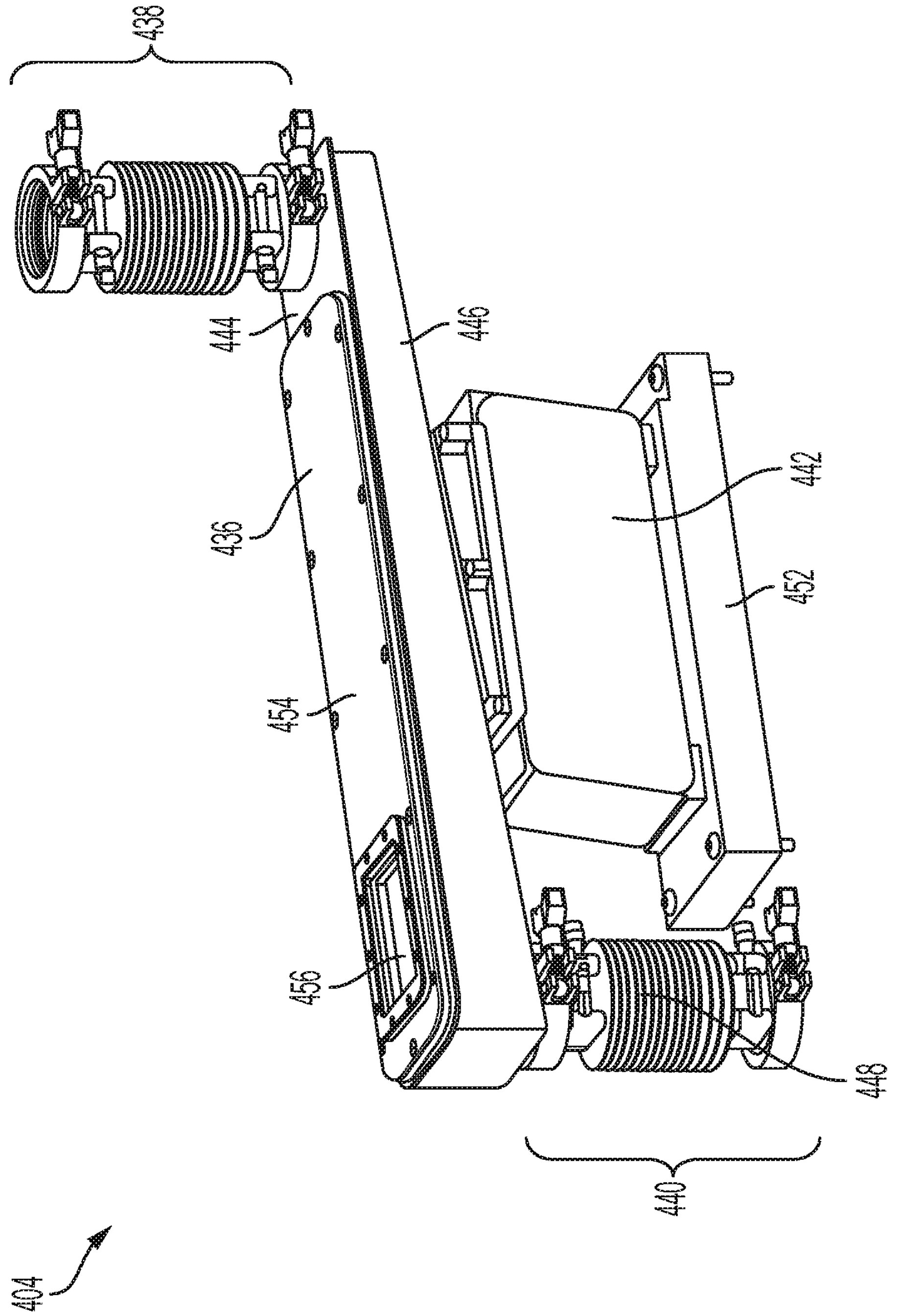

Referring now to FIG. 4D-1, a diagram of an exemplary embodiment of the linear vibration (LV) system 404 of the PSD system 400 is shown. In the diagram shown in FIG. 4D-1, the LV system 404 includes a vibratory feeder box 436 which has a feeder box inlet 438 to receive the material powder from the powder hopper and a vibratory feeder box outlet 440 to output the material powder to the diverter 406 (described in paragraphs below). In this embodiment, the vibratory feeder box 436 further includes a vibration mechanism 442 mechanically connected to the vibratory feeder box 436 to provide vibration force to the material powder in the vibratory feeder box. In this embodiment, vibration force alone drives powder motion along a path of delivery between the feeder box inlet 438 and the feeder box outlet 440. The vibration force provided by the vibration mechanism 442 is configured to make the powder particles of the material powder to jump up and move forward, while gravity pulls the particles back down and the process repeats, causing the particles to hop along the length of the vibratory feeder box 436. In this embodiment, the movement of the powder particles is controlled by the vibration mechanism 442, where powder particles move when the vibration mechanism 442 is active and immediately stop when vibration mechanism 442 is inactive. In some embodiment, the vibration feeder box can be configured to not allow material powder flow through feeder box inlet 438 when vibration is not active via the angle of repose of the pile of the material powder in the vibratory feeder box 436. In some embodiments, the frequency and amplitude of the vibration mechanism 442 can be set via phase controllers through the processor 106. The embodiment of the LV system 404 shown in FIG. 4D-1 is configured to not contain translating or rotating parts that could be fouled by material powder. The embodiment of the LV system 404 shown in FIG. 4D-1 allows for predictable conveyance of the material powder, which results in controllability of the powder being delivered. Material powder movement with the LV system 404 is less sensitive and more predictable to powder density than gravity conveyance systems.

Referring to FIG. 4D-2, a perspective view of an exemplary embodiment of the LV system 404 of the PSD system 400 is shown. In this embodiment, the LV system 404 includes vibratory feeder box 436, the feeder box inlet 438, and the feeder box outlet 440 and the vibration mechanism 442 disposed on a first surface 444 of the vibratory feeder box 436. The LV system 404 is configured to reduce the vibration of sensitive components throughout the additive manufacturing system 100. In this embodiment, the feeder box inlet 438 and the feeder box outlet 440 further include flexible bellows 448, containing grooves 450, configured to effectively isolate vibration from the build chamber 200. In some embodiments, the flexible bellows can dissipate close to 100% of vibrations. In this embodiment, the flexible bellows 448 mounted on the vibratory box inlet 438 includes a nozzle (not shown in figure) internally to minimize the material powder touching and remaining in the grooves 450 of the flexible bellows 448. In this embodiment, the vibratory feeder box 436 is coupled to frame 104 via a rigid mount (not shown in the figure) connecting a vibratory feeder box base 446 to the frame 104. In some embodiments, the vibratory feeder box base 446 can be coupled to a large mass to dissipate high frequency vibrations, where the large mass is then mounted to the frame 104.

Some embodiments of the vibratory feeder box 436 can allow for vibration frequency control and can be capable of handling more than a 10-pound load. Some embodiments of the of the vibratory feeder box 436 can include internal baffles (not shown in figure) placed at specific locations and distances to limit material powder conveyance.

Referring to FIG. 4D-3, another embodiment of the vibratory feeder box 436 is shown. In this embodiment, the vibration mechanism 442 of the vibratory feeder box 436 is coupled to the vibratory feeder box base 446, making it easier to securely mount the vibratory feeder box 436 to the frame 104. In some embodiments, the vibration mechanism 442 is coupled to a base frame 452 (shown in FIG. 4D-3) for coupling to the frame 104 to further isolate vibration forces from the additive manufacturing system 100. In this embodiment, the first surface 444 of the vibratory feeder box 436 includes a sight-glass 456 and a removable lid 454. The sight glass 456 is configured to allows visual inspection of the inside of the vibratory feeder box 436 to check for obstructions. The removable lid 454 is configured to allow for access to the internal surfaces of the vibratory feeder box 436 to aid in cleaning. In some embodiments of the vibratory feeder box, a floor (not shown in the figure) of the vibratory feeder box 436 can have a 3° decline to encourage the flow of the material powder.

Figure 4E:
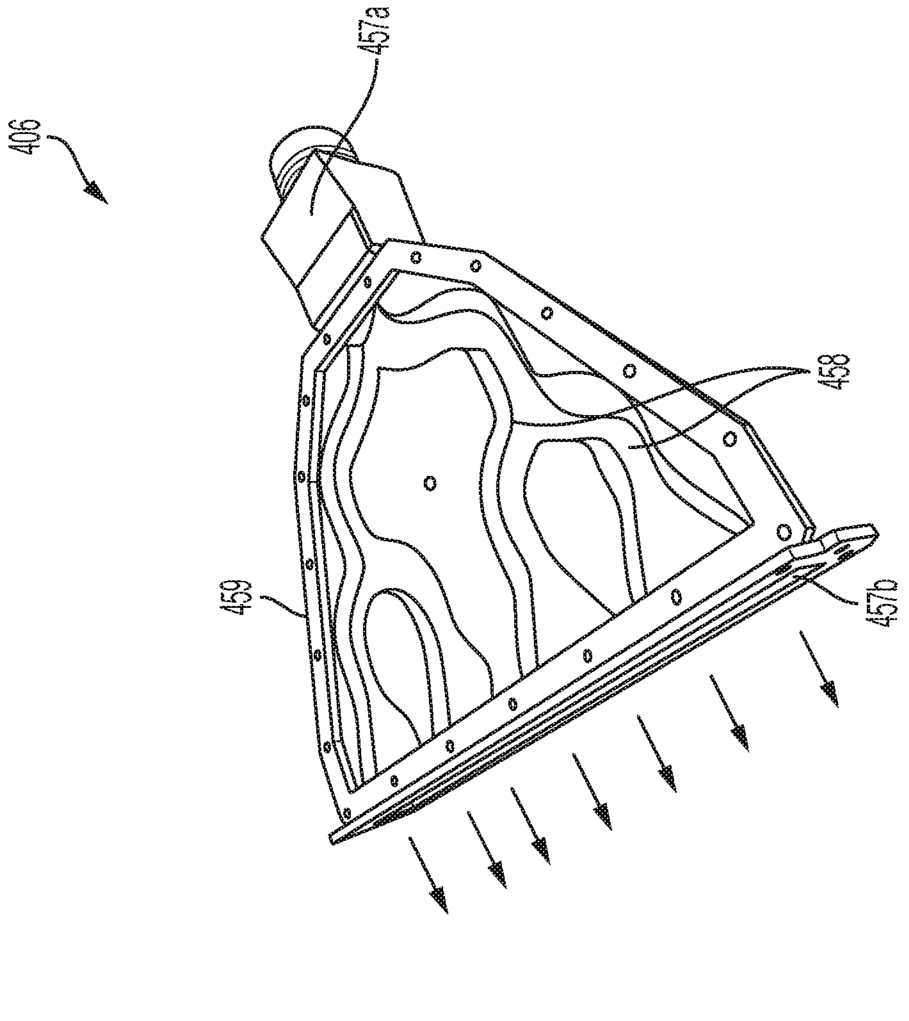
FIG. 4E shows a perspective view of an exemplary embodiment of a diverter of the PSD system according to an aspect of the additive manufacturing system.

Referring to FIG. 4E, a perspective view of an exemplary embodiment of the diverter 406 is shown. In this embodiment, the diverter 406 is configured to couple to the feeder box outlet 440 via a diverter inlet 457*a*, receive material powder from the feeder box outlet 440 into the diverter body 459, and distribute the material powder to a required width of the build platform 302 via the diverter outlet 457*b*. In this embodiment, the diverter 406 is used to laterally distribute powder by converting the centralized cylindrical material powder flow coming from the feeder box outlet 440 into a sheet-like flow equal in width to the build platform 302. In some embodiments such as the embodiment of FIG. 4E, the lateral distribution of the material powder can be achieved by distributed powder channels 458 in the diverter. In some embodiments, the diverter 406 can have powder platforms (not shown in figure) at different levels to distribute the material powder laterally to the width of the build platform 302.

Figures 1, 4F:
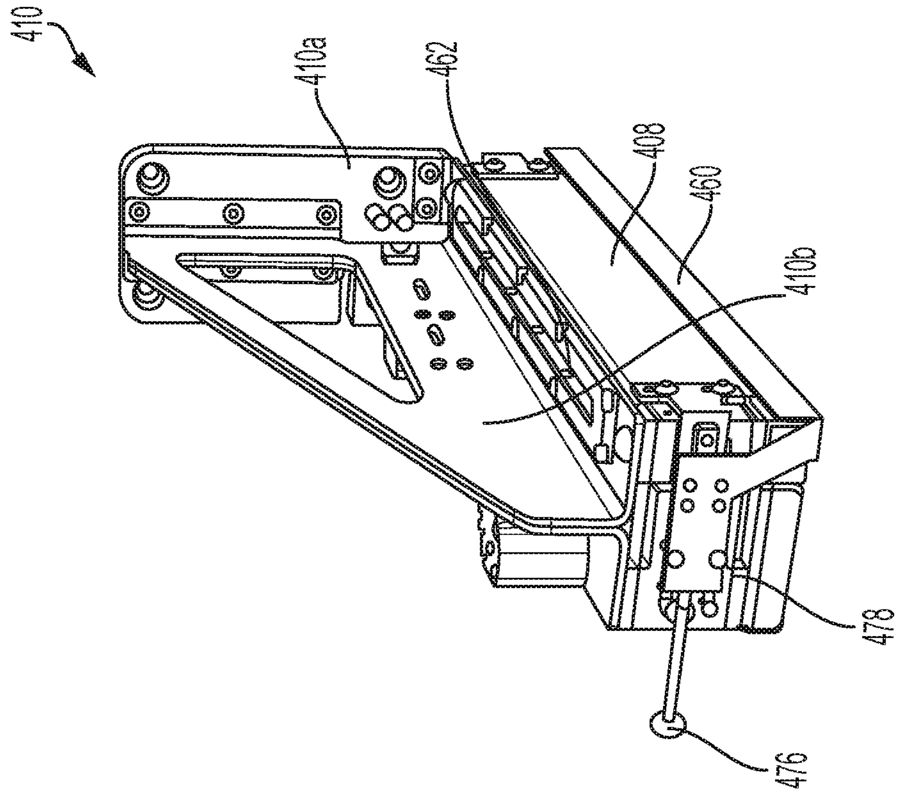
Figures 3, 4F:
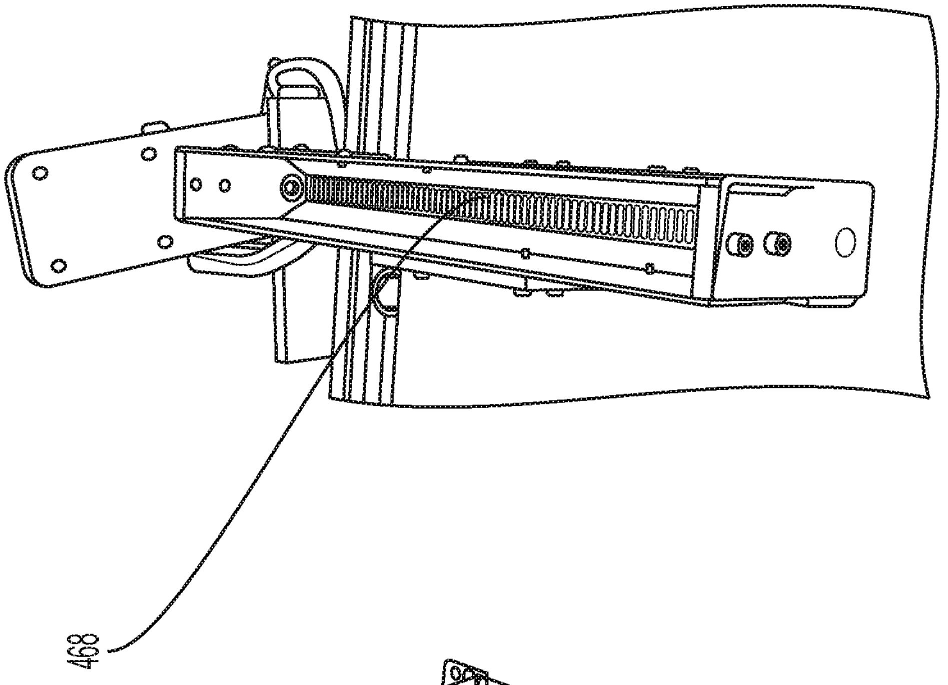
Figures 2, 4F:
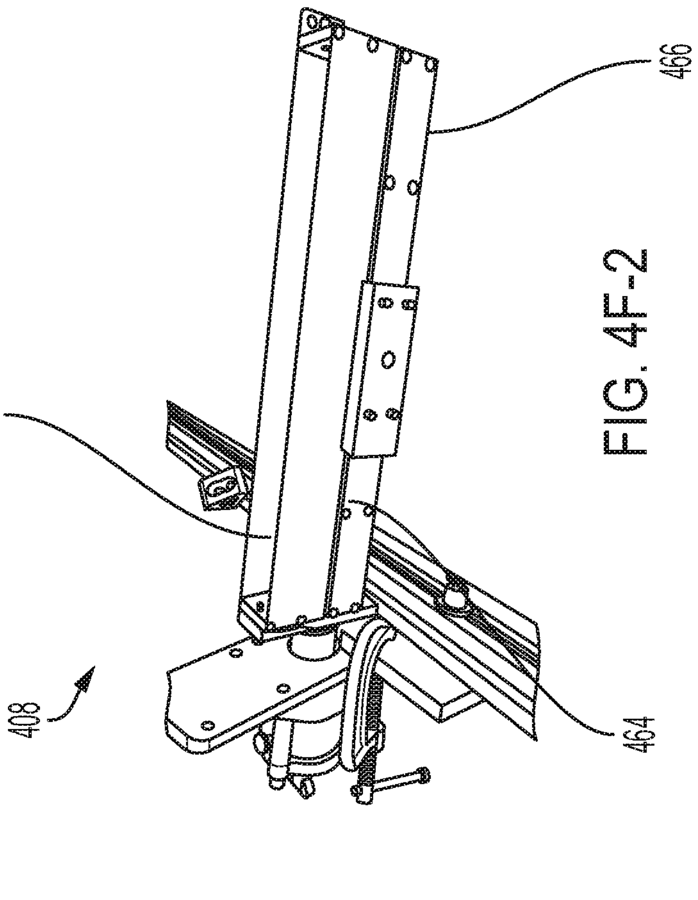
Figures 4, 4F, 5:
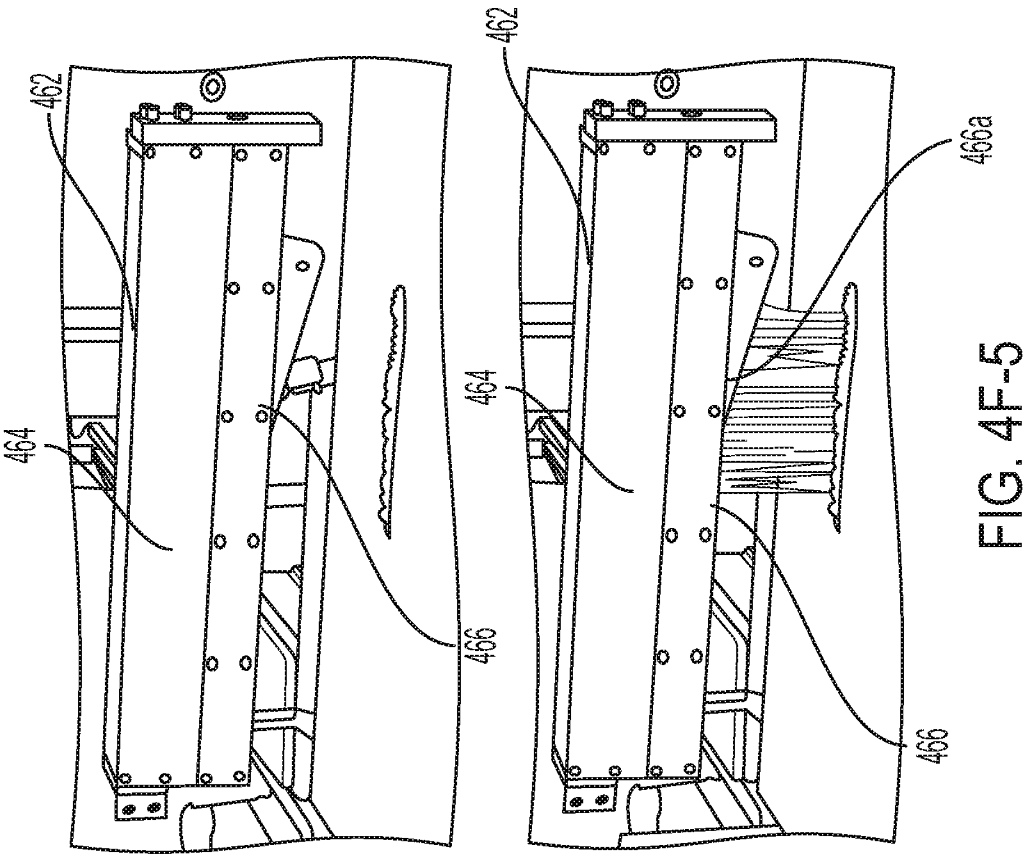
Figures 4, 4F:
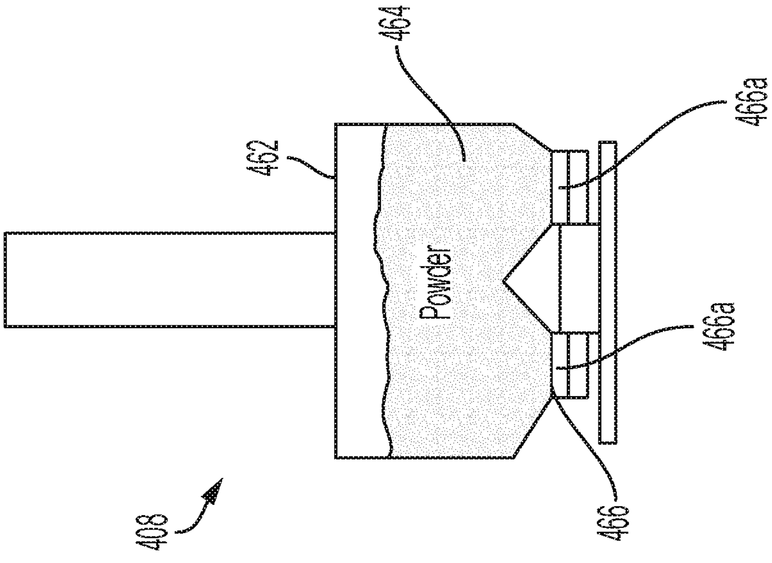
Figures 4, 4F, 5, 6:
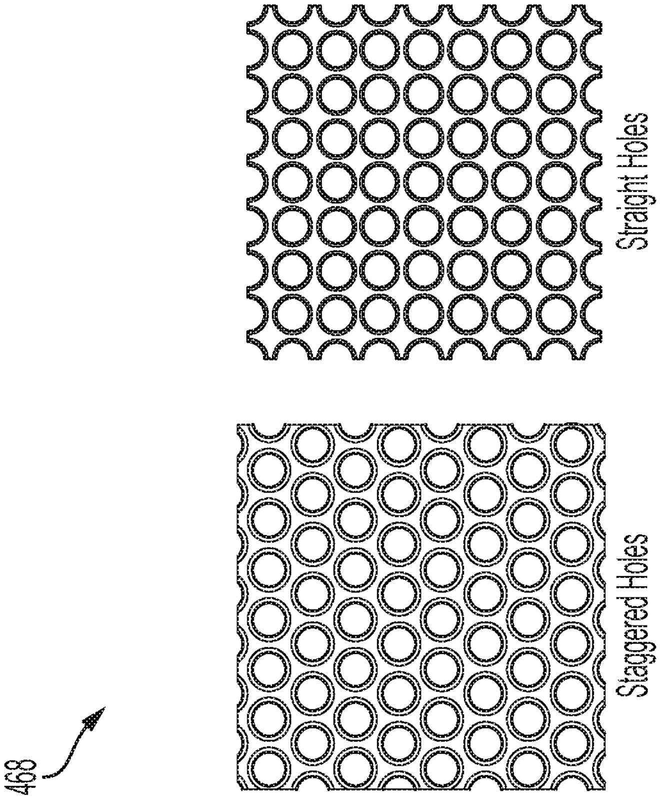
Figures 4, 4F, 5, 6, 7:
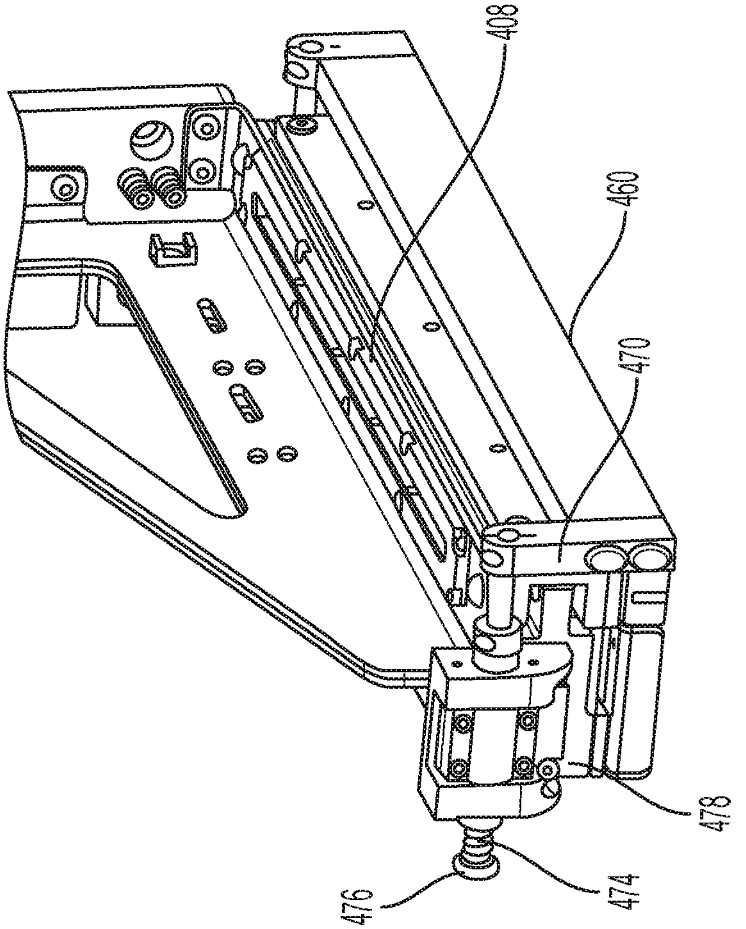
Figures 4, 4F, 5, 6, 7, 8:
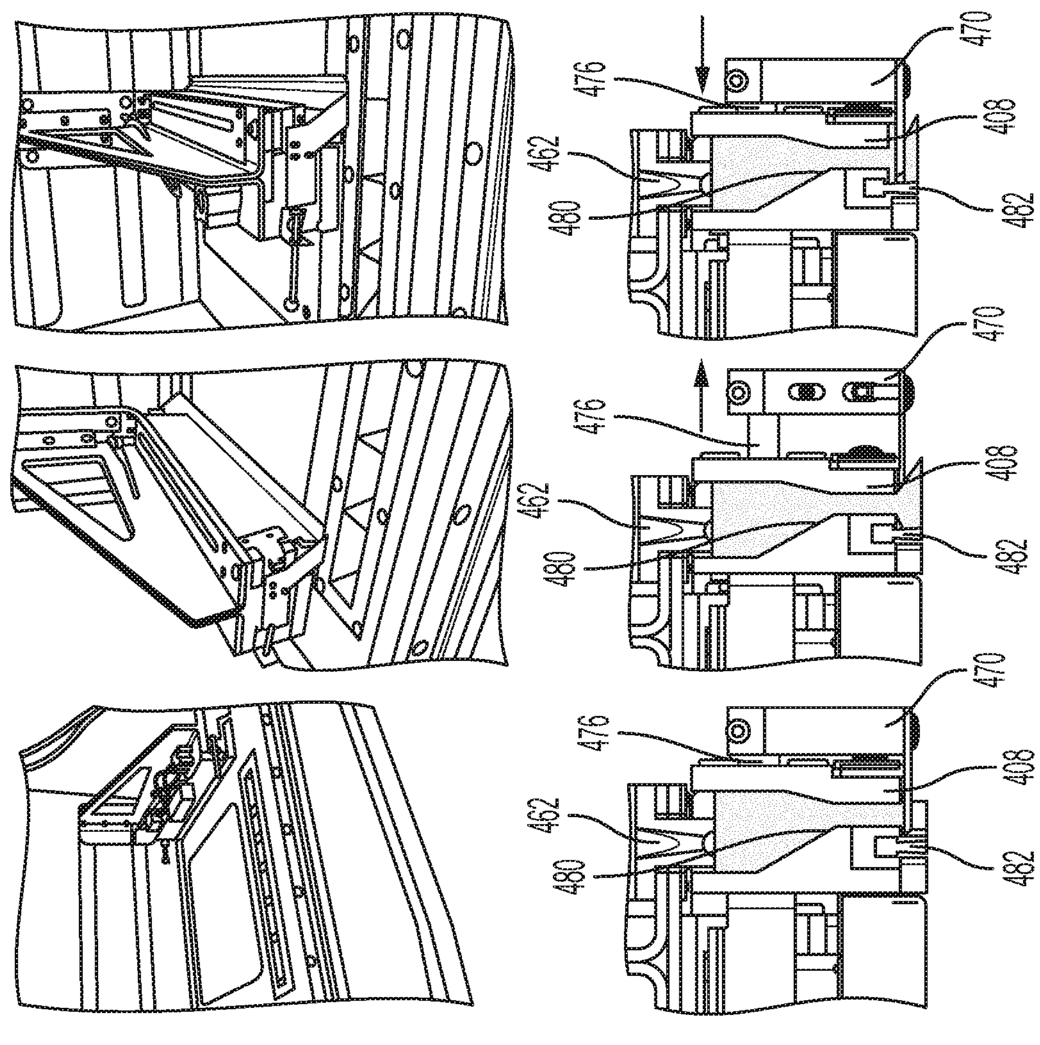
Figures 4, 4F, 5, 6, 7, 8, 9:
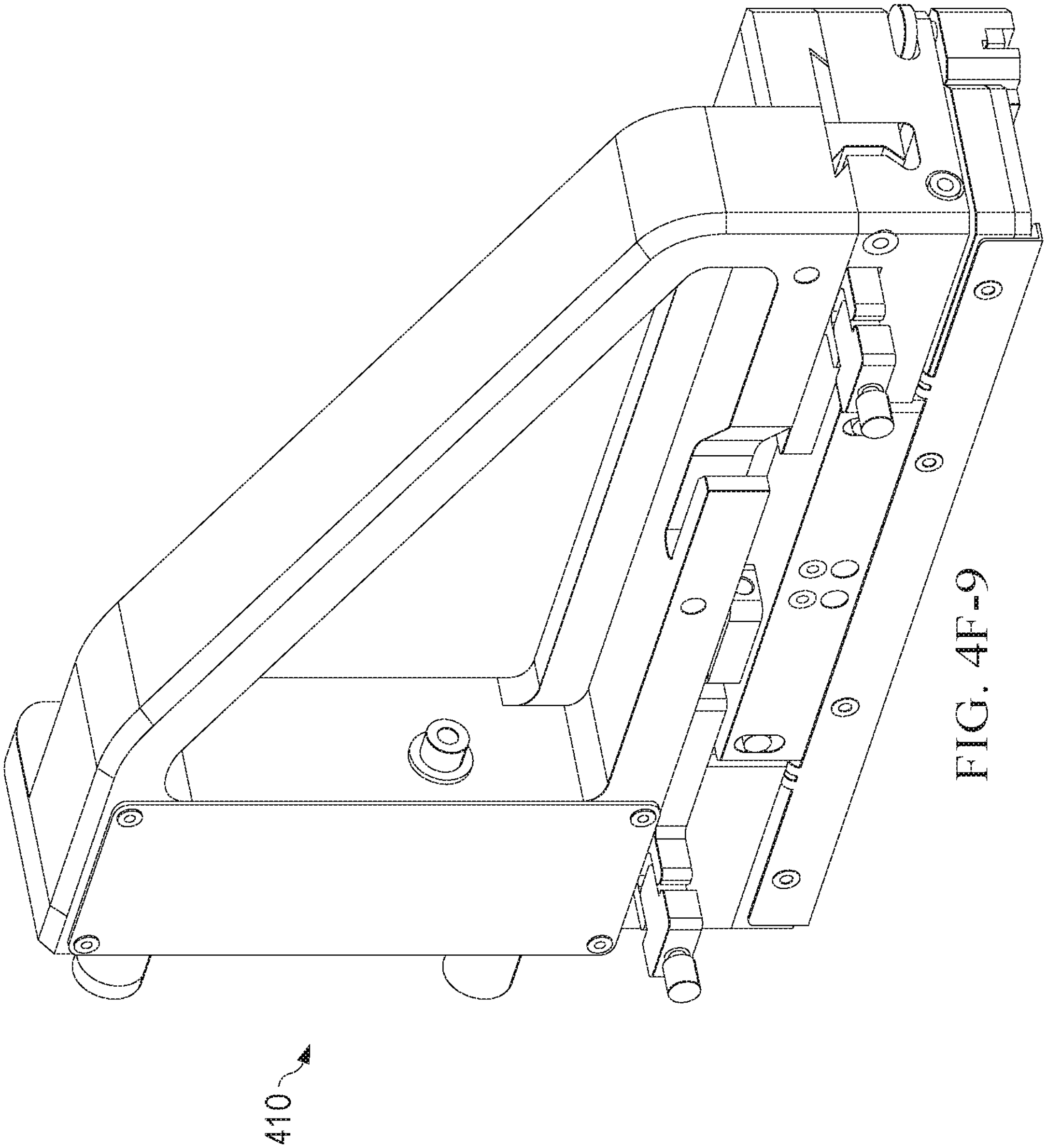
Figures 4, 4F, 5, 6, 7, 8, 9, 10:
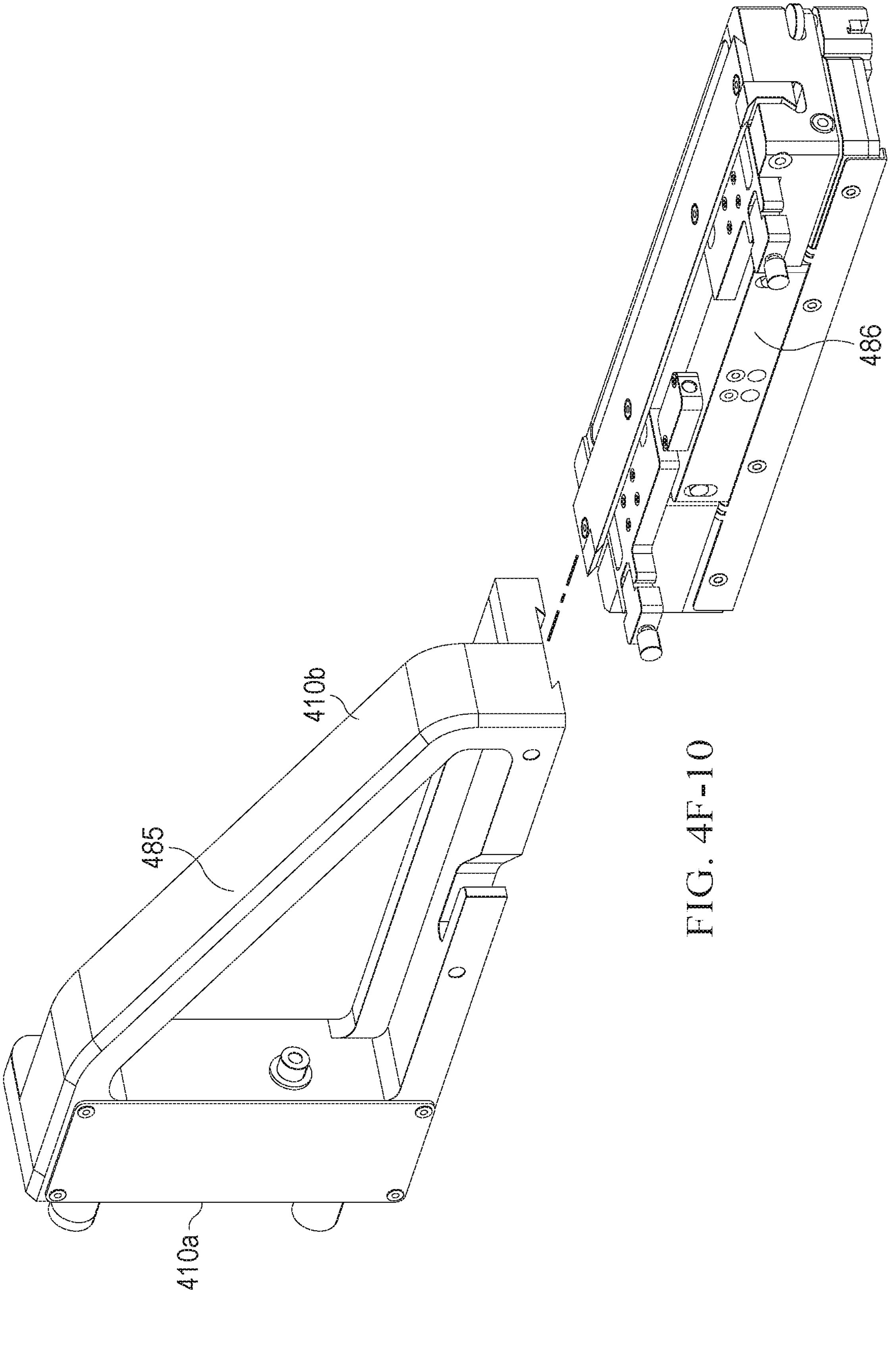
Figures 4, 4F, 5, 6, 7, 8, 9, 10, 11:
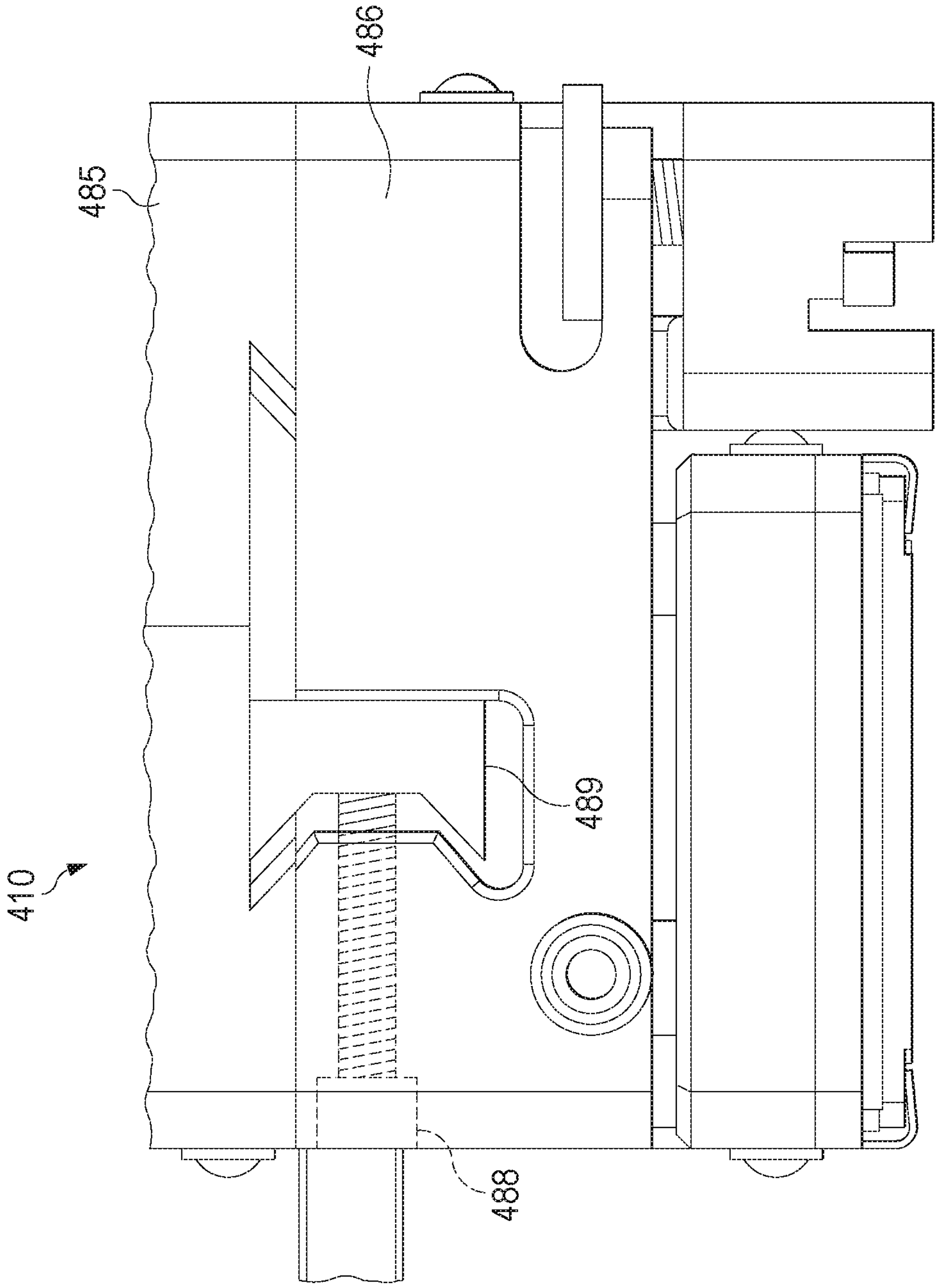
Figures 4, 4F, 5, 6, 7, 8, 9, 10, 11, 12:
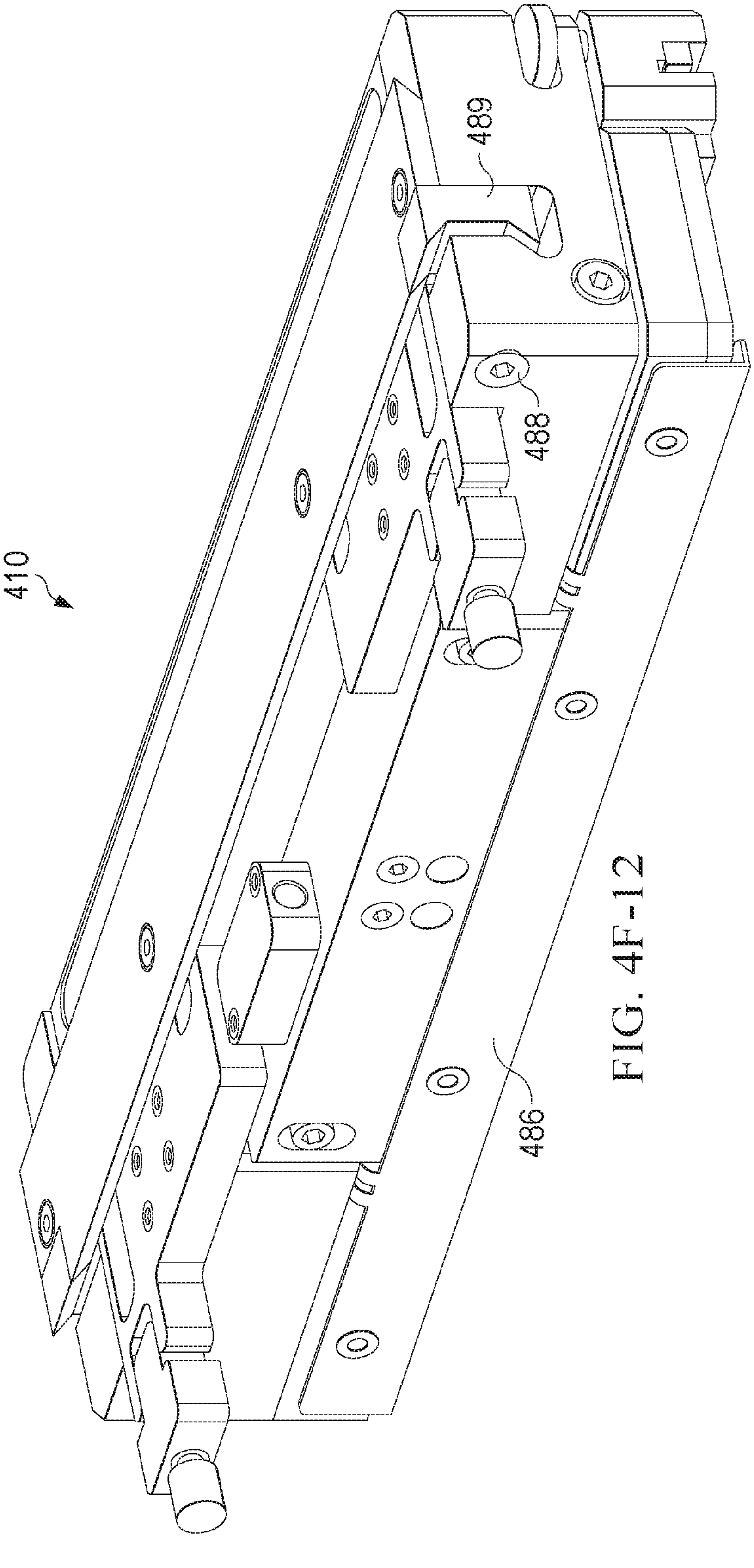
Figures 4, 4F, 5, 6, 7, 8, 9, 10, 11, 12, 13:
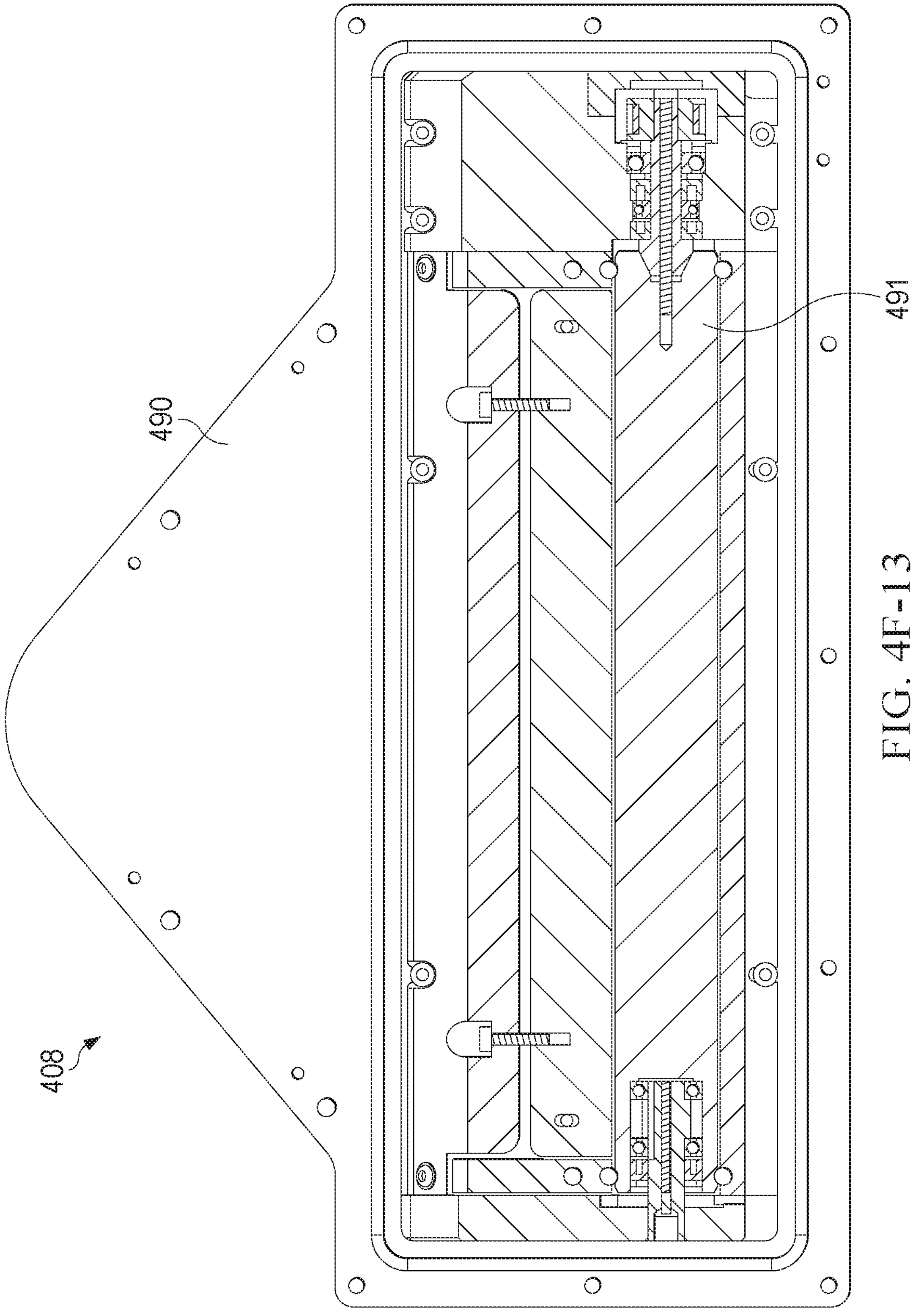
Figures 4, 4F, 5, 6, 7, 8, 9, 10, 11, 12, 13, 14:
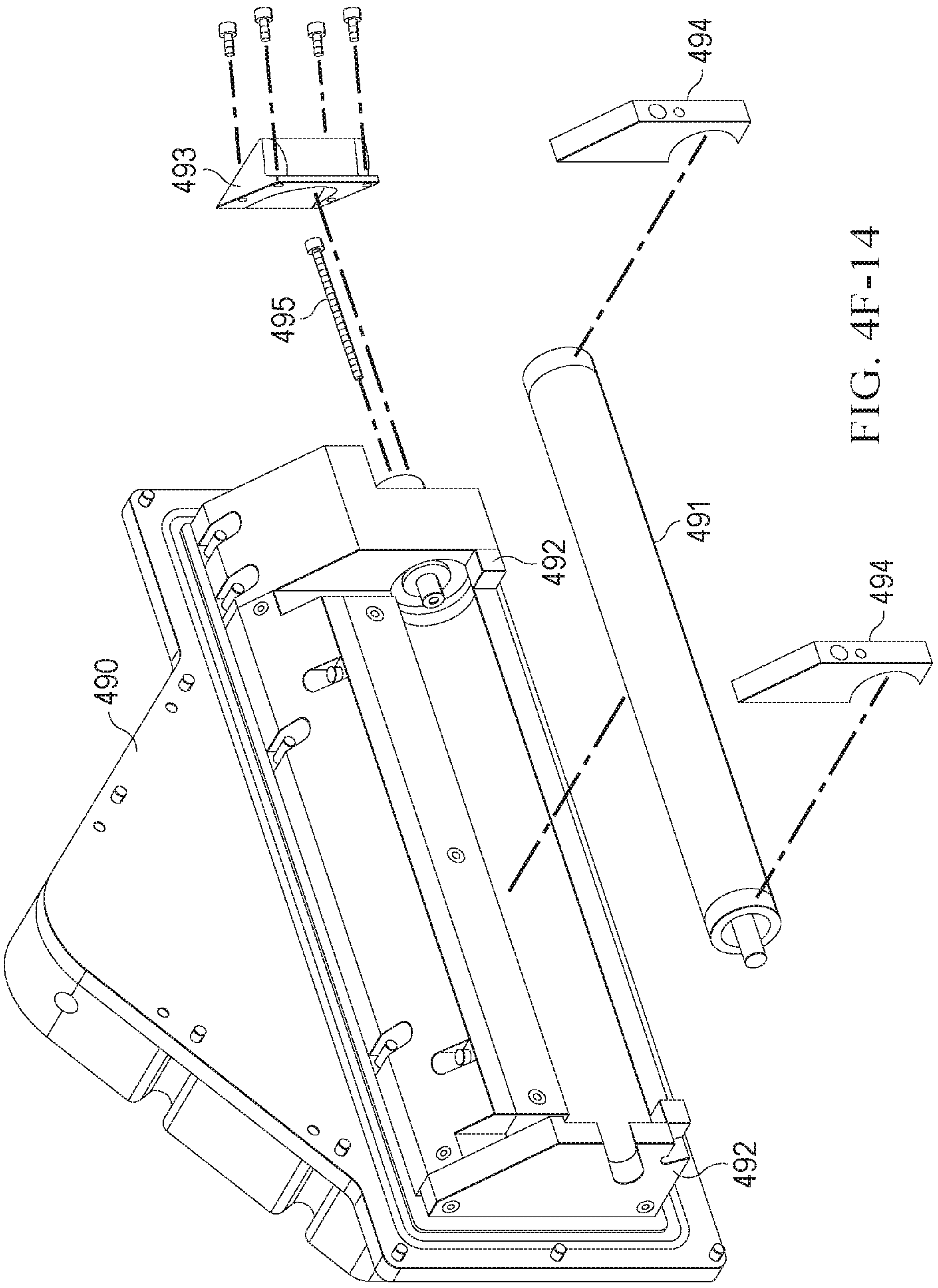
Figures 4, 4F, 5, 6, 7, 8, 9, 10, 11, 12, 13, 14, 15:
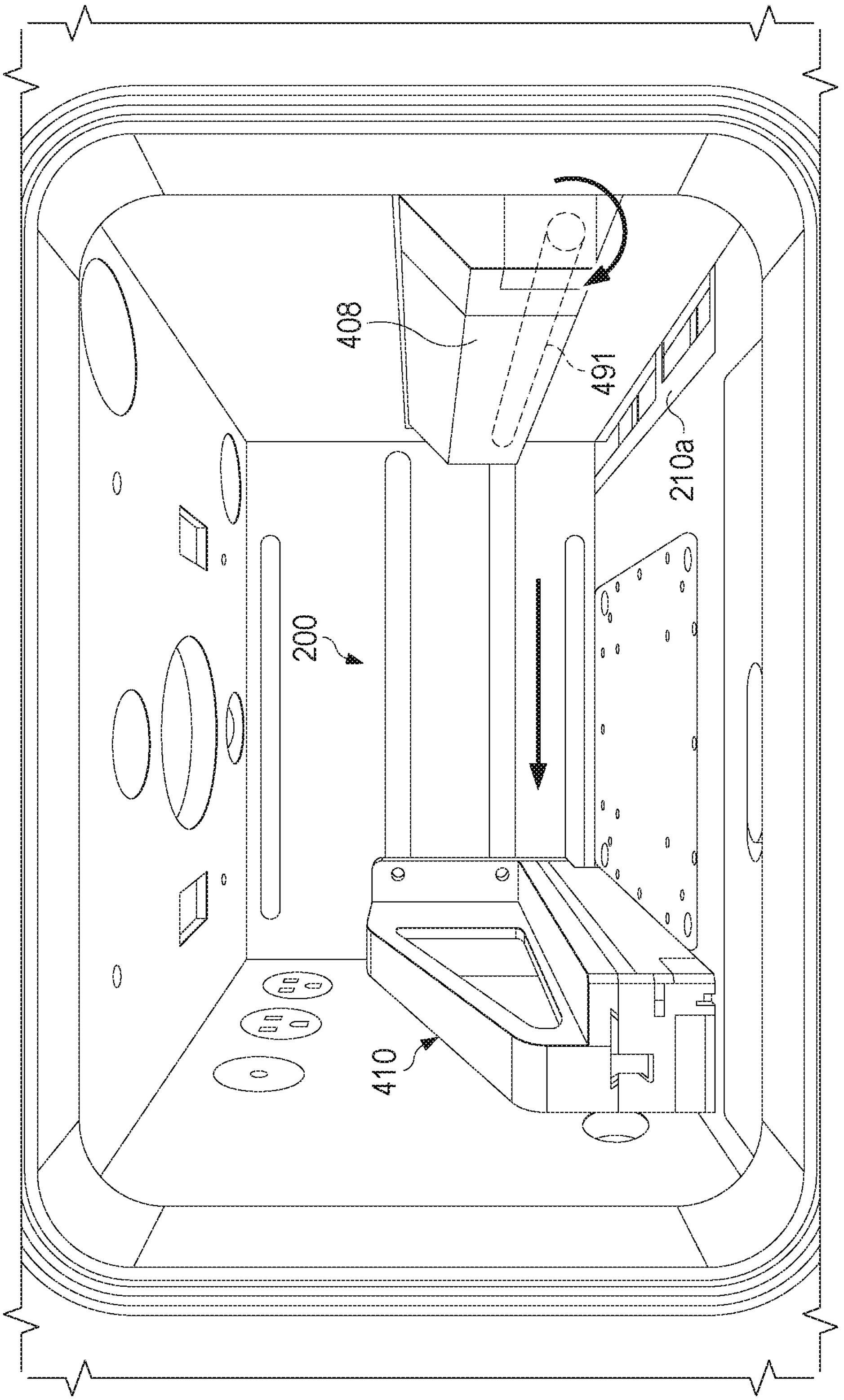

Referring to FIG. 4F-1, a perspective view of an exemplary embodiment of the recoater 410 is shown. In the embodiment shown in FIG. 4F-1, the recoater 410 is moveably disposed in the build chamber 200 (secured to the interior wall surface 206 of one of the walls 204 of the build chamber 200 via a wall bracket 410*a* and a bracket stabilizer 410*b*) and is configured to distribute the material powder received from the diverter 406 in an even layer on the build platform 302. In the embodiment shown in FIG. 4F-1, the recoater 410 is further coupled to a doser 408 configured for receiving the material powder from the diverter 406 and split the material powder into a plurality of doses, where each dose corresponds to a layer of the component to be manufactured. Each dose, a user-defined amount of the received material powder, is configured to be spread evenly on the build platform 302 by the recoater 410. In some aspects of the additive manufacturing system 100, the doser 408 and recoater 410 can be independent of each other and not coupled to each other.

One embodiment of the doser 408 can include a blade style valve (as shown in FIG. 4F-1 denoted by a horizontal blade 460) to limit the material powder flow to the build platform 302. In the embodiment of the doser 408 with the blade style valve, a pneumatic actuator, a blade-shaped angle iron, and a 3D printed nozzle can be used to achieve a controlled valve by translating the blade under the nozzle. In this embodiment of the doser 408, the gap between the top of the blade and the bottle of nozzle is configured to be approximately 1 mm gap. This embodiment of the doser 408 can be configured to control the material powder flow and to also stop the powder flow based to the angle of repose of the material powder in the doser 408. In other embodiments of the doser 408, the gap between the top of the blade and the bottle of nozzle can be configured to be in range of 0 mm to 2 mm.

Referring to FIGS. 4F-2-4F-5, perspective views of an exemplary embodiments of a doser 408 are shown. In this embodiment shown in FIGS. 4F-2-4F-5, the doser 408 is configured to receive the material powder (from the diverter 406) via the doser inlet 462 into a doser reservoir 464 and deposits the material powder on to the build platform 302 via a perforated plate 468, disposed at the doser outlet 466, containing an array of small openings. In the embodiment shown in FIGS. 4F-4 and 4F-5, the doser outlet 466 further includes an ultrasonic sprinkler 466*a* to deposit the material powder to the build platform 302 via ultrasonic vibrations. In the embodiments of the doser 408 shown in FIGS. 4F-4 and 4F-5, activating or ceasing the ultrasonic vibration acts as a "valve" that opens/closes to encourage the material powder to flow or stop. This feature employs the angle of repose of powder between the underside of the perforated plate 468 (or slotted) and the spreading substrate (i.e., the build platform 302, previously spread layer of material powder on the build platform 302 or solidified additive manufacturing part) to dose per layer. In some embodiments, it was determined that using perforated plates 468 with 0.8 mm slots by 4 mm long and 4 mm spacing, the material powder quickly ceased to flow as desired. In the same embodiment, the material powder that did pass and was deposited on the build platform 302 was sufficiently smoothed via an electrode planer 482 (described in paragraphs below).

FIG. 4F-6 presents perspective views of two different embodiments of perforated plates 468 with staggered holes (left) and straight holes (right). Referring to FIG. 4F-6, different embodiments of perforated plates 468 with different dimensions can be used to both aid and control the material powder flow and control the powder flow.

FIG. 4F-7 presents a perspective view of an exemplary embodiment of the recoater 410 coupled to the doser 408. In this embodiment, the recoater 410 is configured to be adjustable in terms of the dosed volume/mass to allow both optimization of material powder-use efficiency and different layer heights. The recoater 410 is able to deliver a known volume of material powder utilizing the substrate as the lower constraint of the material powder heap's height, the material powder's internal resistance to shear, and the known angle of repose. In this embodiment of the recoater 410, the recoater 410 comprises a valve system 470 configured to stop the material powder flow as the recoater 410 moves away from the dosing location. In this embodiment, the valve system 470 includes the horizontal blade 460 (as part of the doser 408), a compression spring 474 wound around a compression shaft 476, and a shaft guide 478. In some embodiments of the valve system 470, bellows (not shown in the figure) can be installed on the shaft guide 478 to prevent material powder ingress.

FIG. 4F-8 shows an exemplary schematic with corresponding images of the recoater 410 in action. In the left of FIG. 4F-8, the recoater 410 in a start position where the recoater 410 has received the material powder from the diverter and the horizontal blade 460 is situated approximately 1 mm below a nozzle 480, located at the doser outlet 466. In the center of FIG. 4F-8, the recoater 410 is shown in an open position during which the compression shaft 476 of the valve system 470 is depressed via the shaft guide 478, allowing one user-define dose of material powder to flow from the nozzle 480 to the build platform 302. In the right of FIG. 4F-8, the recoater 410 is a coating position where the depression of the compression shaft 476 is removed when the recoater 410 is moving, resulting in the compression shaft 476 moving outward due to the decompression of the compression spring 474 and moved the horizontal blade 460 to close the flow of the material powder. In this embodiment, the electrode planer 482 of the recoater 410 spreads the material powder deposited on the build platform 302 during the open position of the recoater 410 to form a layer of the material powder on the build platform 302. The recoater 410 is back in the start position after spreading the layer of the material powder on the build platform 302 and is configured to restart the process of spreading a second layer of the material powder on the build platform 302. In some embodiment, adjusting the amount of material powder that is dosed can be done for every layer with feedback, such as a user viewer camera and a simple edge detection image analysis technique. In some embodiments, precise control of the material powder dose can be achieved through control of linear motion of the horizontal blade 460.

FIGS. 4F-9 and 4F-10 present a perspective view and an exploded view of an exemplary embodiment of the recoater 410 with a removable cartridge 486. In this embodiment, the recoater 410 is configured to be in two parts, a top part 485, comprising the stabilizer 410*b* coupled to the wall bracket 410*a*, configured to be removably coupled to the removable cartridge 486. The top part 485 is coupled to a horizontal drive unit via the wall 204 of the build chamber 200. The cartridge 486 an electrode planer 482 that fills the material powder to the build chamber 210 by non-contact using electrostatic force and contact using horizontal blade 460. Removable cartridge 486 includes the components of recoater 410 that are most likely to experience wear through contact with other components and need replacement. Having the removable cartridge 486 be removably coupled to the top part 485 enables a user to inspect, clean, and service critical components of the recoater 410 outside of the build chamber 200 without removing and disassembling the entire recoater 410. The removable cartridge 486 can also be configured to collect excess material powder not utilized and wasted during the movement of the recoater 410 in the build chamber 200.

FIGS. 4F-11 and 4F-12 present perspective views of an exemplary embodiment of the recoater 410 with the removable cartridge 486. In this embodiment, the top part 485 can be removably coupled to the removable cartridge 486 via a clamp mechanism 489 comprising at least one screw 488 and one retaining piece 489. The clamp mechanism 487 can be disposed between the top part 485 and the removable cartridge 486 such that the retaining piece 489 can be configured to retain the top part 485 to the removable cartridge while the at least one screw 488, can be configured to be tightened against the retaining piece 489 to lock the top part 485 to the removable cartridge 486. The intersection between removable cartridge 486 and top part 485 may be formed in a dove-tail shape, as shown in FIG. 4F-11, and may include surfaces that are precisely machined to ensure a proper and repeatable fit of removable cartridge 486 when it is placed back into top part 485 and retained by retaining piece 489. In some embodiments, the top part 485 can be removably coupled to the removable cartridge 486 via other connection mechanisms including, but not limited to, a toolless clamp mechanism, a dove tail mechanism, tapered dovetail mechanism, and a magnetic clamp mechanism.

FIGS. 4F-13 and 4F-14 present a cross-sectional view and an exploded view of an exemplary embodiment of the doser 408. In this embodiment, the primary components of the doser 408 comprise a housing 490, a drum 491 rotatably coupled within the housing 490 on a pair of drum seats 492 disposed within the housing 490, a cover 493 removably coupled to the drum 491 to retain the drum 491 within the housing 490, and at least two seal covers 494, each disposed on each side of the drum 491 configured to pressure seal the housing 490. The drum 491 can be retained in the housing 490 with the cover 493 via screws 495. The removability of the drum 491 can enable the user to easy clean and maintain the dosing ability of the removable cartridge 486.

In the embodiment presented in FIG. 4F-13, the at least pair of seal covers 494 are configured to maintain a positive pressure around the drum 491 to ensure material powder does not stick and be kept out. In some embodiments, the at least pair of seal covers 494 can be configured to be electrical connected to the processor 106 and can alert the user via the processor in case of a pressure leak. In some embodiments, the drum 491 can be configured to controlled to rotate via the processor 106 to ensure to even dosing of the material powder when the removable cartridge 486 is configured to act as the doser 408 as well.

Referring to FIG. 4F-15, a perspective view of an exemplary embodiment of the build chamber 200 in a powder recovery cycle is presented. In this embodiment, the processor 106 can be configured to run a powder recovery mode. In the powder recovery mode, the recoater 410 can be configured to travel to the left of the build chamber 200 and drum 491 of the doser 408 can be configured to rotate to dump remaining material powder inside the doser 408 into a powder collection vent 210*a* that is located directly below the doser 408 for collection before restarting a build cycle. Powder collection vent 210*a* includes sloped and contoured edges to prevent powder from remaining the build chamber 200. In the powder recovery mode, the powder hopper 402 may be isolated from doser 408 by valves (not shown) to ensure that powder from the powder hopper 402 is not dumped into powder collection vent 210*a*.

Figures 1, 4G:
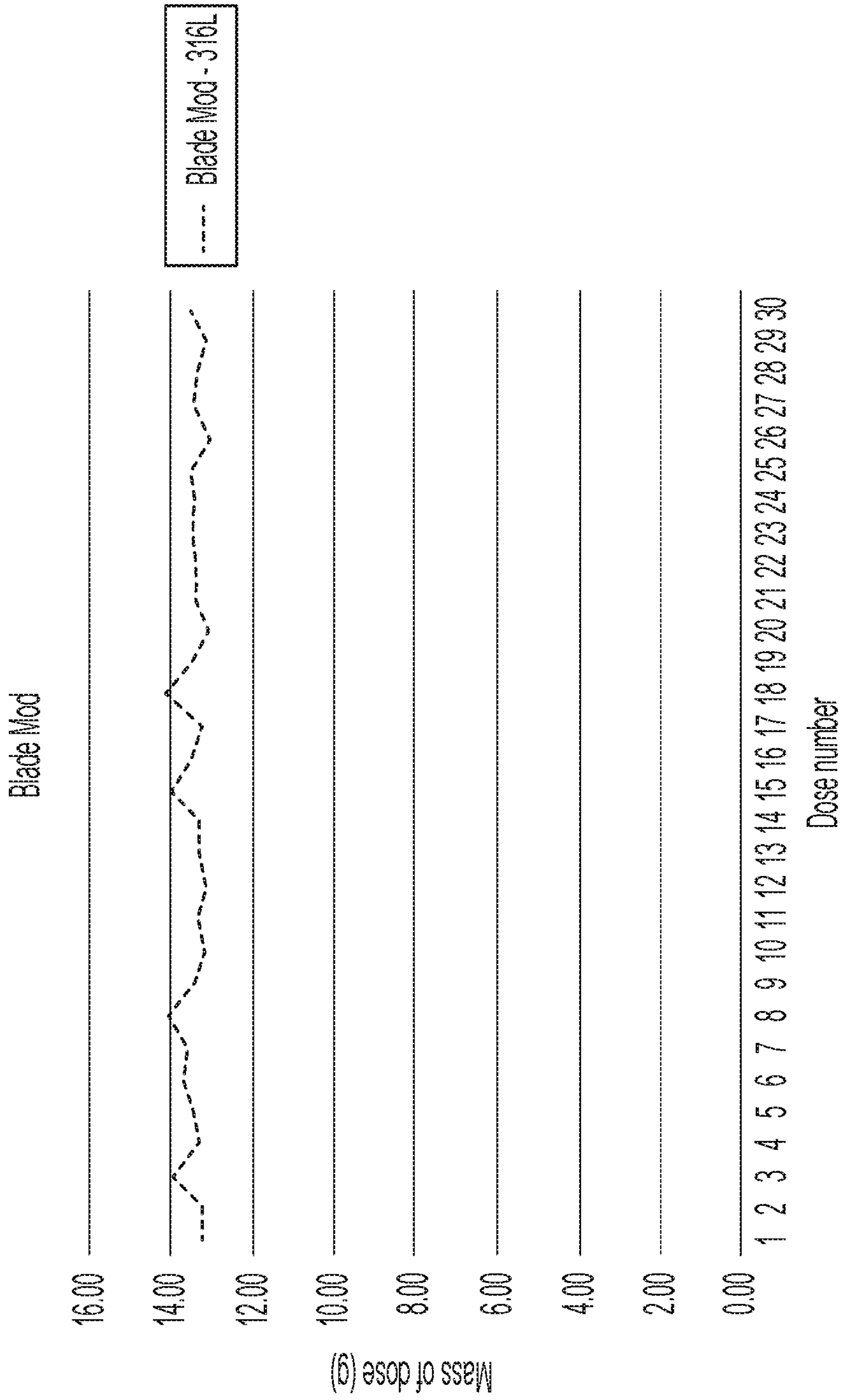
Figures 1, 4G:
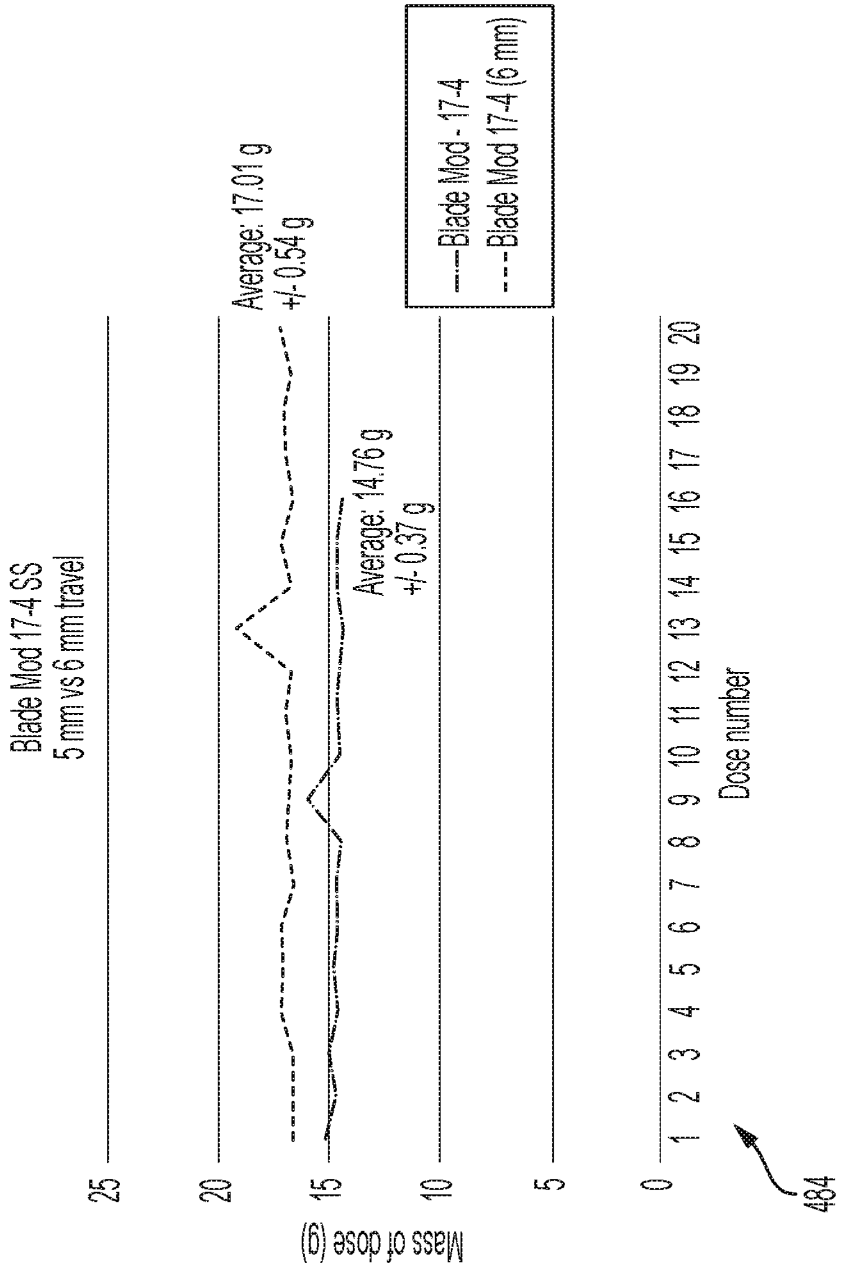
Figures 2, 4G:
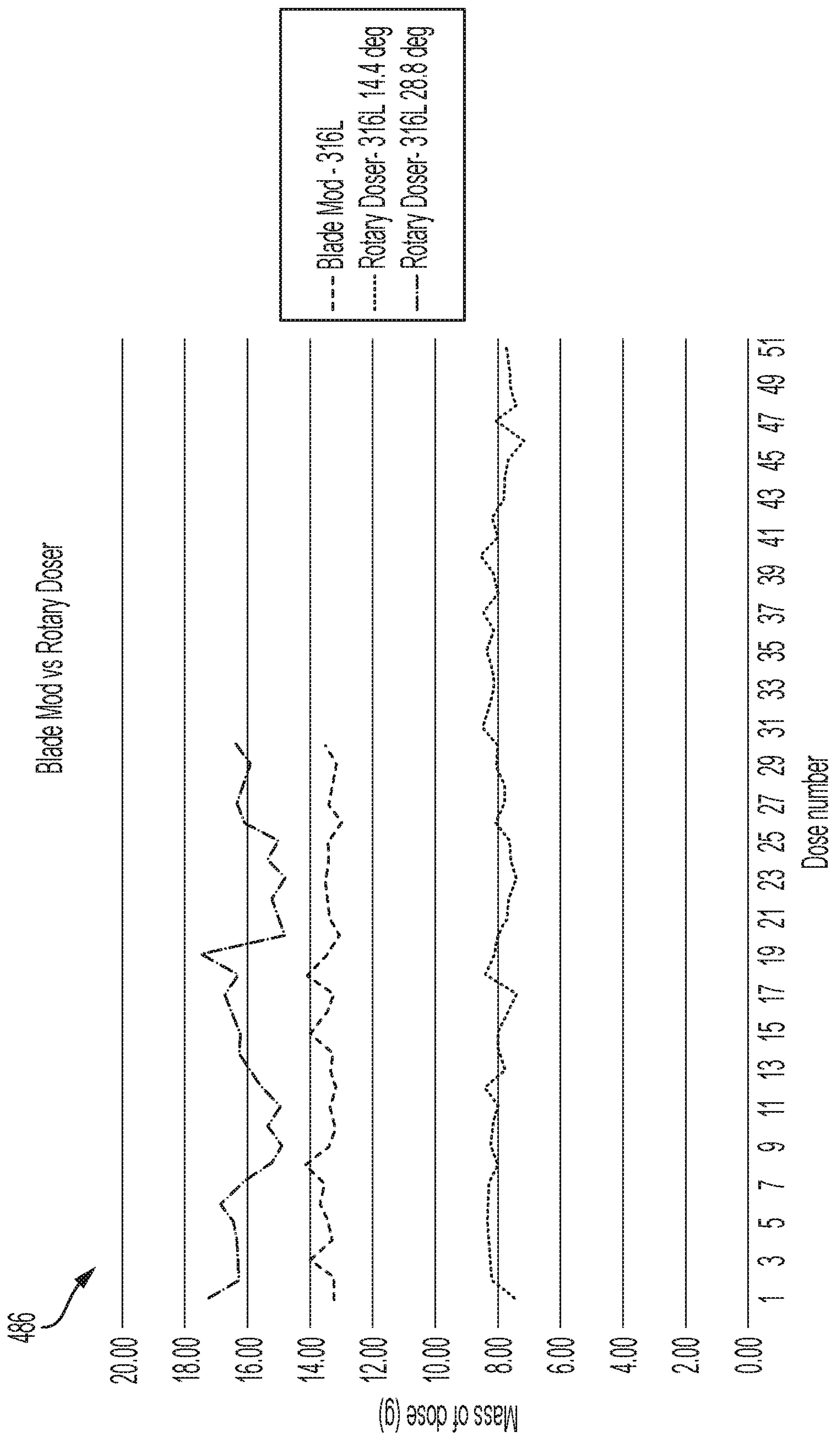
Figures 2, 4G:
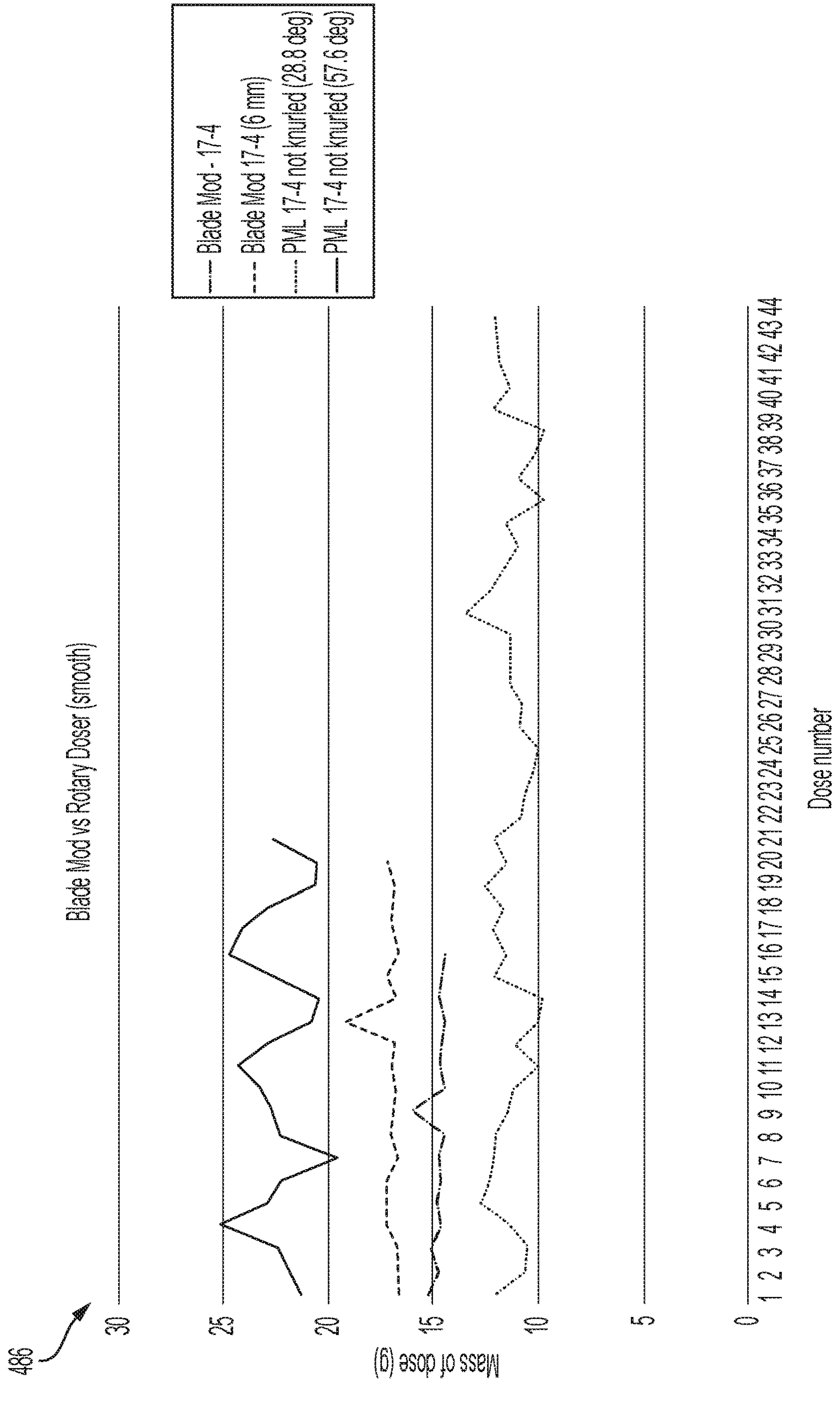

Referring to FIGS. 4G-1-4G-2, exemplary graphs (484 and 486) of experimental test results (in comparison with currently available rotary dosing systems of the material powder in the industry) of the powder dosing via the embodiment of the valve system 470 of FIG. 4D6 are shown.

Adaptive Laser Beam Control System

Figure 5A:
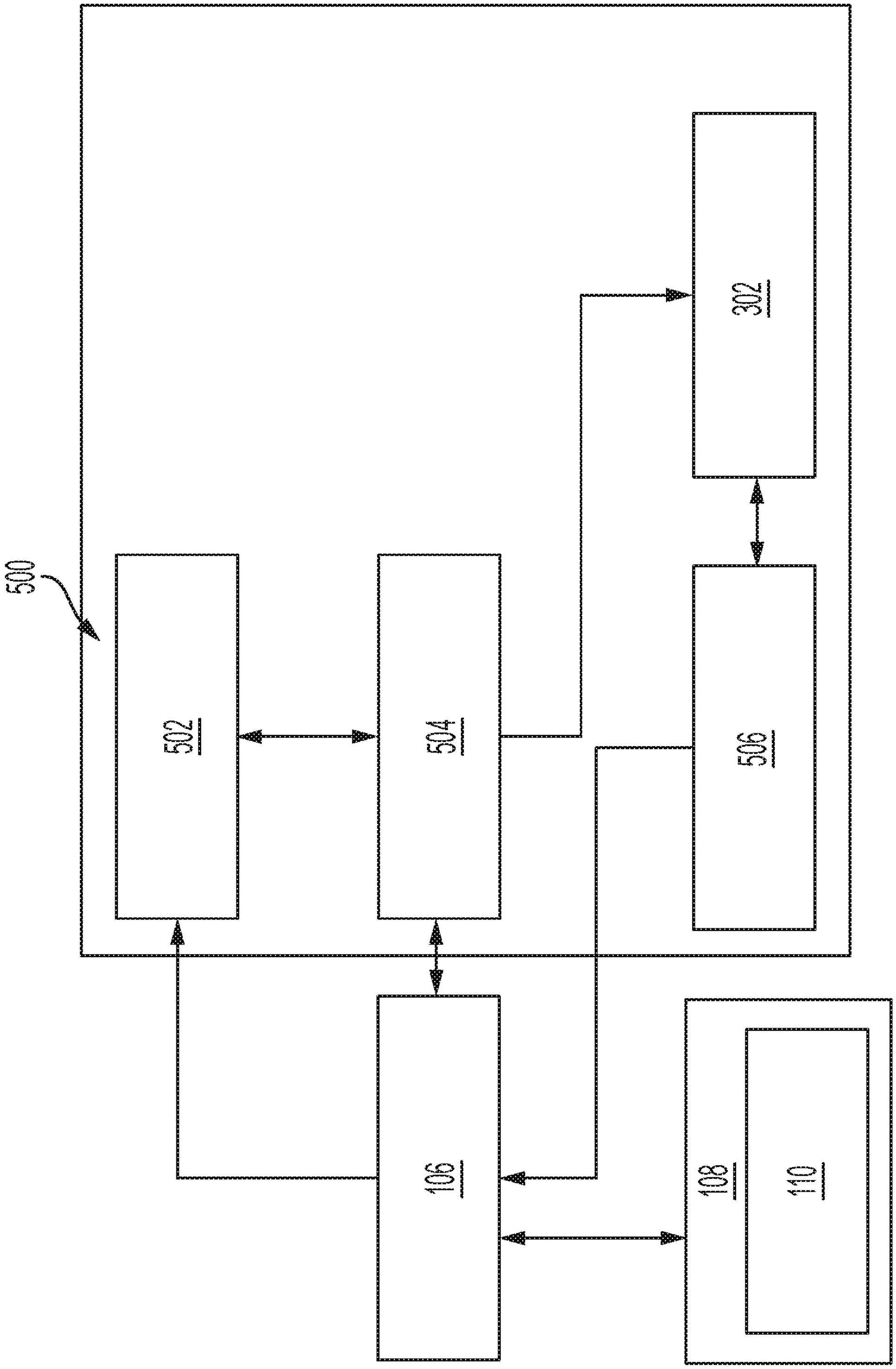
FIG. 5A shows a perspective view of an exemplary embodiment of an adaptive laser beam control (ALBC) system according to an aspect of the additive manufacturing system.

Referring to the drawings, FIG. 5A shows a schematic of an exemplary embodiment of an adaptive laser beam control (ALBC) system 500 according to an aspect of the additive manufacturing system 100. In the embodiment of the ALBC system 500 presented in FIG. 5A, the ALBC system 500 is disposed in the build chamber 200 and is configured to selectively use a laser beam on the build platform 302 to selectively fuse layers of material powder to additively manufacture an object layer-by-layer. FIG. 5A also presents the primary structural components of an embodiment of the ALBC system 500. These include a laser 502, at least one mirror galvanometer 504 to direct a laser beam from the laser 502 to the material powder on the build platform 302, and a monitoring system 506 coupled to the processor 106 and configured to monitor the functionality of the ALBC system 500 (i.e., environmental conditions of the build chamber 200 when the ALBC system 500 is functioning, functionality of the laser 502, and the at least one mirror galvanometer 504). In some embodiments, the functionality of the laser 502 includes the parameters of the laser 502 including wavelength of the laser 502 and intensity of the laser 502. In some embodiments, the environmental conditions of the build chamber 200 monitored by the monitoring system 506 include temperature, humidity, and oxygen level.

The ALBC system 500 is also electrically coupled to the processor 106, where the memory unit 108 coupled to the processor 106 includes the instructions 110 to control the ALBC system 500. In some embodiments, the monitoring system 506 can include a plurality of sensors (i.e., heat sensor, light sensor, etc.) for gathering feedback adjustment data regarding the functionality of the ALBC system 500 and delivering to the processor 106. The processor 106 is configured to adjust the functionality of the ALBC system 500 based on the feedback adjustment data and further direct user input data. In other embodiments, the monitoring system 506 can also include a visual monitoring system (i.e., video camera) to provide a live video feed of the functionality of the laser to the user via a display connected to the processor 106.

In some embodiments, the laser beam is delivered by the laser 502 at a wavelength between 400 nm-500 nm. In some embodiments, the laser beam is delivered by the laser 502 at a wavelength between 500 nm-600 nm. In some embodiments, the laser beam is delivered by the laser 502 at a wavelength greater than 600 nm. In some embodiments, the laser beam is delivered by the laser 502 at a wavelength of 1070 nm. The ALBC system 500 can include other components in addition to and is not limited to the components presented in FIG. 5A.

In the embodiment of the ALBC system 500 presented in FIG. 5A, the ALBC system 500 uses dynamically applied process parameter micro-adjustments to the parameters of the laser 502 and machine learning models to improve the quality of the part to be manufactured by the additive manufacturing system 100. The ALBC system 500 of FIG. 5A is configured to combine hardware monitoring of live processes, data transformation, machine learning, and dynamic application of adjustments during a live manufacturing of a part in order to apply online, high-resolution adjustments to a build. Additionally, the ALBC system 500 also enables a highly flexible, "open loop" printing process for any other method of providing high-resolution parameter adjustments.

This embodiment of the ALBC system 500 of FIG. 5A also employs a software to compute mechanistic features of a toolpath of an additive manufacturing system 100, which is initially fused with direct on-axis data acquisition to train a machine learning model. After the features of a toolpath are distilled and an algorithm is created, thereafter the same features can be generated for any toolpath on any part to produce high-resolution parameter adjustments to correct for predicted build imperfections, such as adapting the parameters of the laser 502 during a build to prevent imperfections. During the manufacturing of a part, the machine-control aspects of the software of the embodiment of the ALBC system 500 of FIG. 5A will apply the feature corrections discussed above, as well as general parameter correction files from any source in a compatible format and apply them dynamically to adjust printing process parameters at microsecond-level intervals.

Figure 5B:
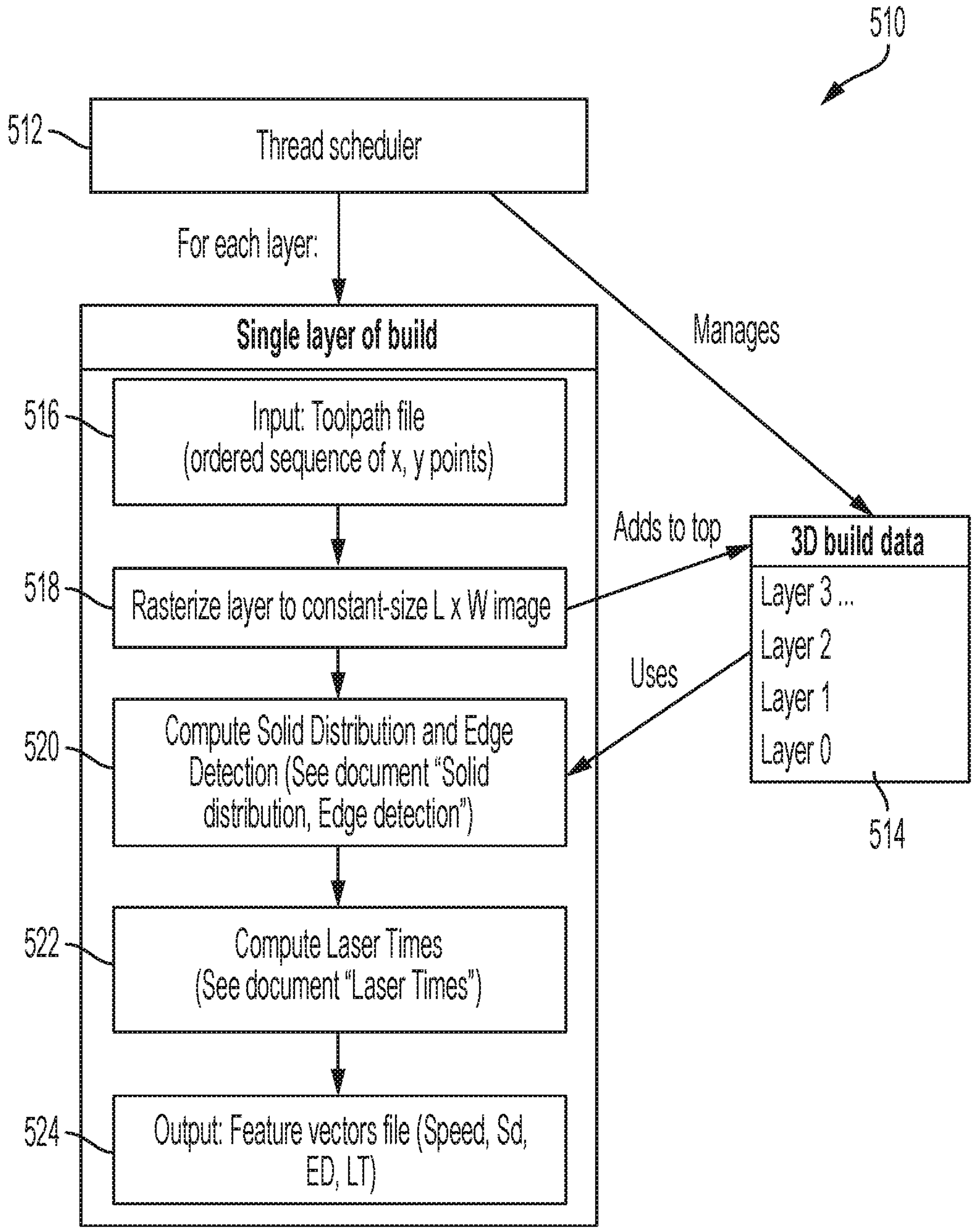
FIG. 5B shows an exemplary block diagram of an embodiment of a method of using an algorithm for generating feature vectors for a given layer of a part to be manufactured according to an aspect of the additive manufacturing system.

Referring now to FIG. 5B, an exemplary block diagram of an embodiment of a method 510 of using an algorithm for generating feature vectors for a given layer of a part to be manufactured is shown. In this embodiment, the method 510 includes providing a thread scheduler 512, where each thread of the thread scheduler incorporates a unit of execution corresponding to each layer for the part to be manufactured. The thread scheduler is configured to manage three dimensional (3D) build data 514 of the part to be manufactured. For each layer to be built, the method 510 further includes inputting a toolpath 516 comprising an ordered sequence of X and Y axis data for the part to be manufactured, rasterizing the ordered sequence from the tool path file into a set of pixels defining a constant length and width of the layer 518, computing a distribution of the material powder for that layer and detecting the edge of the layer 520, computing the time for exposure to the laser beam 522, and finally, outputting a file containing feature vectors 524.

In some embodiments of the method of FIG. 5B, the algorithm can use a mathematical notation to compute the worst-case time complexity (i.e, how long an algorithm takes to run). In some embodiments of the method of FIG. 5B, the mathematical notation to compute the worst-case time complexity is a "Big O Notation" (incorporated by reference and commonly known to a person skilled in the art). In some embodiments of the method of FIG. 5B, a part with the dimensions of 10×15×10 mm needs the algorithm run time of 10 min to compute mechanistic features of an additive manufacturing machine toolpath, with time complexity approaching linear O(n) and enhanced flexibility in its data representation. For comparison, prior methods to create an algorithm to compute mechanistic features of an additive manufacturing machine toolpath may take a prohibitively long time, such as greater than 30 hours for a roughly 10×15×10 mm part, and the prior algorithms have with O(n2) quadratic time complexity and had low flexibility in its data structure implementation.

Referring to the method of FIG. 5B, the algorithm further includes a machine-control for generating the exact machine toolpath at build-time. In this embodiment, during the live manufacturing of the part, the monitoring system 506 (presented in FIG. 5A) can provide toolpath correction files as input to the method of FIG. 5A, allowing precision in laser commands, in which parameters can be adjusted a layer at a time (i.e dynamic modeling). For the current embodiment of FIG. 5B, the input toolpath correction file format relates an (xs, ys), (xe, ye) region to a parameter correction (such as laser power or profile for example).

In some embodiments, other toolpath correction files that relates a point in the toolpath to an adjustment can be used as a toolpath correction input. In some embodiments, the toolpath correction files can be json files that are arbitrarysized collections of xy-region-start, xy-region-end, and/or laser-power-correction % data, and csv files that are a grid of laser power corrections, plus metadata describing the size of each grid tile of the specific layer. In some embodiments of the method of FIG. 5B, a toolpath correction file can be a user defined external toolpath correction files that can have an association of locations to a scalar modifier, allowing for more advanced machine users to define their own external correction files, which can either be preprocessed before the build, or generated during the build. In some embodiments of the method of FIG. 5B, the user defined external input can include the modification of parameters in the input file including, and not limited to, laser power, speed, profile (spot size), hatch distance and location.

Figure 5C:
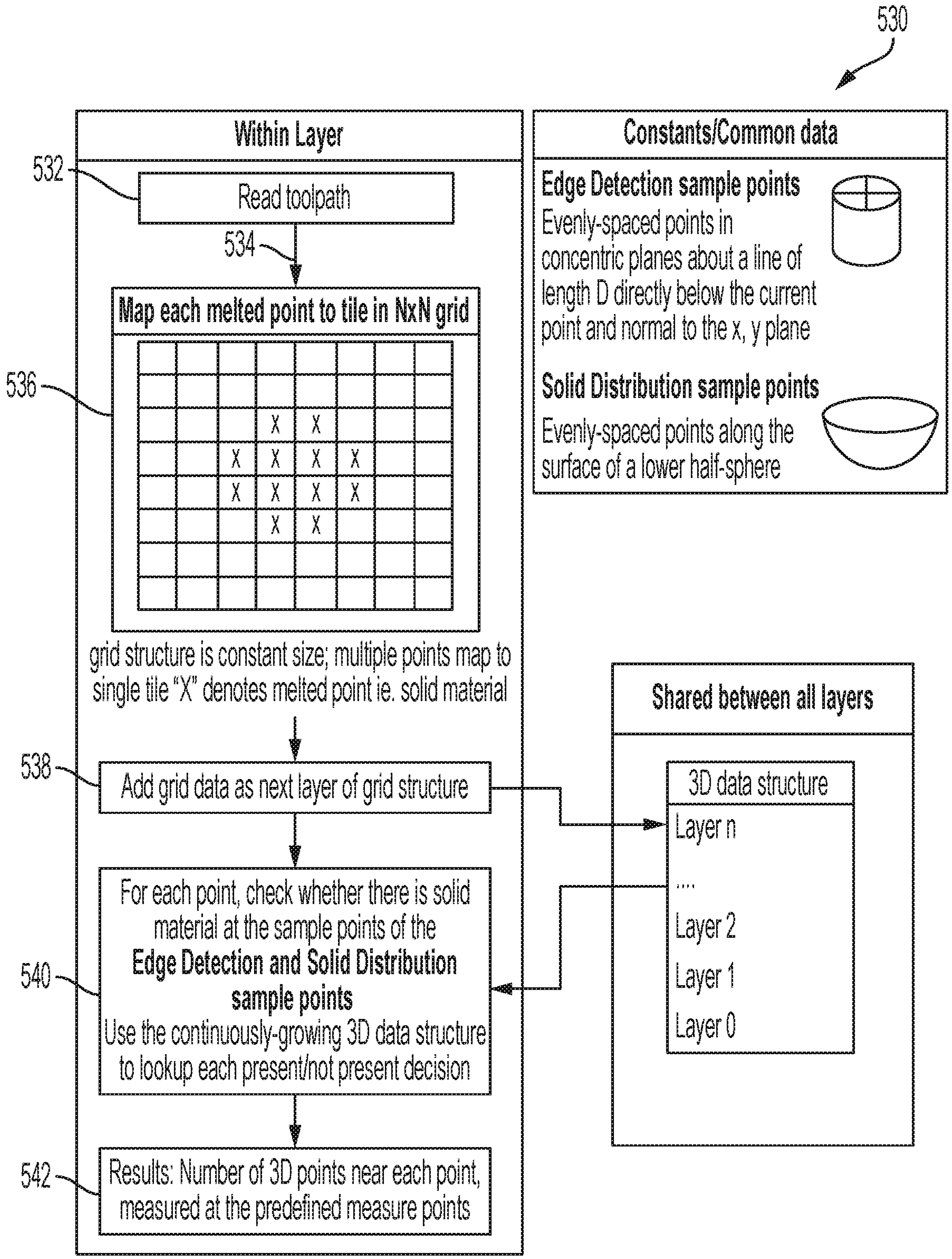
FIG. 5C shows an exemplary block diagram of an embodiment of a method of computing the distribution of the material powder for that layer and detecting the edge of the layer according to an aspect of the additive manufacturing system.

Referring to FIG. 5C, an exemplary block diagram of an embodiment of the method 530 of computing the distribution of the material powder for that layer and detecting the edge of the layer 520 (refer to FIG. 5B) is shown. In this embodiment, the steps to this method, using a distribution and edge detection algorithm, include reading the input toolpath data 532, converting the input toolpath data into plurality of points 534, mapping into each point of the plurality of points to a tile on a grid to identify grid data corresponding to each layer 536, storing grid data for each layer of the part to be manufactured 538, identifying, for each point, the presence of solid material to identify if a point is an edge detection point (i.e., defined as a constant and represents evenly-spaced points in concentric planes about a line of length D directly below the current point and normal to the X, Y plane) or a solid distribution point (i.e., defined as a constant and represents evenly spaced points along the surface of a lower half-sphere) using the 3D data structure managed by the thread scheduler (refer to FIG. 5A) 540, and determining distribution of material powder and the edge of each layer 542.

In this embodiment of the method 530 of 5C, the method 530 retains the overall O(n) linear performance and reduces the memory requirements. The method 530 of this embodiment also advantageously leaves room for further developments as the resolution of the each of the layer's image can be freely modified without invalidating the algorithm.

Figure 5D:
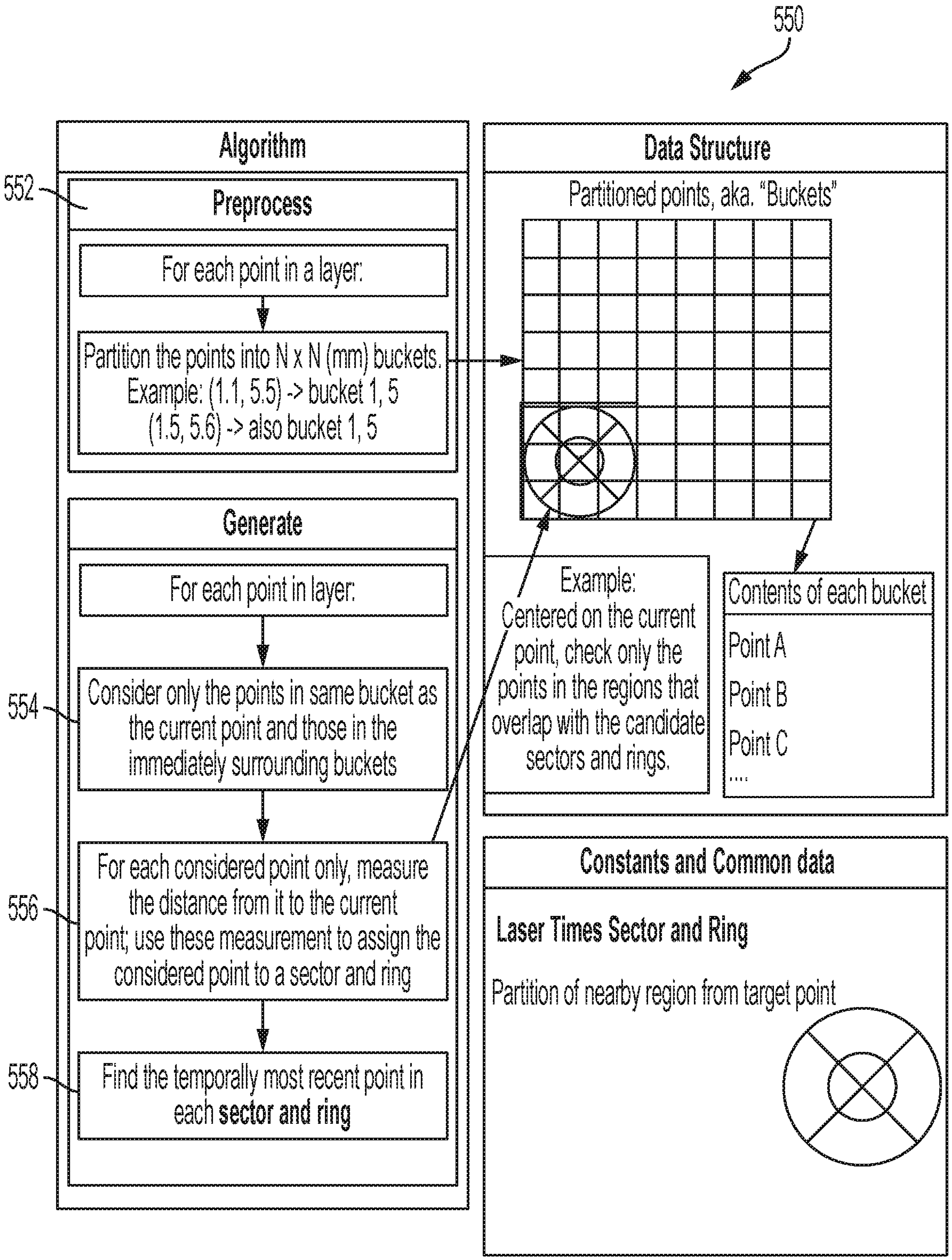
FIG. 5D shows an exemplary block diagram of an embodiment of a method for computing the time for exposure to the laser beam from the laser according to an aspect of the additive manufacturing system.

Referring to FIG. 5D, an exemplary block diagram of an embodiment of the method 550 for computing the time for exposure to the laser beam from the laser ("laser time") 522 (refer to FIG. 5A) is shown. The method 550 of FIG. 5D, using a laser time calculation algorithm, includes the steps of preprocessing the input toolpath data into spatially located regions (i.e. "buckets") 552 comprising a plurality of points in each layer, identifying a designated point from the plurality of points as representation of that "bucket" 554, measuring a distance from the designated point to a target point in each region 556, identifying the minimum value in each region, sorting values in each region to a sector and a ring corresponding to the points in buckets in each layer, and outputting vector values 558.

In this embodiment of FIG. 5D, each point in the layer are portioned into spatially local regions (or "buckets") in O(n) linear time, where only the points near the current point are considered for calculations. This results in an overall complexity reduction to O(nm) time and O(n) memory for the entire toolpath. In addition to reducing the complexity class, the absolute number of distance calculations (which are computationally expensive) are also significantly reduced, since only points that are potentially significant are checked (i.e., points that are too far from the target point to have any possibility of affecting the result are automatically excluded).

Dynamic Gas Flow System

Figure 6A:
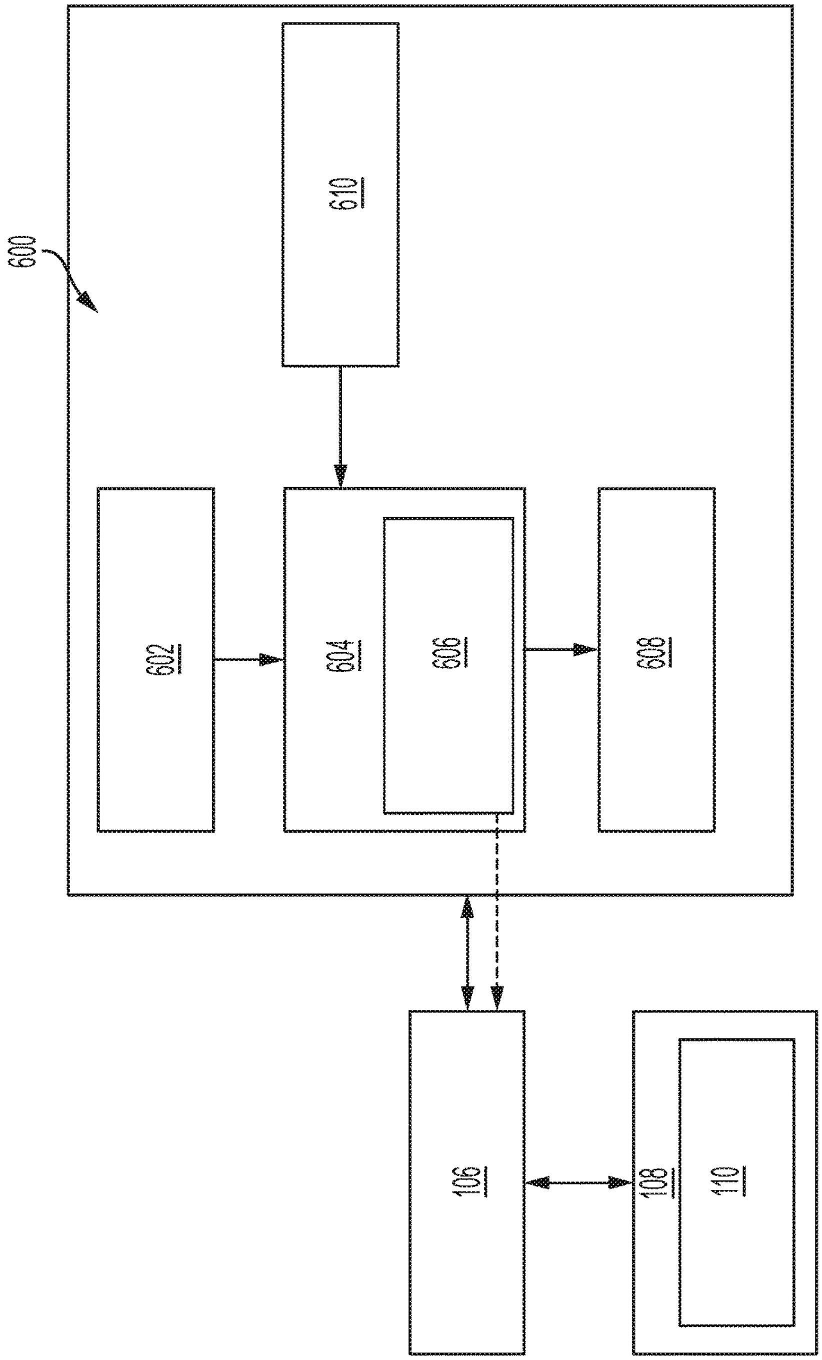
FIG. 6A shows a schematic of an exemplary embodiment of a dynamic gas flow (DGF) system according to an aspect of the additive manufacturing system.

Optimal gas flow is critical for an additive manufacturing system 100 that uses an irradiation device (i.e., the ALBC system 500). Optimal gas flow conditions may vary, but are usually uniform flow, laminar flow, and relatively high volumetric flow to remove particulates from the build chamber 200 or around the irradiation device. Referring to FIG. 6A, a schematic of an exemplary aspect of a dynamic gas flow (DGF) system 600 is shown. The DGF is configured to dynamically adjust the gas flow in the build chamber 200 to optimize the function of the additive manufacturing system 100 via removal of particulates and prevention of impairment of the functioning of the laser 502 of the ALBC system 500.

In the embodiment of the DGF system 600 shown in FIG. 6A, The DGF system 600 comprises at least one gas inlet 602, at least one gas outlet 608, at least one bypass gas inlet 610, a dynamic flow surface 604 disposed within the build chamber 200 and configured to facilitate a flow of the input gas and a flow of the output gas, and a gas flow management system 606 to provide feedback on conditions in the build chamber 200 to adjust operation of the DGF system 600. The feedback from the gas flow management system 606 can include, for example, during a recoating process, gas flow may be reduced, redirected, or interrupted to avoid powder erosion from gas flow acceleration and turbulence caused by the recoater 410. Another example of the feedback includes increasing the volumetric flow rate in situations where there is a high particulate generation by a large melted cross-sectional area—or be increased up and down depending on the location of the laser 502 in a given time step. The DGF system 600 is also electrically coupled to the processor 106, where the memory unit 108 coupled to the processor 106 includes the instructions 110 to receive feedback from the gas flow management system 606 and control the DGF system 600. The DGF system 600 can include other components in addition to and is not limited to the components presented in FIG. 6A.

In some embodiments of the DGF system 600, the DGF system 600 can direct the gas supply to the gas inlet 602 into the build chamber 200 and remove the gas from the build chamber 200 through gas outlet 608. In different embodiments, a different number of gas inlets 602 and gas outlets 608 may be selectively used to create different flow paths, thereby permitting better gas flow angles for certain builds or to avoid the architecture of the build chamber 200 (including the recoater 410). In some embodiments of the DGF system 600 can be configured to pump an inert gas (e.g., Argon) into the build chamber 200 via the gas inlet 602 to purge oxygen gas from the build chamber 200 via the gas outlets 608 until a user determined target threshold pressure is reached in the build chamber 200 and the build chamber 200 is sealed. In some embodiments of the DGF 600, the DGF 600, via the instructions 110 stored in the memory unit 108 of the processor 106, is configured to automatically pressurize the build chamber 200 to a target threshold pressure.

In some embodiments of the DGF system 600, the gas inlets 602 can be used to provide primary gas flow for removing particulates from the build platform 302, for suppressing gas flow recirculation, for directing particulates away from the laser 502, and/or for providing flow across the irradiation device transmission surface to keep it functioning properly. In various embodiments of the DGF system 600, the DGF system 600 can be configured to promote gas flow away from the laser 502 and not recirculating in the area of the laser 502 to prevent impeding the function of the laser 502 and to have relatively high gas flow rates around the build platform 302 (i.e., on the powder bed 326) to remove particulates.

In some embodiments of the DGF system 600, the gas inlets 602 and gas outlets 608 can be used to maintain a target-pressure inside the build chamber 200. In this embodiment, a user can input the target-pressure via the processor 106 and the primary gas flow (i.e. an inert gas like argon) via the gas inlet 602 can be used to pressurize the build chamber 200 and the gas outlets 608 can be used to remove any oxygen (i.e., the concentration of oxygen gas in the build chamber can be measure via oxygen sensors) in the build chamber 200. In this embodiment of the DGF system 600, a pressure sensor (part of the gas flow management system 606) disposed in the build chamber 200 can be configured to monitor the pressure of the build chamber 200 regularly at a user-define time period when the additive manufacturing system is activated. If the pressure inside the build chamber 200 rises or drops with regards to the target-pressure, the DGF system 600, via the processor 106, can be configured to use the gas inlets 602 and the gas outlets 608 to change the pressure inside the build chamber 200 to the target-pressure defined by the user. In some embodiments of the DGF system 600, the processor 106 is configured to display a rise or drop in pressure inside the build chamber 200 via a user-interactive interface. In other embodiments of the DGF system 600, if the pressure drop or pressure increase in the build chamber is significant with regards to the target-pressure, the processor 106 is configured to do a repeated pressure reading with the pressure sensor inside the build chamber 200 and turning the additive manufacturing system 100 off if the pressure rise or drop cannot be adjusted to the target-pressure defined by the user.

In some embodiments of the DGF system 600, adjustment of the gas flow can be dependent on where the laser 502 is configured to work in the build chamber 200. For example, in the embodiment of the DGF system 600 of FIG. 6A, the DGF system 600 can adjust the gas flow toward that area in the build chamber 200 to remove particulates created by the irradiation device when the laser 502 is working on manufacturing the part in one corner of the build chamber 200. In some embodiments of the DGF system 600, the gas flow management system 606 of the DGF system can be configured to include a controller (not shown in FIG. 6A) that is in communication with the processor and is configured to contain the steps for creating the part and knowing what location the laser 502 will be working at any given time. In some embodiments, the controller can also be contain information on how long it will take for the gas flow to adjust and re-establish the target gas flow conditions depending on which or how many gas inlets 602 and gas outlets 608 are being utilized simultaneously.

In some embodiments of the DGF system 600 shown in FIG. 6A, the DGF system 600 can also redirect the gas flow during the recoating process when the laser 502 is not working to ensure optimal recoating without new material powder erosion caused by relatively accelerated gas flow and turbulent flow conditions. In some embodiments of the DGF system 600, the DGF system 600 can reduce the gas flow in the vicinity of the recoater 410 during the recoating process such as by utilizing specific gas inlets 602 and gas outlets 608 to the build chamber 200. In many embodiments of the DGF system 600, adjustment of the gas flow can be achieved by controlling parameters, via the processor 106, including power of the laser 502, diameter of the laser 502, time the laser 502 spends in particular working region, type of material powder, part being manufactured, and build time.

Figure 6B:
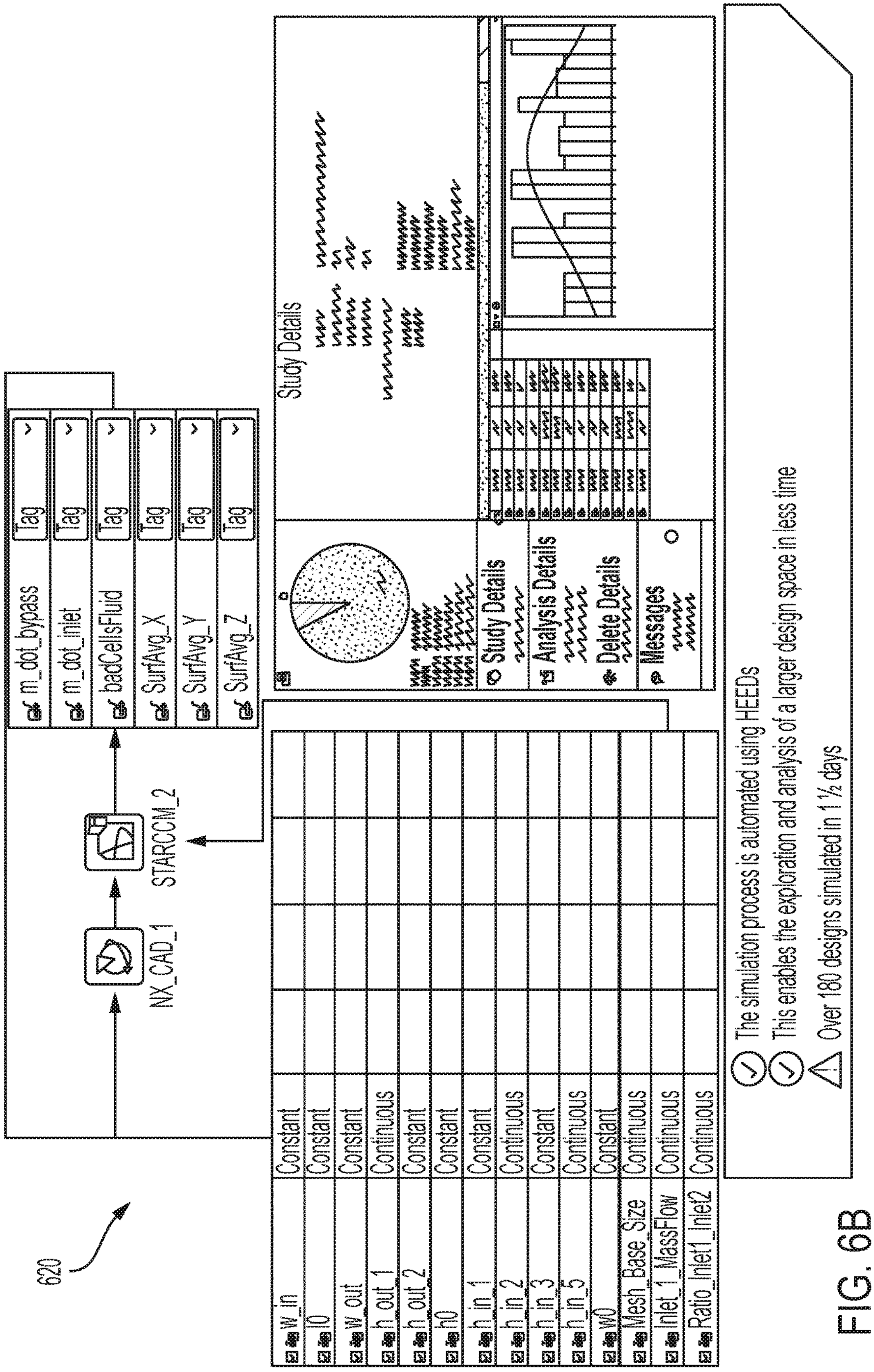
FIGS. 6B-6D show screenshots of process screens of an exemplary simulation to determine the embodiment of the DGF system according to an aspect of the additive manufacturing system.
Figure 6C:
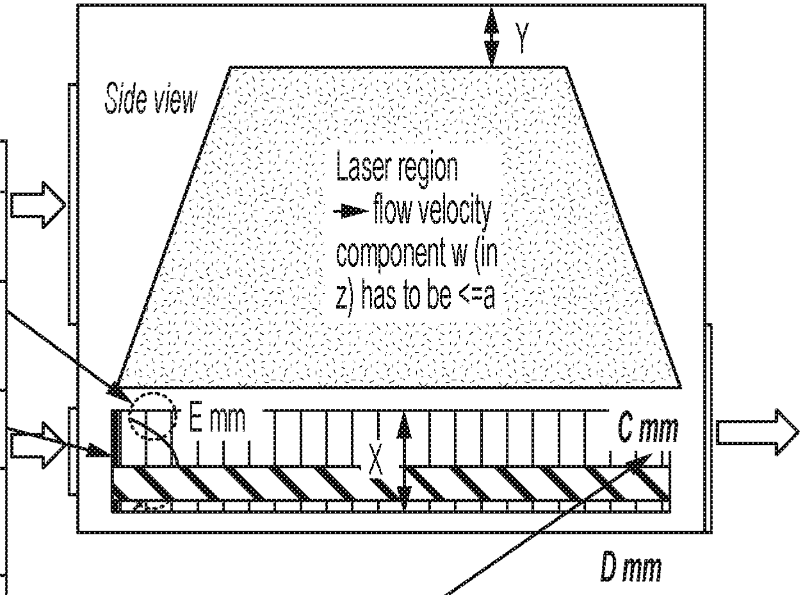
Figure 6D:
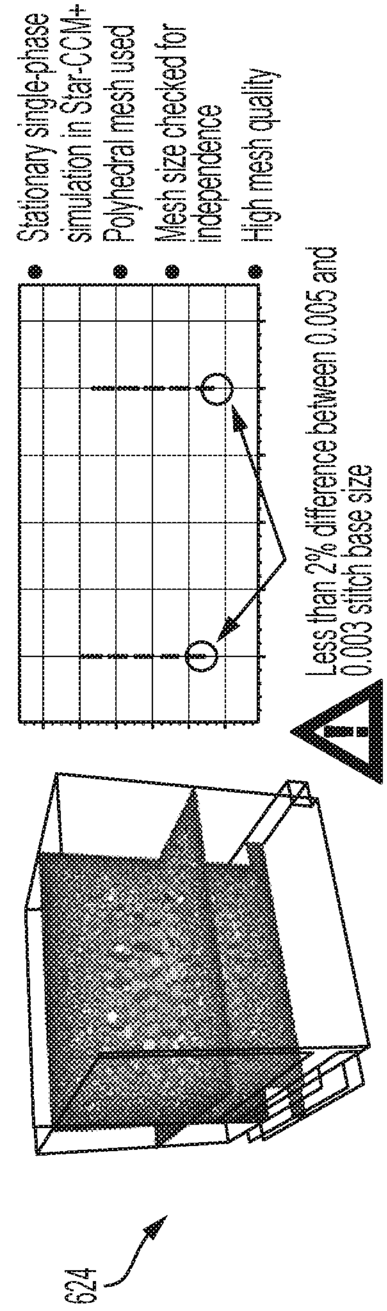

As described above, the appropriate embodiment of the DGF system 600 of FIG. 6A is chosen as needed by the aspect of the additive manufacturing system 100. Referring to FIGS. 6B-6D, screenshots (620-624) of process screens of an exemplary simulation to determine the embodiment of the DGF system 600 is shown. In the screenshot 620 of FIG. 6B, the geometric conditions of the simulation are established. In the screenshot 622 of FIG. 6C, various parameters (e.g., volumetric flowrate, etc.) are considered in relation to the gas flow in the laser region of the build chamber 200 (actual parameter numbers have been replaced by placeholder values). In the screenshot 624 of FIG. 6D, an exemplary mesh is generated by the simulation based on the parameters discussed in FIG. 6C. In some embodiments of the simulation, the simulation process can be automated with software such as HEEDs.

Figure 6E:
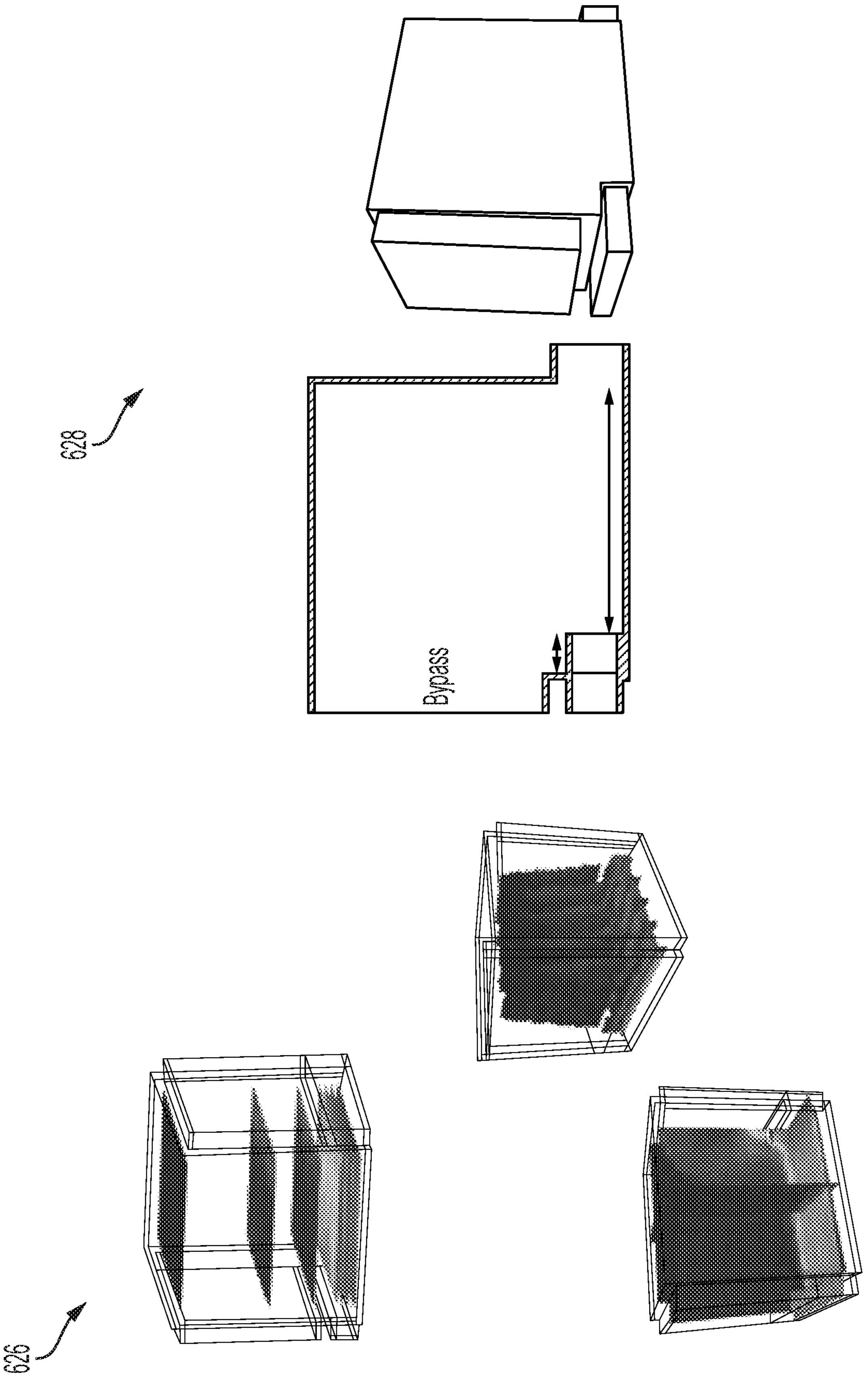
FIG. 6E shows exemplary screenshots of analysis by the simulation of the gas flow at multiple layers of the simulated build chamber according to an aspect of the additive manufacturing system.

Referring to FIG. 6E, exemplary screenshots (626 and 628) of analysis by the simulation of the gas flow at multiple layers of the simulated build chamber 200 from FIG. 6D are shown.

Figures 1, 6F:
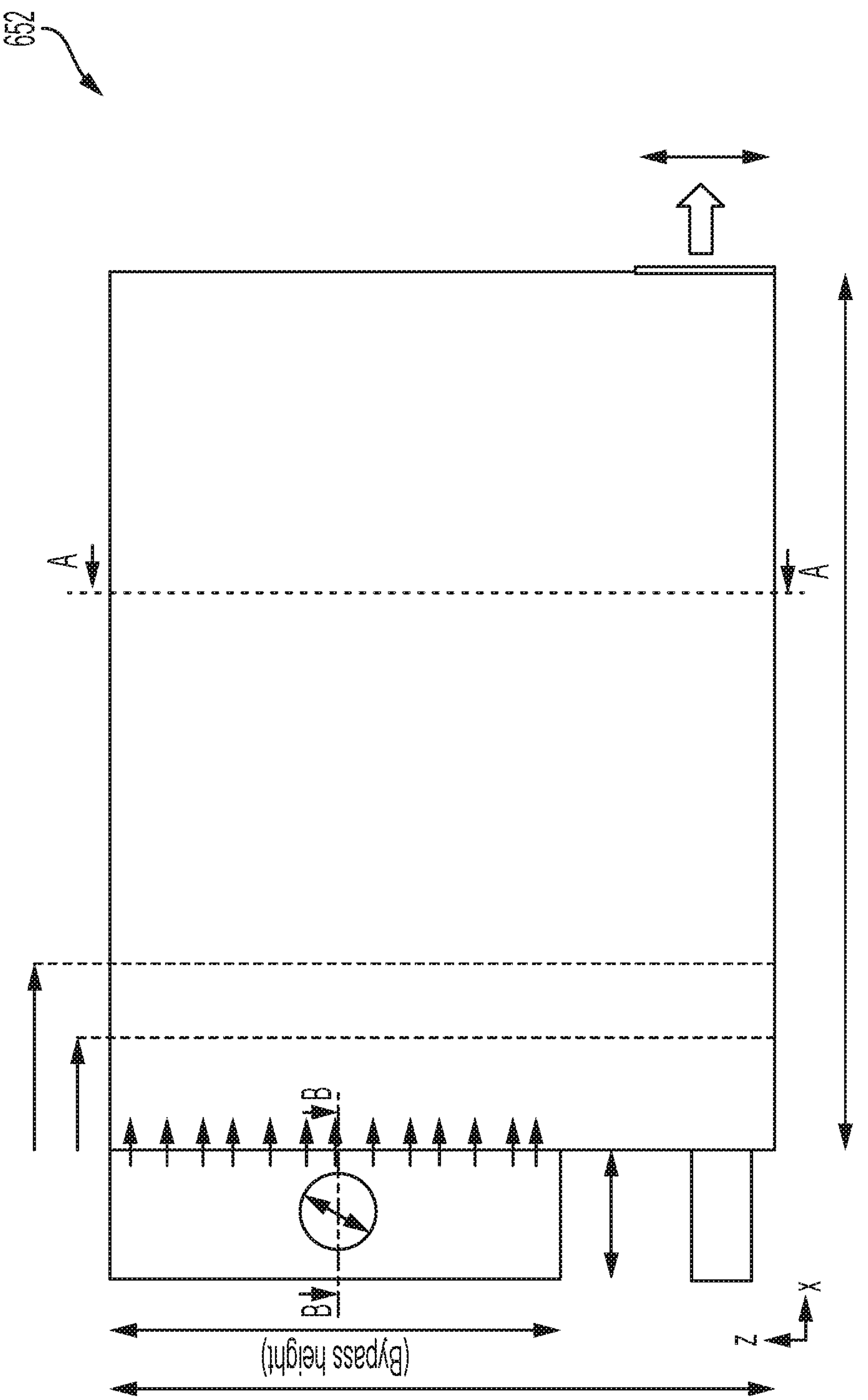
Figures 2, 6F:
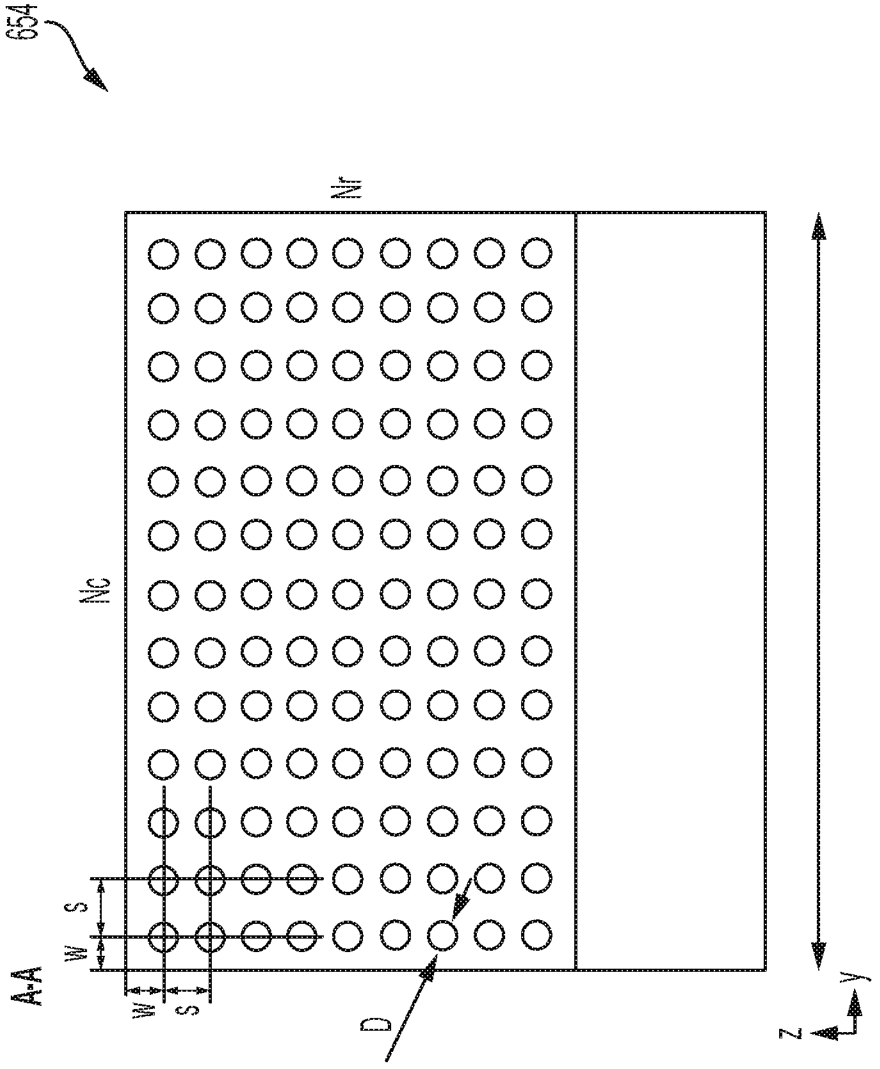
Figures 4, 6F:
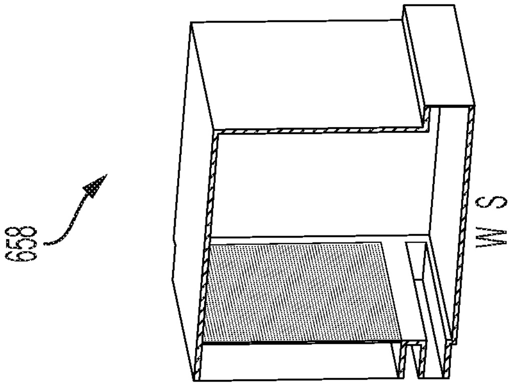
Figures 3, 6F:
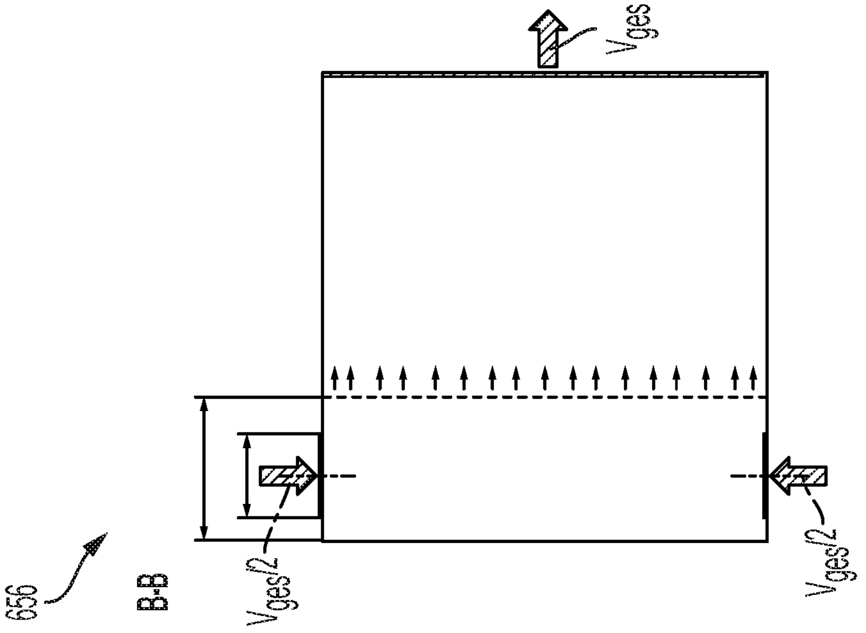

Referring to FIGS. 6F-1-6F-4, exemplary screenshots (652-658) of the outputs of the simulation presenting an optimized embodiment of the DGF system 600 are shown. FIGS. 6F-1-6F-3 present exemplary screenshots (652-656) with exemplary schematic of an optimized embodiment of the DGF system 600 which include location of placement of the bypass gas inlet 610, optimization of the hole sizes and hole spacing of the bypass gas inlet 610. Using optimized hole sizes and hole spacing as determined by simulations of various flow conditions provides improved functionality of the DGF system 600. FIG. 6F-4 presents an exemplary screenshot (658) of the 3D rendering and a mesh, respectively, based on the optimized embodiment of the DGF system 600.

Figures 1, 6G:
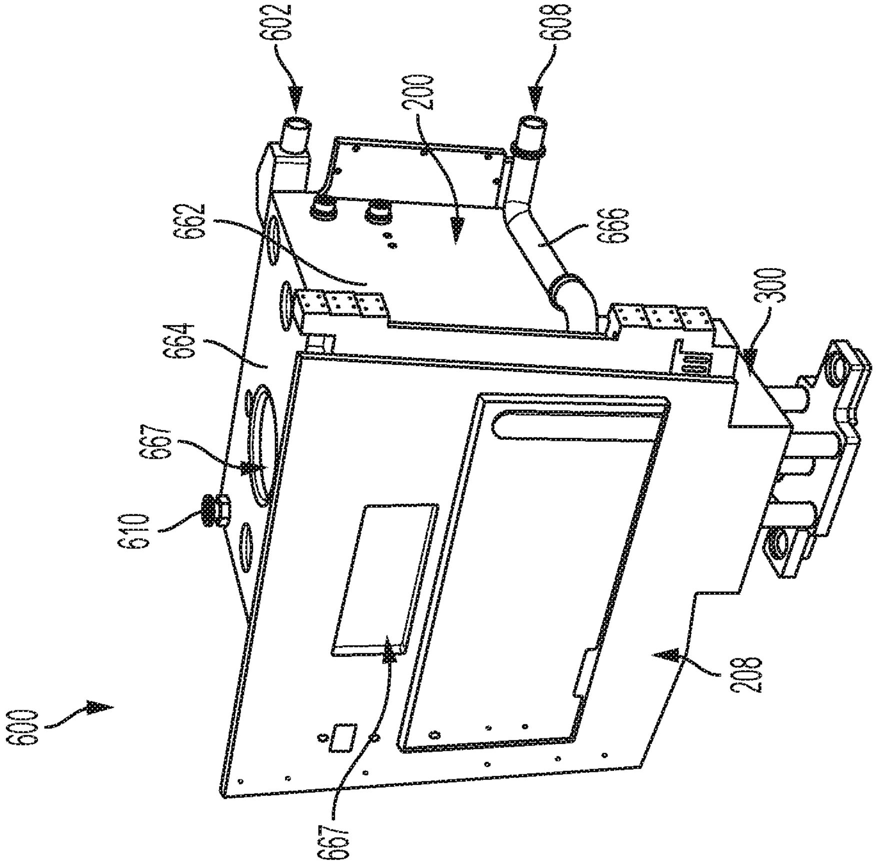
Figures 2, 6G:
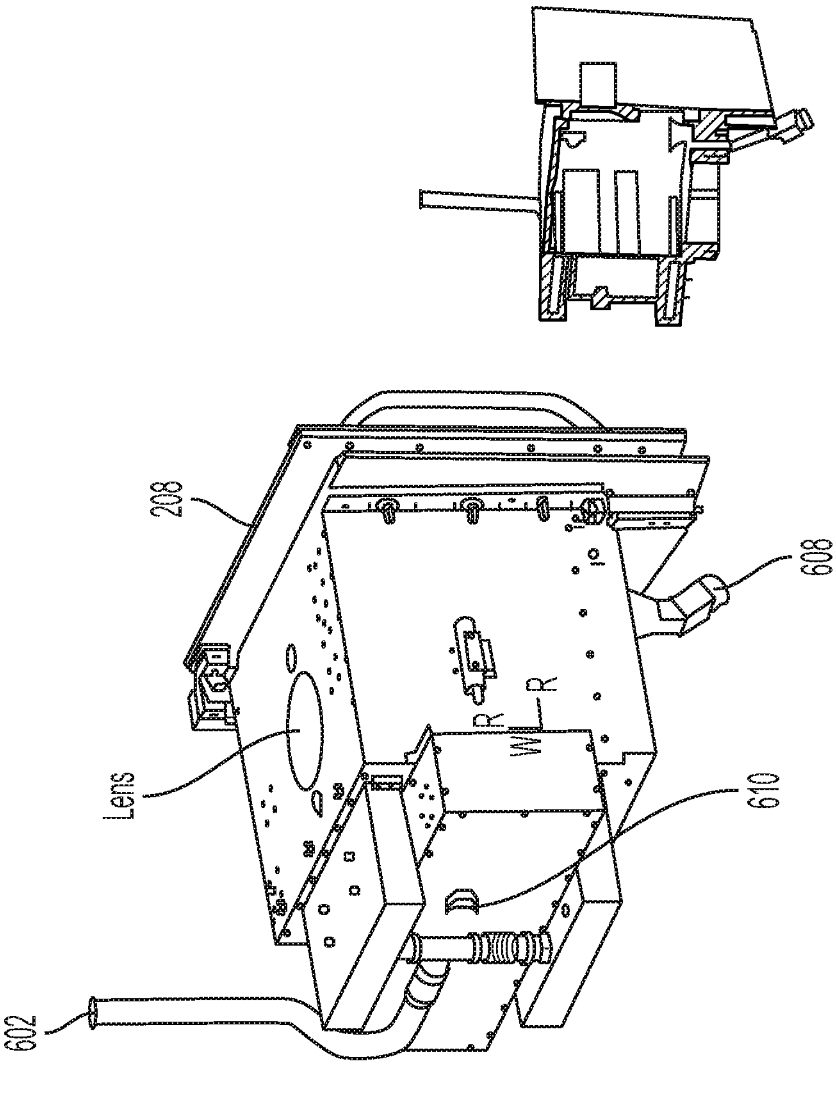

Referring to FIGS. 6G-1-6G-2, perspective views of exemplary embodiments of the DGF system 600 are shown. In the embodiment of FIG. 6G-1, the DGF system 600 includes the gas inlet 602 disposed on a side 662 of the build chamber 200 closer to a roof 664 of the build chamber 200, and the gas outlet 608 disposed on the side 662 of the build chamber 200 closer to a floor 666 of the build chamber 200. In the embodiment of FIG. 6G-2, the DGF system 600 includes the gas inlet 602 disposed on a side 662 of the build chamber 200 closer to the roof 664 of the build chamber, and the gas outlet 608 disposed near the front of the floor 666 of the build chamber 200. The embodiment of the DGF system 600 in FIG. 6G-2 further includes the bypass gas inlet 610.

Figures 2, 6H:
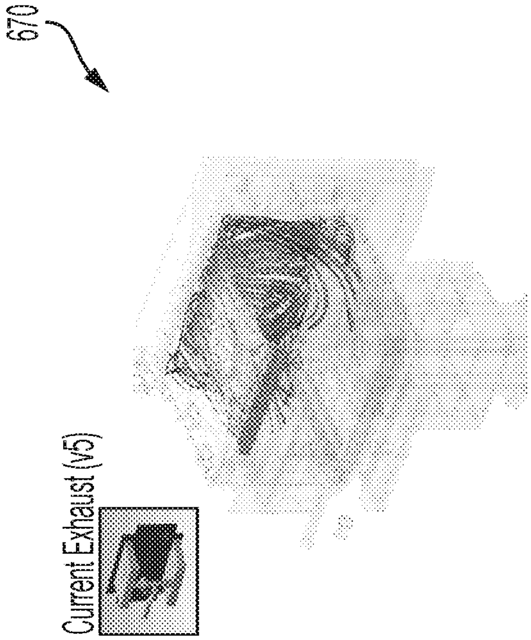
Figures 1, 6H:
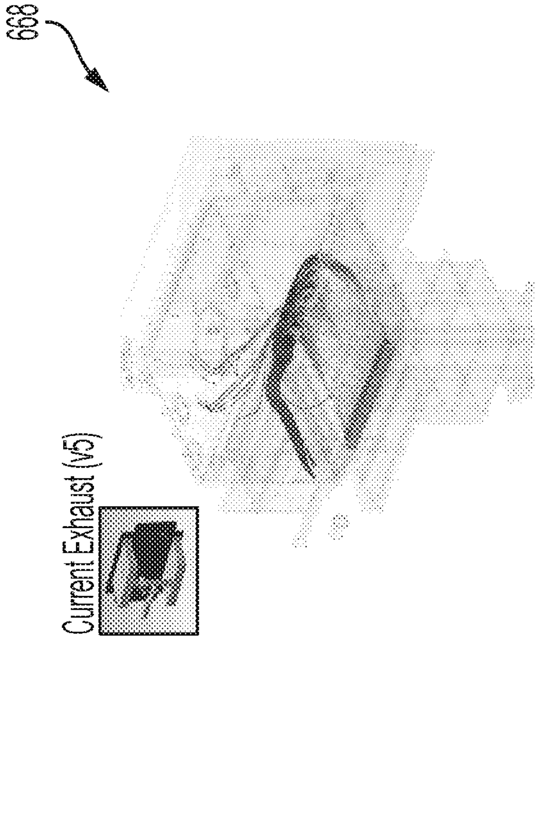
Figures 3, 6H:
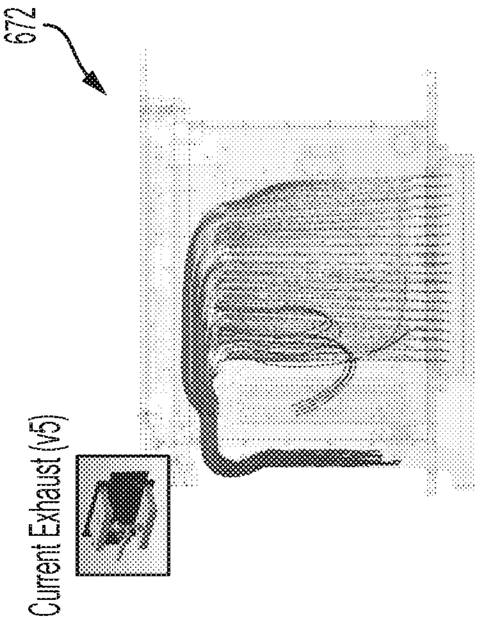

Referring to FIGS. 6H-1-6H-2, exemplary screenshots (668-670) of analysis by the simulation of the gas flow by embodiments of the DGF system 600 of FIG. 6G-1 with a lower gas inlet 602 and an upper gas inlet 602 are shown respectively.

Referring to FIG. 6H-3, an exemplary screenshot (672) of analysis by the simulation of the gas flow from a top view by an embodiment of the DGF system 600 is shown.

Figures 1, 6I:
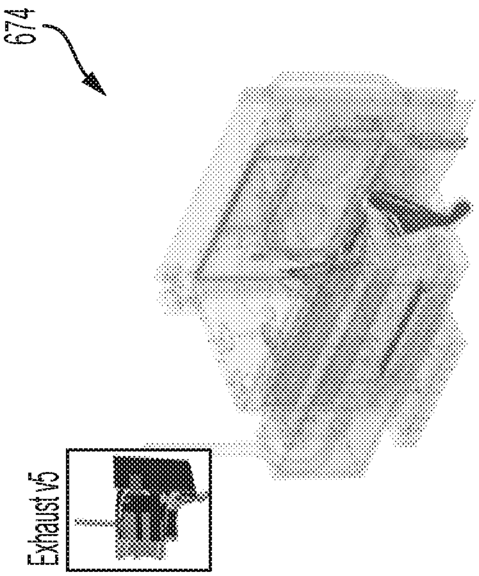
Figures 2, 6I:
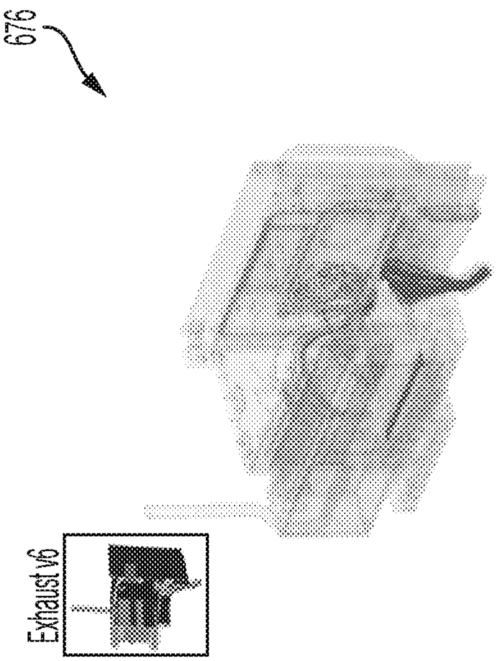
Figures 3, 6I:
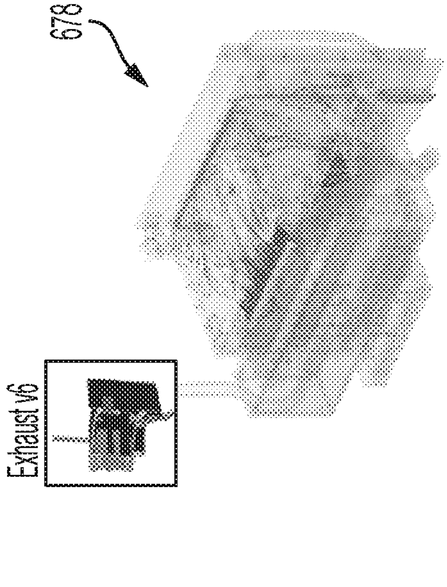
Figures 4, 6I:
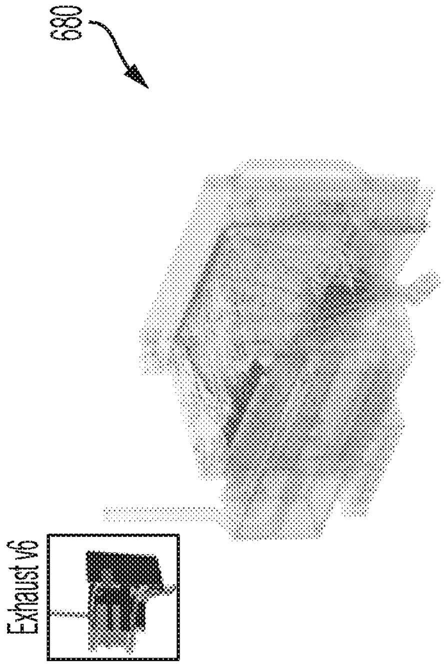
Figures 5, 6I:
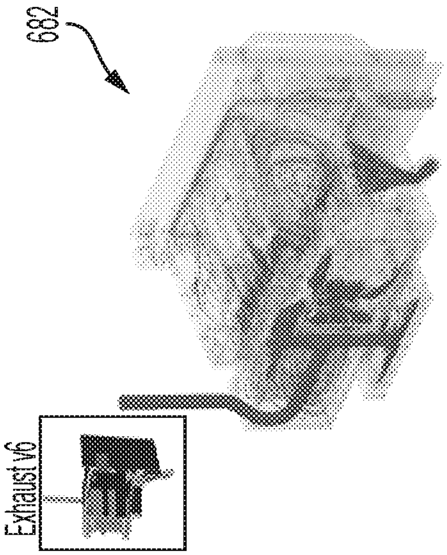
Figures 6, 6I:
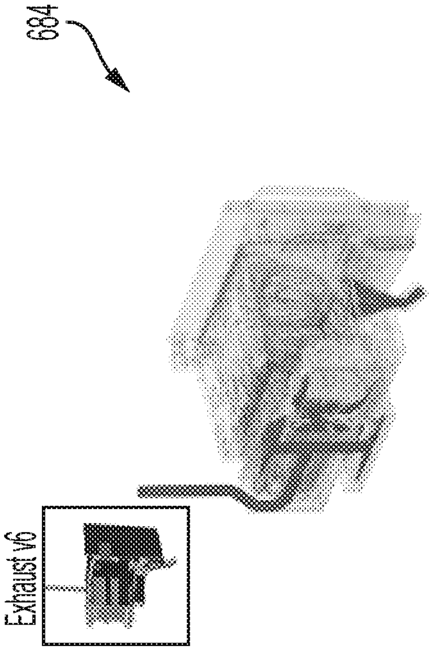

Referring to FIGS. 6I-1-6I-2, exemplary screenshots (674-676) of analysis by the simulation of the gas flow by embodiments of the DGF system 600 of FIG. 6G-2 with a gas flow only into a lower gas inlet 602 are shown respectively.

Referring to FIGS. 6I-3-6I-4, exemplary screenshots (678-680) of analysis by the simulation of the gas flow by embodiments of the DGF system 600 of FIG. 6G-2 with a gas flow only into an upper gas inlet 602 are shown respectively.

Referring to FIGS. 6I-5-6I-6, exemplary screenshots (682-684) of analysis by the simulation of the gas flow by embodiments of the DGF system 600 of FIG. 6G-2 with gas flow into an upper gas inlet 602 and the bypass gas inlet 602 are shown respectively.

Figures 2, 6J:
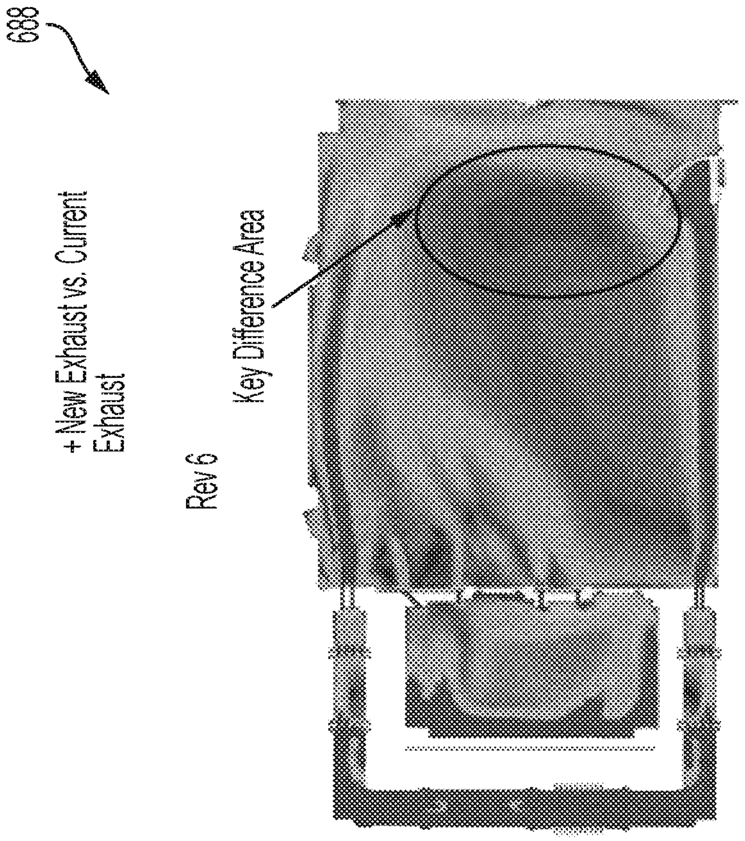
Figures 1, 6J:
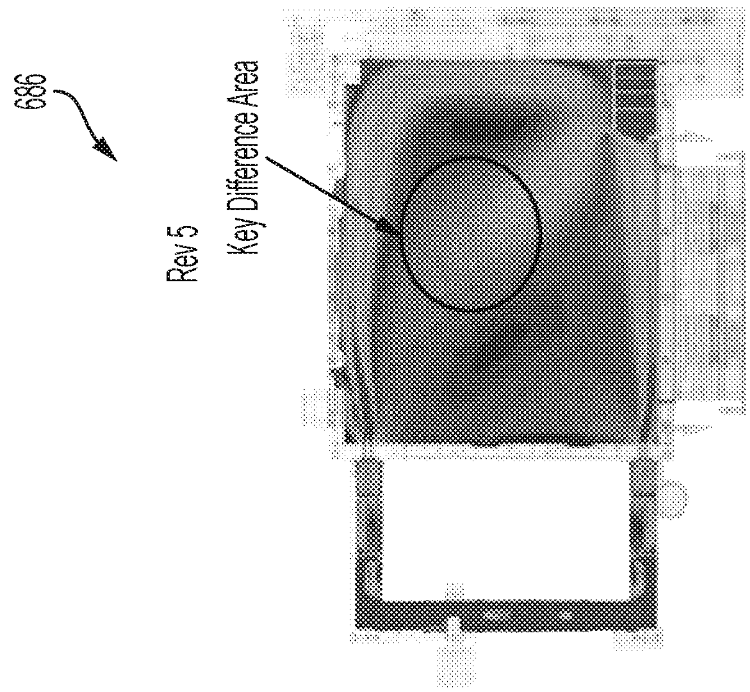
Figures 3, 4, 6J:
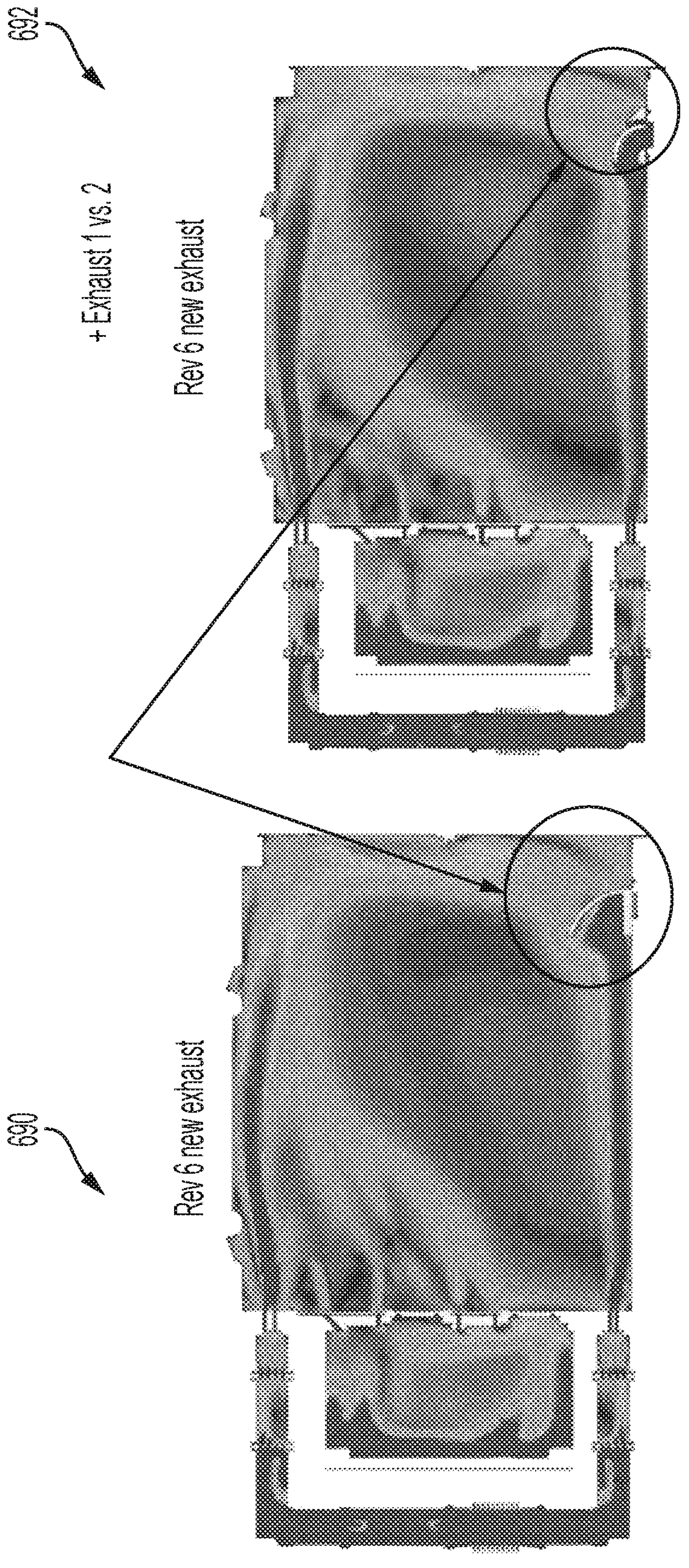
Figures 5, 6J:
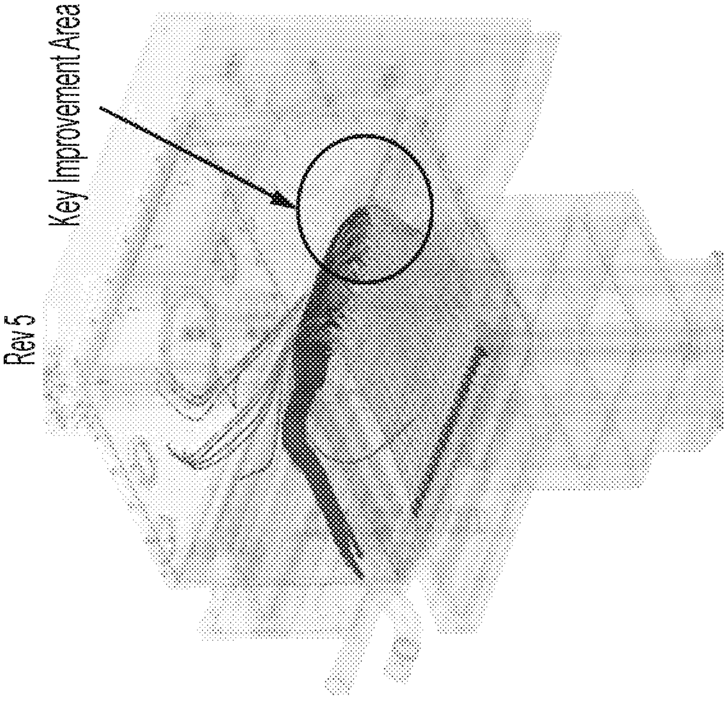
Figures 6, 6J:
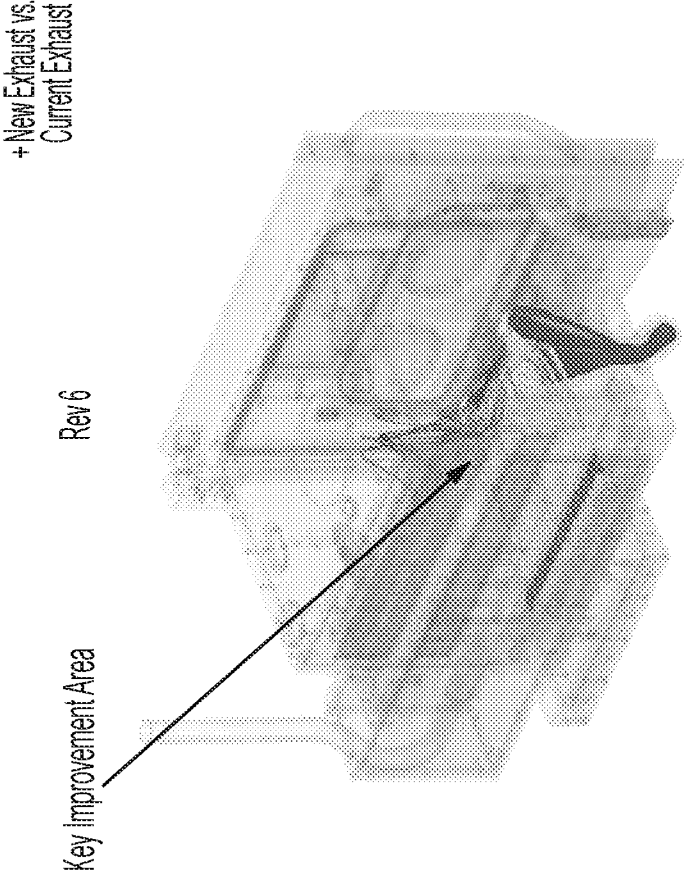

Referring to FIGS. 6J-1-6J-2, exemplary screenshots (686-688) of analysis by the simulation of the gas flow by an embodiment of the DGF system 600 of FIG. 6G-1 and an embodiment of the DGF system 600 of FIG. 6G-2 are shown respectively.

Referring to FIGS. 6J-3-6J-4, exemplary screenshots (690-692) of analysis by the simulation of the gas flow by two different embodiments of the DGF system 600 of FIG. 6G-2 are shown respectively. In the two different embodiments of the DGF system 600 include a curved baffle (not shown in figures) with a different shape.

Referring to FIGS. 6J-5-6J-6, exemplary screenshots (694-696) of comparison rendering output by the simulation of the gas flow by an embodiment of the DGF system 600 of FIG. 6G-1 and an embodiment of the DGF system 600 of FIG. 6G-2 are shown respectively.

The DGF system 600 for the additive manufacturing system 100 can utilize and combine features from any of the embodiments and aspects discussed above.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It may be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim.

What is claimed is:

1. A powder delivery system of an additive manufacturing system for manufacturing a component, the powder delivery system comprising:
- a powder hopper disposed on a frame of the additive manufacturing system, the powder hopper configured to contain a total volume of a material powder;
- a linear vibration system disposed on the frame and connected to the powder hopper, the linear vibration system configured to receive and transport a first portion of the total volume of the material powder from the powder hopper;
- a diverter connected to the linear vibration system, the diverter configured to:
  - receive the first portion of the total volume of the material powder from the linear vibration system; and
  - distribute the first powder portion into a second powder portion having a specific width;
- a doser connected to the diverter, the doser configured to:
  - receive the second powder portion from the diverter;
  - separate the second powder portion into a plurality of doses, wherein each dose of the plurality of doses corresponds to a layer of the component to be manufactured; and
  - deliver a first dose from the plurality of doses on the build platform;
- a recoater disposed on a build chamber of the additive manufacturing system, the recoater configured to distribute the first dose evenly on build platform, the recoater comprising:
- a top part;
- a removable cartridge removably coupled to the top part, the removable cartridge configured to be removed from the top part and the build chamber for cleaning;
- a processor electronically coupled to the powder delivery system; and
- a memory unit coupled to the processor, the memory unit comprising stored instructions for controlling the powder delivery system.

2. The powder delivery system of claim 1, wherein the doser is disposed in the build chamber and mechanically coupled to the recoater.

3. The powder delivery system of claim 1, wherein the doser is disposed in the build chamber and is configured to be independent of the recoater.

4. The powder delivery system of claim 1, wherein the processor is configured to run a powder recovery cycle comprising the steps of:
- (i) moving the recoater in the build chamber separately from the doser; and
- (ii) rotating the drum of the doser to dump material powder inside of the doser into a powder collection vent.

5. The powder delivery system of claim 1, wherein the top part of the recoater further comprises:
- a wall bracket configured to couple the recoater to a wall of the build chamber; and
- a bracket stabilizer coupled to the wall bracket.

6. The powder delivery system of claim 5, wherein the removable cartridge is removably coupled to the top part via a connection mechanism selected from a group including a toolless clamp mechanism, a dove tail mechanism, a tapered dovetail mechanism, and a magnetic clamp mechanism.

7. The powder delivery system of claim 5, wherein the removable cartridge is removably coupled to the top part via a clamp mechanism disposed between the top part and the removable cartridge, the clamp mechanism comprising:
- at least one retaining piece configured to retain the top part to the removable cartridge; and
- at least one screw configured to tightened against the at least one retaining piece to lock the top part with the removable cartridge.

8. The powder delivery system of claim 7, wherein the doser comprises:
- a housing;
- a drum rotatably coupled within the housing on a pair of drum seats disposed within the housing;
- a cover removably coupled to the drum, the cover configured to retain the drum within the housing;
- at least two seal covers, wherein each of the seal covers is disposed on each side of the drum, the at least two seal covers configured to pressure seal the housing.

9. The powder delivery system of claim 8, wherein the cover is configured retain the drum within the housing via at least one screw.

10. The powder delivery system of claim 8, wherein a rotation of the drum is controlled by the processor coupled to the powder delivery system.

* * * * *